US008155918B2

(12) United States Patent
Reed et al.

(10) Patent No.: US 8,155,918 B2
(45) Date of Patent: *Apr. 10, 2012

(54) AMBULANCE COT SYSTEM

(75) Inventors: Jaime C. Reed, Mukwonago, WI (US); Jeffrey J. Krieger, Mukwonago, WI (US); Richard T. Seizer, Wauwatosa, WI (US); Shawn G. Bhend, Waukesha, WI (US); Jarod M. Sulik, Elkhorn, WI (US)

(73) Assignee: Rauch & Romanshek Industries, LLC, Milwaukee, WI (US)

( * ) Notice: Subject to any disclaimer, the term of this patent is extended or adjusted under 35 U.S.C. 154(b) by 884 days.

This patent is subject to a terminal disclaimer.

(21) Appl. No.: 12/057,180

(22) Filed: Mar. 27, 2008

(65) Prior Publication Data
US 2009/0165207 A1 Jul. 2, 2009

Related U.S. Application Data

(63) Continuation-in-part of application No. 11/968,013, filed on Dec. 31, 2007, now Pat. No. 7,389,552.

(51) Int. Cl.
*G01C 9/06* (2006.01)
*G06F 17/40* (2006.01)
*A61G 7/018* (2006.01)

(52) U.S. Cl. .................... 702/150; 702/154; 5/600

(58) Field of Classification Search .............. 702/141, 702/150, 151, 154, 171; 5/86.1, 81.1 R, 5/600, 625; 296/20
See application file for complete search history.

(56) References Cited

U.S. PATENT DOCUMENTS

| | | | | |
|---|---|---|---|---|
| 5,248,007 A * | 9/1993 | Watkins et al. | ............ | 180/9.32 |
| 5,547,038 A * | 8/1996 | Madwed | ............ | 180/253 |
| 5,799,258 A * | 8/1998 | Fidanza et al. | ............ | 701/1 |
| 7,044,361 B2 * | 5/2006 | March | ............ | 235/95 R |
| 7,389,552 B1 * | 6/2008 | Reed et al. | ............ | 5/86.1 |
| 7,487,562 B2 * | 2/2009 | Frondorf et al. | ............ | 5/613 |
| 7,690,059 B2 * | 4/2010 | Lemire et al. | ............ | 5/600 |
| 7,805,784 B2 * | 10/2010 | Lemire et al. | ............ | 5/611 |
| 7,861,334 B2 * | 1/2011 | Lemire et al. | ............ | 5/53.1 |
| 7,962,981 B2 * | 6/2011 | Lemire et al. | ............ | 5/616 |
| 8,051,513 B2 * | 11/2011 | Reed et al. | ............ | 5/627 |
| 8,085,148 B2 * | 12/2011 | Reed et al. | ............ | 340/572.1 |
| 2005/0120480 A1 | 6/2005 | Benedict et al. | | |
| 2006/0075558 A1 | 4/2006 | Lambarth et al. | | |
| 2007/0143920 A1 * | 6/2007 | Frondorf et al. | ............ | 5/81.1 R |
| 2007/0157385 A1 * | 7/2007 | Lemire et al. | ............ | 5/600 |
| 2007/0163043 A1 * | 7/2007 | Lemire et al. | ............ | 5/600 |
| 2007/0169268 A1 * | 7/2007 | Lemire et al. | ............ | 5/617 |
| 2007/0174964 A1 * | 8/2007 | Lemire et al. | ............ | 5/600 |
| 2009/0165207 A1 * | 7/2009 | Reed et al. | ............ | 5/611 |
| 2009/0165208 A1 * | 7/2009 | Reed et al. | ............ | 5/611 |
| 2009/0222988 A1 * | 9/2009 | Reed et al. | ............ | 5/627 |
| 2010/0117826 A1 * | 5/2010 | Reed et al. | ............ | 340/539.32 |
| 2011/0162141 A1 * | 7/2011 | Lemire et al. | ............ | 5/510 |

FOREIGN PATENT DOCUMENTS

| | | |
|---|---|---|
| JP | 2006-515211 A | 5/2006 |
| KR | 10-2007-0046065 A | 5/2007 |

* cited by examiner

*Primary Examiner* — Robert G Santos
(74) *Attorney, Agent, or Firm* — Quarles & Brady LLP; George E. Haas

(57) ABSTRACT

The present invention relates to ambulance cots, cot systems and methods of using the same. In particular, the present invention provides an ambulance cot comprising a hydraulic system and a tip angle monitoring, recording and alert system, and methods of using the same (e.g., to transport subjects and/or to detect and/or record operational data related to cot usage).

14 Claims, 76 Drawing Sheets

FIGURE 29
A
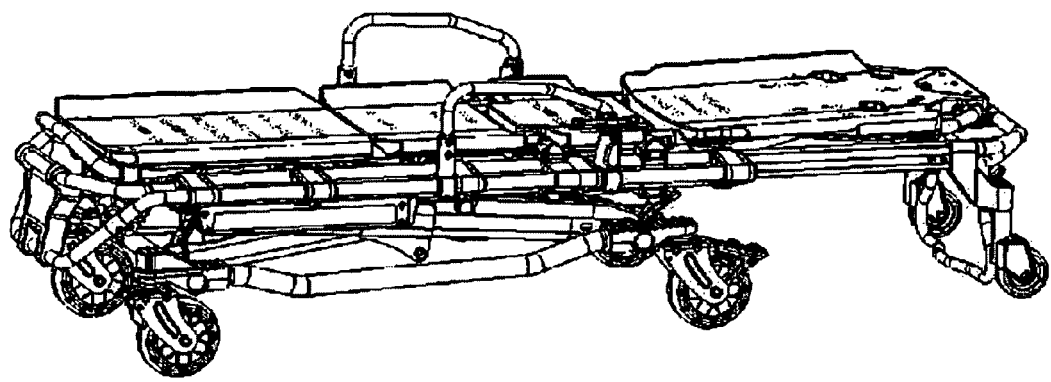
B
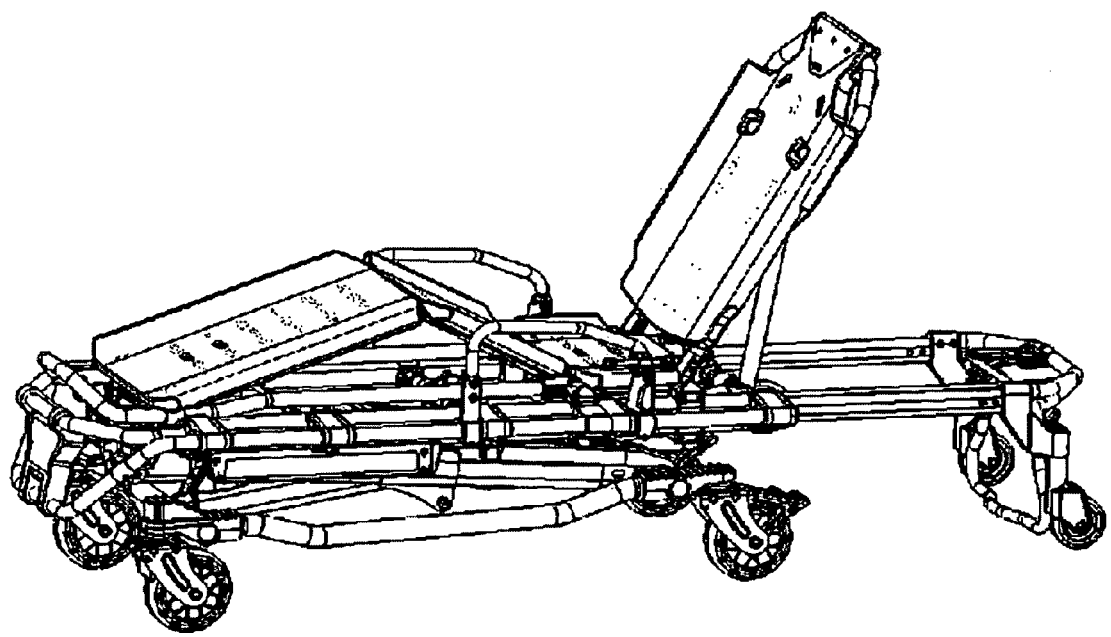

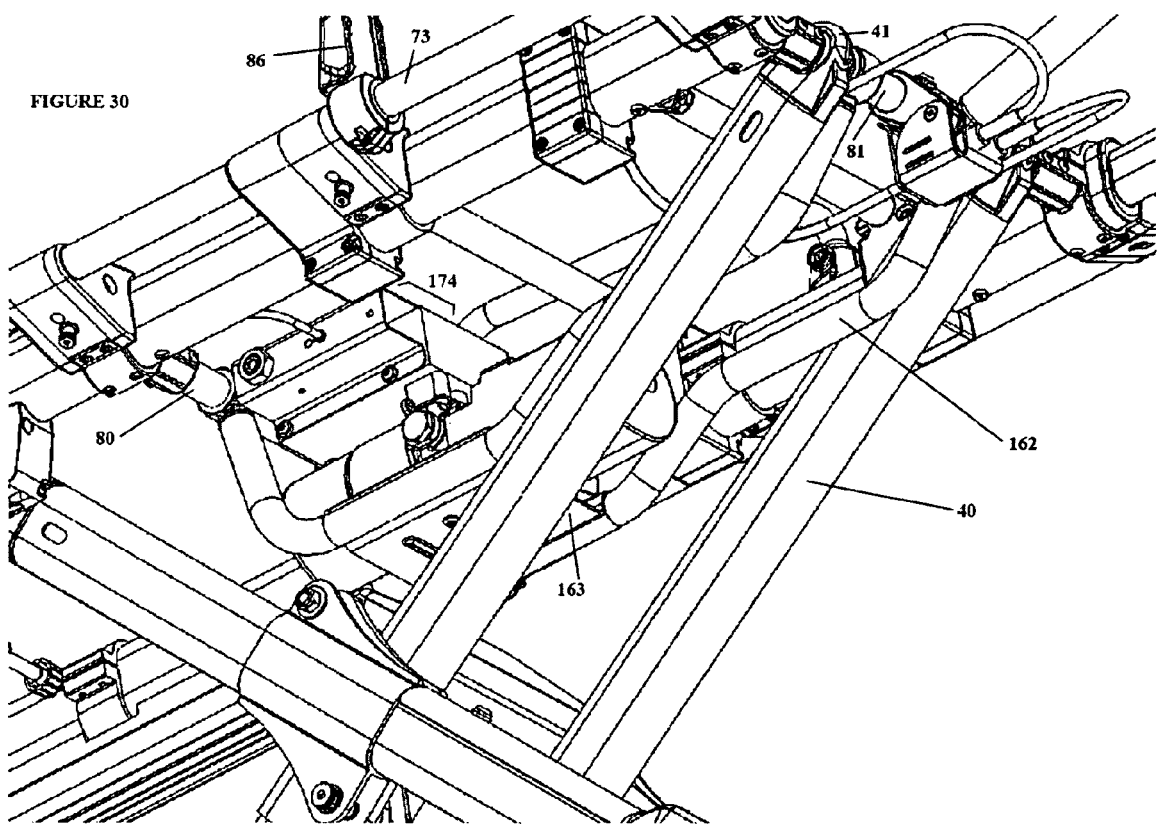

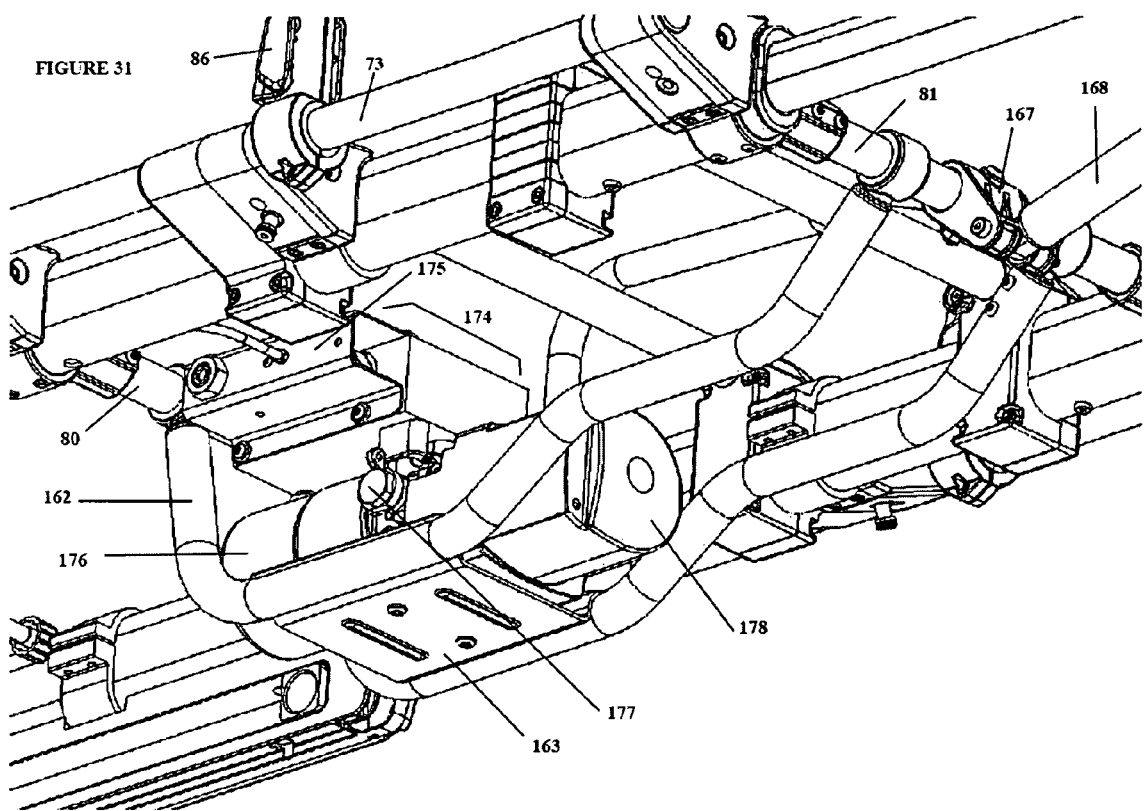

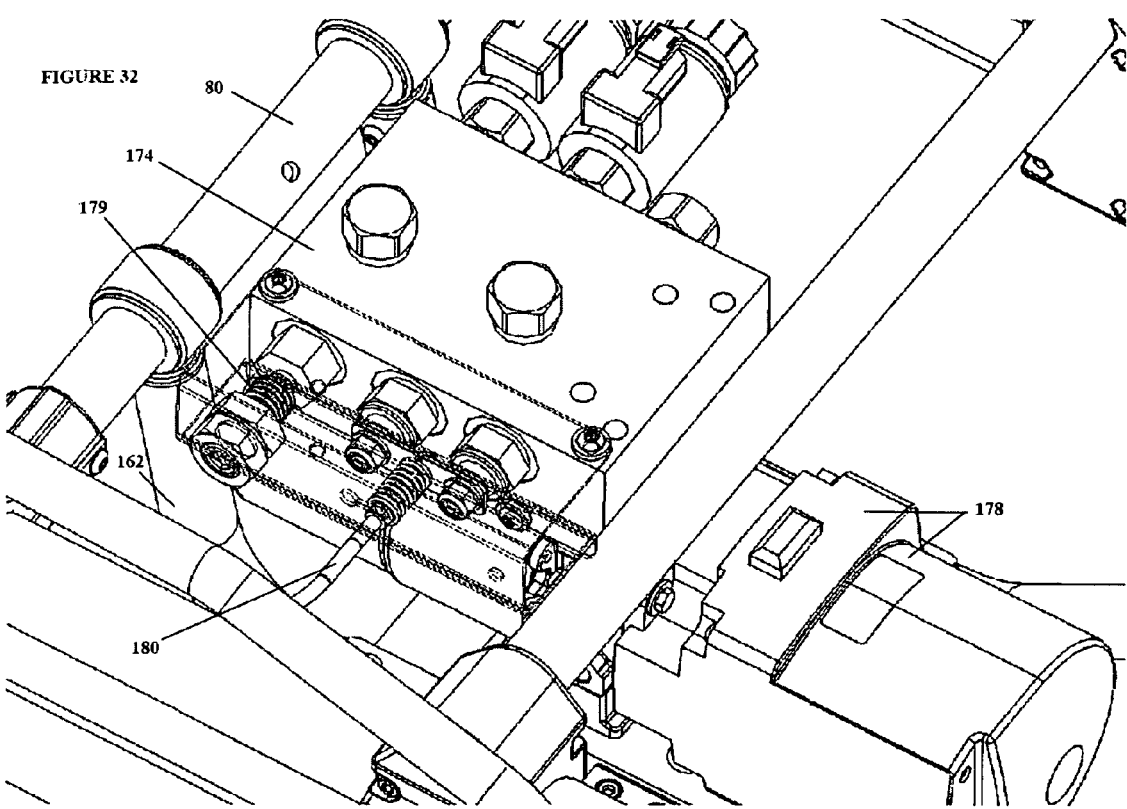

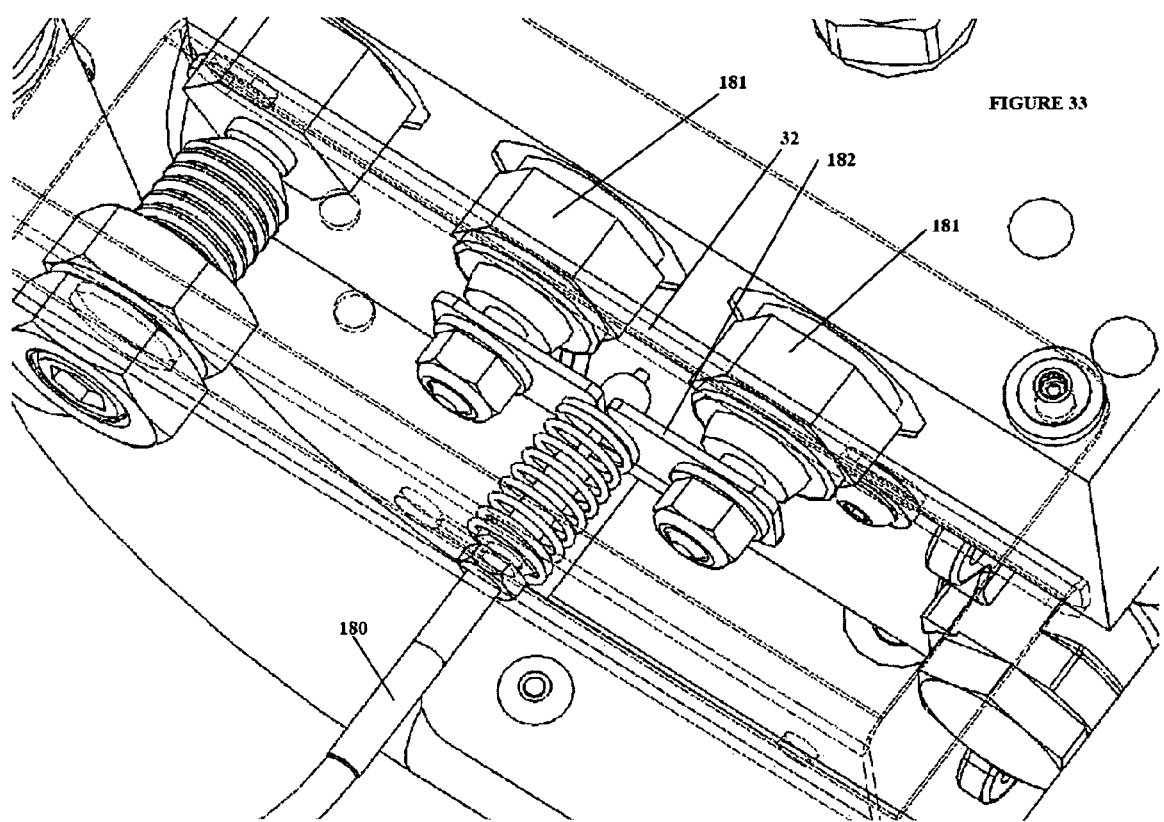

FIGURE 53
A
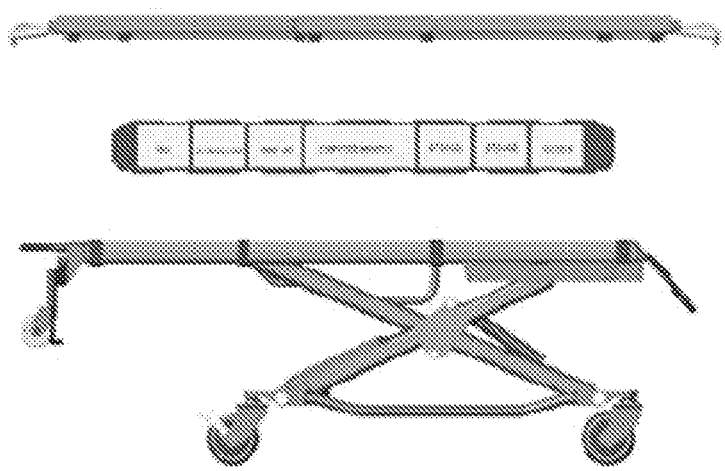
B
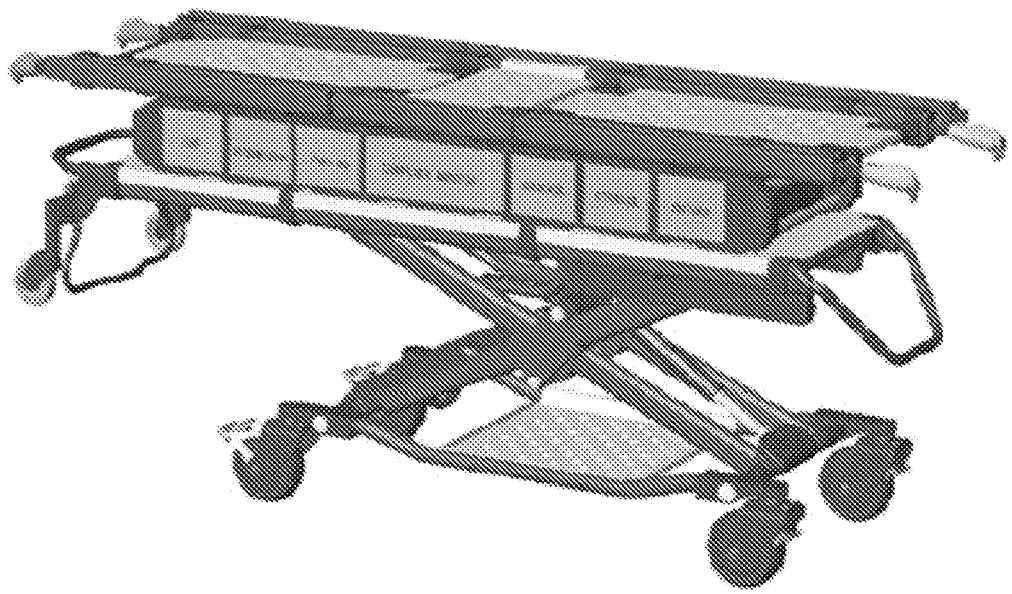

Section View

Section View

FIGURE 69

| Height (inches) | Weight (pounds) | | | | | | |
|---|---|---|---|---|---|---|---|
| | 0 | 100 | 200 | 300 | 400 | 500 | 600 |
| 1 | 20° | 20 | 20 | 20 | 20 | 20 | 20 |
| 2 | 20 | 20 | 20 | 20 | 20 | 20 | 20 |
| 3 | 20 | 20 | 20 | 20 | 20 | 20 | 20 |
| 4 | 20 | 20 | 20 | 20 | 20 | 20 | 19 |
| 5 | 20 | 20 | 20 | 20 | 20 | 19 | 19 |
| 6 | 20 | 20 | 20 | 20 | 19 | 19 | 19 |
| 7 | 20 | 20 | 20 | 20 | 19 | 19 | 18 |
| 8 | 20 | 20 | 20 | 20 | 19 | 18 | 18 |
| 9 | 20 | 20 | 20 | 19 | 18 | 18 | 17 |
| 10 | 20 | 20 | 20 | 19 | 18 | 18 | 17 |
| 11 | 20 | 20 | 20 | 18 | 18 | 17 | 17 |
| 12 | 20 | 20 | 19 | 18 | 17 | 17 | 16 |
| 13 | 20 | 20 | 19 | 17 | 17 | 17 | 16 |
| 14 | 20 | 20 | 19 | 17 | 17 | 16 | 16 |
| 15 | 20 | 20 | 18 | 17 | 16 | 16 | 15 |
| 16 | 20 | 20 | 18 | 16 | 16 | 16 | 15 |
| 17 | 20 | 20 | 18 | 16 | 16 | 15 | 15 |
| 18 | 20 | 19 | 17 | 16 | 15 | 15 | 14 |
| 19 | 20 | 19 | 17 | 15 | 15 | 15 | 14 |
| 20 | 19 | 18 | 17 | 15 | 15 | 14 | 14 |
| 21 | 19 | 18 | 16 | 15 | 14 | 14 | 13 |
| 22 | 18 | 17 | 16 | 14 | 14 | 14 | 13 |
| 23 | 18 | 17 | 16 | 14 | 14 | 13 | 13 |
| 24 | 17 | 16 | 15 | 14 | 13 | 13 | 12 |
| 25 | 17 | 16 | 15 | 13 | 13 | 12 | 12 |
| 26 | 16 | 15 | 14 | 13 | 13 | 12 | 12 |
| 27 | 16 | 15 | 14 | 13 | 12 | 12 | 11 |
| 28 | 15 | 14 | 13 | 12 | 12 | 11 | 11 |
| 29 | 15 | 14 | 13 | 12 | 12 | 11 | 11 |
| 30 | 14 | 13 | 12 | 12 | 11 | 11 | 11 |
| 31 | 14 | 13 | 12 | 11 | 11 | 11 | 10 |
| 32 | 13 | 12 | 11 | 11 | 11 | 10 | 10 |
| 33 | 13 | 12 | 11 | 11 | 10 | 10 | 10 |
| 34 | 12 | 11 | 10 | 10 | 10 | 10 | 10 |
| 35 | 12 | 11 | 10 | 10 | 10 | 10 | 10 |
| 36 | 12 | 11 | 10 | 10 | 10 | 10 | 10 | as # AMBULANCE COT SYSTEM

This application is a continuation-in-part of U.S. patent application Ser. No. 11/968,013, filed 31 Dec. 2007, hereby incorporated by reference in its entirety.

FIELD OF THE INVENTION

The present invention relates to ambulance cots, cot systems and methods of using the same. In particular, the present invention provides an ambulance cot comprising a hydraulic system and a tip angle monitoring, recording and alert system, and methods of using the same (e.g., to transport subjects and/or to detect and/or record operational data related to cot usage).

BACKGROUND OF THE INVENTION

The prevalence of overweight and obesity in the United States makes obesity a leading public health problem. The United States has the highest rates of obesity in the developed world. From 1980 to 2002, obesity doubled in adults and overweight prevalence tripled in children and adolescents (See, e.g., Ogden et al., JAMA 295 (13): 1549-55). From 2003-2004, of "children and adolescents aged 2 to 19 years, 17.1% were overweight . . . and 32.2% of adults aged 20 years or older were obese" (See, e.g., Ogden et al., 2006, JAMA 295 (13): 1549-55). The prevalence in the United States continues to rise.

Overweight and obese individuals are at increased risk for many diseases and health conditions including hypertension (high blood pressure), osteoarthritis (a degeneration of cartilage and its underlying bone within a joint), type 2 diabetes, coronary heart disease, stroke, gallbladder disease, and respiratory problems.

An Emergency Medical Technician (EMT) is an emergency responder trained to provide medical services to the ill and injured. Once thought of as an "ambulance driver or attendant," the modem EMT performs many more duties than in the past, and responds to many types of emergency calls, including medical emergencies, hazardous materials exposure, mass casualty/triage events, childbirth, patient transport, fires, rescues, injuries, trauma and other types of calls. EMTs may be part of an Emergency Medical Service (EMS), a hospital-based EMS, fire department, or independent response team.

EMTs are trained in practical emergency medicine and skills that can be deployed within a rapid time frame. In general, EMT intervention aims to expedite the safe and timely transport of a subject (e.g., to a hospital for definitive medical care, or from one location to another).

Thus, EMTs and others responsible for transporting patients must be able to deal with the weight of a subject being transported. Moreover, once a subject is loaded onto a cot for transport, EMTs and others involved in patient transport must be able to raise and lower a cot bearing a subject to various heights above the ground (e.g., raise the cot to a height to be loaded into the back of an ambulance). In view of the fact that obesity problems continue to rise in the United States as well as other developed countries, and that these subjects appear to be more prone to a need for emergency medical care, EMTs and other emergency medical service personnel are encountering the need to lift and transport heavier patients. This in turn has led to injuries (e.g., musculoskeletal injuries) as a result of overexertion lifting becoming one of the most common injuries in the EMT/EMS workforce.

SUMMARY OF THE INVENTION

The present invention relates to ambulance cots, cot systems and methods of using the same. In particular, the present invention provides an ambulance cot comprising a hydraulic system and a tip angle monitoring, recording and alert system, and methods of using the same (e.g., to transport subjects and/or to detect and/or record operational data related to cot usage).

Accordingly, in some embodiments, the present invention provides a hydraulically powered cot, wherein the cot comprises: A) a pair of frames, wherein the pair of frames comprise: 1) a base frame, wherein the base frame comprises a foot-end cross tube and a head-end cross tube, wherein each of the cross tubes are fastened on each end to a connector, wherein a first connector attached to the head-end cross tube is irremovably attached to a first rail that is irremovably attached to a first connector attached to the foot-end cross tube, and wherein a second connector attached to the head-end cross tube is irremovably attached to a second rail that is irremovably attached to a second connector attached to the foot-end cross tube; and 2) a top frame, wherein the top frame comprises: i) a slider housing affixed to the foot-end portion of the top frame; and ii) a telescoping load rail assembly, wherein the assembly comprises wheels that are utilized for rolling the cot out of and into a deck of an ambulance; and iii) a plurality of cross tubes and cross tube castings, wherein the plurality of cross tubes comprise a foot-end cross tube, a head-end cross tube and a middle region cross tube, wherein the top frame is attached to a team lift rail, wherein the team lift rail surrounds the foot-end region and both sides of the top frame, wherein the team lift rail located on one side of the top frame is attached to the team lift rail located on the other side of the top frame via the plurality of cross tubes and cross tube castings, wherein the cross tubes are fastened to the cross tube castings, wherein the castings are fastened to the top frame and comprise an orifice into and/or through which the team lift rails extend; B) a patient litter formed of roto-molded plastic (e.g., comprising lower leg, upper leg, lower torso and/or upper torso sections); C) a fixed leg assembly comprising a pair of fixed-length legs, wherein the fixed-length legs are parallel to each other, and wherein the fixed-length legs are pivotably connected to the foot-end cross tube of the base frame, and wherein the fixed-length legs are pivotably attached to the head-end cross tube of the top frame; D) a telescoping leg assembly comprising a pair of telescoping legs, wherein the telescoping legs are parallel to each other, and wherein the telescoping legs comprise: i) a main rail, wherein the main rail comprises a top side and bottom side, wherein the top side of the main rail comprises an extruded portion fastened to the main rail that comprises a roller bearing, wherein the roller bearing rolls along the top side of the inner rail when the cot is raised or collapsed, wherein the main rails are fastened to each other via a cross tube that is irremovably attached to each of the extruded portions of the main rails, and wherein the main rails are attached to a cross tube residing in the slider housing affixed to the foot-end portion of the top frame; and ii) an inner rail, wherein the inner rail comprises a top side and a bottom side, wherein one or more roller bearings are connected to a top portion and one or more roller bearings are connected to a bottom portion of the inner leg, wherein the roller bearings roll along the inside face of the top side and the inside face of the bottom side of the main rail when the cot is raised or collapsed, wherein the inner rails are pivotably attached to the head-end cross tube of the base frame, wherein the roller bearings reduce frictional force associated with increase in length of the telescoping legs that occurs with raising of the patient litter and the frictional force associated with the decrease in length of the telescoping legs that occurs with lowering of the patient litter; E) a hydraulic system, wherein the hydraulic system comprises a cylinder powered by a hydraulic unit, wherein one end of the cylinder is attached to a cylinder base pivot, wherein the cylinder base pivot is pivotably attached to the foot-end cross tube of the base frame, and wherein the other end of the cylinder is attached to a cylinder cross member, wherein the cylinder cross member is fastened to each of the main rails of the telescoping legs; F) a tip angle monitoring, recording and alert system, wherein the tip angle system comprises: a pressure transducer, wherein the pressure transducer is located within the hydraulic system, detects hydraulic system pressure and converts the pressure to voltage information; an ultrasonic sensor, wherein the ultrasonic sensor is mounted on the slider housing, wherein the ultrasonic sensor measures the distance between the sensor and a slider block attached to the cross tube attached to the main rails of said telescoping legs residing in the slider housing, wherein the distance represents the distance between the ground and the wheels of the telescoping load rail assembly; and a circuit board, wherein the circuit board is located within a controller housing fastened to the foot-end of the top frame, wherein the circuit board comprises: i) a controller, wherein the controller monitors and records the voltage information of the pressure transducer, wherein the controller processes the voltage information to calculate load weight on the cot; ii) a processor; iii) a memory component; iv) an accelerometer, wherein the accelerometer is configured to measure in degrees the angle of movement from side to side of the circuit board with respect to a horizontal plane that is perpendicular to the earth's gravitational force; and iv) a firmware component comprising an algorithm, wherein the firmware and algorithm are configured to calculate and record cot tip angle utilizing: a) cot load measured by the pressure transducer; b) cot height measured by the ultrasonic sensor; and c) cot angle measured by the accelerometer; G) a non-series wired, two battery power system, wherein the system powers the hydraulic and electrical components of the cot; and H) a control panel (e.g., user interface), wherein the control panel comprises icon indicators for service information, hydraulic system information, and tip angle information; wherein the cot is configured to raise and lower a subject (e.g., weighing between 20 and 100 pounds (e.g., greater than 100 pounds, greater than 200 pounds, greater than 300 pounds, greater than 400 pounds, greater than 500 pounds, greater than 600 pounds (e.g., 650 or more pounds (e.g., unassisted (e.g., without the assistance of lifting energy exerted by one or more persons (e.g., EMS persons)))))). For example, although a cot of the present invention may be capable of lifting greater than 600 pounds unassisted, in some embodiments, the rated load of a cot provided herein is 600 pounds. In some embodiments, the cot further comprises hand lever-operated brakes. In some embodiments, the firmware component is housed within the controller. In some embodiments, the tip angle monitoring, recording and alert system captures and records cot operational use information. The present invention is not limited by the type of cot operational use information captured and recorded (e.g., that relates to the cot's usage). In some embodiments, cot operational use information comprises cot operation angles (e.g., comprising safe and/or unsafe angles of the cot (e.g., occurring during cot use (e.g., during patient transport))). In some embodiments, cot operational use information comprises cot angle, cot height, cot load weight, calendar date, and/or time. In some embodiments, the tip angle monitoring, recording and alert system comprises audio and/or visual alerts (e.g., that warn a user of an unsafe operational cot angle). For example, in some embodiments, the audio alert comprises a pulsed tone signal or a solid tone signal. In some embodiments, the pulsed tone signal sounds when the cot tip angle is within a certain number of degrees from the tipping point. For example, in some embodiments, the pulsed tone signal sounds when the cot tip angle is identified (e.g., by the components of the tip angle monitoring, recording and alert system (e.g., by the algorithm)) to be three degrees or less from the tipping point of the cot. In some embodiments, the pulsed tone signal sounds when the cot tip angle is identified (e.g., by the components of the tip angle monitoring, recording and alert system (e.g., by the algorithm)) to be five degrees or less from the tipping point of the cot. In some embodiments, the pulsed tone signal sounds when the cot tip angle is identified (e.g., by the components of the tip angle monitoring, recording and alert system (e.g., by the algorithm)) to be seven degrees or less from the tipping point of the cot. The present invention is not limited to these amounts. Indeed, a pulsed tone signal may sound when the cot tip angle is identified to be any desired degree (or less) from the tipping point of the cot (e.g., 3, 5, 7, 9, 10, 15, less than 3 or more than 15 degrees). In some embodiments, a solid tone signal sounds when the cot tip angle reaches the tipping point of the cot. In some embodiments, the tip angle monitoring, recording and alert system communicates with the controller to preclude raising of the cot (e.g., when the system detects a certain tip angle (e.g., 3, 5, 7, 9, 10, 15, less than 3 or more than 15 degrees from a tipping point)). In some embodiments, the cot comprises a weighing function (e.g., comprising a push button on the control panel (e.g., user interface), wherein when the push button is pressed, a cot load weight is displayed (e.g., on the control panel) by the cot). In some embodiments, the load weight is displayed in pounds. In some embodiments, the load weight is displayed in kilograms. In some embodiments, the memory component comprises one or a plurality of memory chips. The present invention is not limited by the type of memory chips utilized. Indeed, a variety of memory chips may be utilized including, but not limited to, dynamic random access memory (DRAM) chips, FLASH memory chips, static random access memory (SRAM) chips, specialty memory chips, ferroelectric random access memory (FRAM) chips, electrically erasable programmable read-only memory (EEPROM) chips, first-in, first-out (FIFO) memory chips, erasable programmable read-only memory (EPROM) chips, non-volatile random access memory (NVRAM) chips, memory cards, a collection of chips (e.g., SRAM modules, DRAM modules, etc.), etc. In some embodiments, the memory component stores operational use information. In some embodiments, the operational use information is only accessible to an administrator. In some embodiments, the firmware component is accessible via a USB port. In some embodiments, cot operational use information can be removed from the memory component (e.g., using a USB port (e.g., to move operational use information to another memory (e.g., data storage) device)). In some embodiments, roller bearings reduce frictional force of the telescoping legs. In some embodiments, reducing frictional force of the telescoping legs reduces hydraulic system pressure. In some embodiments, reducing frictional force of the telescoping legs reduces battery current draw. In some embodiments, reducing frictional force of the telescoping legs extends the usable life of the cot. In some embodiments, the cot further comprises one or more hall effect switches configured to regulate power to the hydraulic system.

In some embodiments, the present invention provides a cot tip angle monitoring, recording and alert system, wherein the tip angle system comprises: a pressure transducer; an ultrasonic sensor; and an accelerometer. In some embodiments, the tip angle monitoring, recording, and alert system further comprises a circuit board. In some embodiments, the circuit board is fastened to the cot. In some embodiments the circuit board comprises: i) a controller; ii) a processor; iii) a memory component; and iv) a firmware component comprising an algorithm, wherein the firmware and algorithm are configured to calculate and record cot tip angle. In some embodiments, cot tip angle is calculated utilizing cot load measured by the pressure transducer. In some embodiments, cot tip angle is calculated utilizing cot height measured by the ultrasonic sensor. In some embodiments, cot tip angle is calculated utilizing cot angle measured by the accelerometer. In some embodiments, the algorithm utilizes each of cot load, cot height and cot angle to determine cot tip angle. In some embodiments, the pressure transducer is located within a hydraulic system. In some embodiments, the pressure transducer detects hydraulic system pressure and converts the pressure to voltage information. In some embodiments, the controller monitors and records the voltage information of the pressure transducer. In some embodiments, the controller processes the voltage information to calculate load weight on the cot. In some embodiments, the ultrasonic sensor is mounted in a location on the cot that measures the height of the cot (e.g., directly or indirectly (e.g., via measuring the distance between the ultrasonic sensor and a movable component of the cot that is closer to or further from the sensor depending upon whether the cot is raised or lowered). In some embodiments, the accelerometer is configured to measure in degrees the angle of movement from side to side of the cot with respect to a horizontal plane that is perpendicular to the earth's gravitational force.

In some embodiments, the present invention provides a cot tip angle monitoring, recording and alert system, wherein the tip angle system monitors and records, in real-time, cot operational use information. In some embodiments, cot operational use information comprises the tip angle of the cot. The present invention is not limited by the type of cot operational use information monitored and recorded (e.g., that relates to the cot's usage). In some embodiments, cot operational use information comprises cot operation angles (e.g., comprising safe and/or unsafe angles of the cot (e.g., occurring during cot use (e.g., during patient transport))). In some embodiments, cot operational use information comprises cot angle, cot height, cot load weight, calendar date, user identification, and/or time. In some embodiments, recorded cot operational use information is saved in a memory component of the system. The present invention is not limited by the type of memory used for recording the cot operational use information. In some embodiments, the memory is an internal or external hard drive. In some embodiments, the memory is a jump drive. In some embodiments, the memory is a memory chip described herein. In some embodiments, the cot operational use information is only retrievable from the memory component by an authorized user. In some embodiments, the authorized user is an administrator.

The present invention also provides a hydraulic system for use in a hydraulically powered cot. For example, in some embodiments, the present invention provides a hydraulic system depicted in FIGS. 1 and 44-52.

The present invention also provides an ambulance cot (e.g., a manual cot or a hydraulically powered cot) comprising a telescoping leg assembly comprising a roller bearing system. In some embodiment, the telescoping leg assembly comprising a roller bearing system comprises both a main, outer rail and an inner rail. In some embodiments, the main rail comprises a top side and bottom side, wherein the top side of the main rail comprises an extruded portion fastened to the main rail that comprises a roller bearing, wherein the roller bearing rolls along the top side of the inner rail (e.g., when the telescoping leg assembly is expanded (e.g., when the cot is raised) or contracted (e.g., when a cot is lowered or collapsed). In some embodiments, a cot comprises two telescoping leg assemblies (e.g., with each comprising a roller bearing system) that are parallel to each other wherein the main rails of each telescoping leg assembly are fastened to each other via a cross tube that is irremovably attached to each of the extruded portions of the main rails. In some embodiments, a cot comprises four telescoping leg assemblies (e.g., with each comprising a roller bearing systems). In some embodiments, the inner rail comprises a top side and a bottom side, wherein one or more roller bearings (e.g., two, three, four or more) are connected to a top portion and one or more roller bearings (e.g., two, three, four or more) are connected to a bottom portion of the inner leg, wherein the roller bearings roll along the inside face of the top side of the main rail and the inside face of the bottom side of the main rail when the telescoping leg is expanded (e.g., when a cot is raised) or contracted (e.g., when a cot is lowered or collapsed). In some embodiments, the roller bearing system reduces frictional force of the telescoping legs (e.g., the frictional force associated with an increase or decrease in length of the telescoping legs (e.g., that occurs with raising or lowering of the cot). In some embodiments, reducing frictional force of the telescoping legs reduces hydraulic system pressure. In some embodiments, reducing frictional force of the telescoping legs reduces battery current draw. In some embodiments, reducing frictional force of the telescoping legs extends the usable life of the cot (e.g., by reducing hydraulic system pressure and/or reducing battery current draw).

The present invention also provides an ambulance cot comprising an automatic retract system configured to collapses the legs of the cot from a raised position to a fully collapsed position, the system comprising a hydraulic system, wherein the hydraulic system comprises a cylinder powered by a hydraulic unit; a pressure transducer, wherein the pressure transducer is located within the hydraulic system and is configured to convert hydraulic system pressure to voltage information; an ultrasonic sensor, wherein the ultrasonic sensor is configured to provide voltage information relating to the distance between the ultrasonic sensor and another component of the cot; and an accelerometer, wherein the accelerometer is configured to provide voltage information relating to the angle of the cot; wherein the automatic retract system is enabled and/or initiated upon the occurrence of one or more conditions monitored by the pressure transducer, the ultrasonic sensor or the accelerometer. In some embodiments, the ultrasonic sensor monitors the distance between the wheels of a telescoping load rail assembly component of the cot and the surface upon which the cot is transported. In some embodiments, the distance is determined via the ultrasonic sensor indicating the distance between the ultrasonic sensor and another component of the cot (e.g., the distance between the ultrasonic sensor and a movable component of the cot that is closer to or further from the sensor depending upon whether the cot is raised or lowered)). In some embodiments, the other component of the cot is a slider block (e.g., attached to a cross tube attached to a main rails of the telescoping legs). In some embodiments, the accelerometer measures the angle of movement of the cot with respect to a horizontal plane that is perpendicular to the earth's gravitational force (e.g., from side to side (e.g., the roll and/or the pitch)). The present invention is not limited by the one or more conditions monitored. Indeed, a variety of conditions can be monitored including, but not limited to, system pressure, cot height, and the angle of the cot. In some embodiments, a system pressure of less than 25 pounds per square inch (psi) enables and/or initiates the automatic retract system. In some embodiments, system pressure of less than 25 pounds per square inch (psi) is attained via one or more users of the cot resting the head-end portion of the cot upon the deck of an ambulance and subsequently lifting upward upon the foot-end portion and/or side portions of the cot thereby removing the force exerted by the ground or other surface over which the cot is transported upon wheels attached to a base frame of the cot. In some embodiments, one or more users of the cot lift upward upon a team lift rail component of the cot to reduce and/or remove system pressure. In some embodiments, a cot height equal to the load height of the cot enables and/or initiates the automatic retract system. In some embodiments, cot height is utilized to determine an angle of the cot at which the automatic retraction system is enabled and/or initiated. In some embodiments, the absence of an angle of the cot that registers a tip warning enables and/or initiates the automatic retract system. In some embodiments, the angle of the cot is an angle at which the patient litter is nearly parallel to the ground and/or surface upon which the cot is transported. In some embodiments, an angle of the pitch of the cot that is within about 15 degrees of horizontal (e.g., within about 15 degrees of a horizontal plane drawn through the patient litter of the cot that is perpendicular to the earth's gravitational force) enables and/or initiates the automatic retract system. In some embodiments, system pressure is monitored by the pressure transducer. In some embodiments, cot height is monitored by the ultrasonic sensor. In some embodiments, angle of the cot is monitored by an accelerometer. In some embodiments, the automatic retract system is disabled and/or terminated upon the occurrence of an angle of the cot at which the cot is at risk of tipping. In some embodiments, the occurrence of an angle of the cot at which the cot is at risk of tipping is detected by the accelerometer. In some embodiments, the angle of the cot at which the cot is at risk of tipping is an angle representing the roll of the cot or an angle representing the pitch of the cot. In some embodiments, the value of the angle representing the roll of the cot and the value of the angle representing the pitch of the cot are different. In some embodiments, the angle of the roll of the cot is an angle that registers a tip warning. In some embodiments, the value of the angle of the pitch of the cot is about 15 degrees (e.g., is about 13 degrees, 14 degrees, 16, degrees, 17 degrees, less than 13 degrees or more than 17 degrees). In some embodiments, an automatic retract system comprises a controller. In some embodiments, the controller (e.g., microcontroller) receives and/or processes voltage information (e.g., from the pressure transducer, the ultrasonic sensor and/or the accelerometer). In some embodiments, upon the occurrence of one or more conditions, the controller enables and/or initiates the collapsing of the legs of the cot from a raised position to a fully collapsed position.

The present invention also provides a method of loading a subject into an ambulance comprising: providing a hydraulically powered cot comprising an automatic retract system; and a subject; loading the subject onto the cot, positioning the head-end portion of the cot onto the deck of an ambulance; and reducing hydraulic system pressure of the cot, wherein reducing hydraulic system pressure enables and/or initiates the automatic retract system of the cot. In some embodiments, reducing hydraulic system pressure comprises attaining a system pressure of less than about 25 pounds per square inch (psi). In some embodiments, system pressure of less than about 25 pounds per square inch (psi) is attained via one or more users of the cot resting the head-end portion of the cot upon the deck of an ambulance and subsequently lifting upward upon the foot-end portion and/or side portions of the cot (e.g., lifting upward on a team lift rail) thereby removing the force exerted by the ground or other surface over which the cot is transported upon wheels attached to a base frame. In some embodiments, enabling and/or initiation of the automatic retract system collapses the legs of the cot from a raised position to a fully collapsed position.

The present invention also provides an ambulance cot comprising a pair of fixed length legs and a pair of telescoping legs, wherein the telescoping legs comprise a roller bearing system. In some embodiments, the roller bearing system comprises a main rail and an inner rail, wherein the inner rail telescopingly moves along and outward from within the main rail, wherein the main rail comprises one or more roller bearings that contact and roll along an outside face of the inner rail. In some embodiments, the one or more roller bearings are attached to an extruded portion of the main rail and contact and roll along the topside of the inner rail. In some embodiments, the inner rail comprises one or more roller bearings that contact and roll along the inside face of the top side and one or more roller bearings that contact and roll along the inside face of the bottom side of the main rail. In some embodiments, the roller bearing system reduces frictional force generated during increasing or decreasing the length of the telescoping legs. In some embodiments, the friction force is associated with raising and/or lowering of a subject upon the cot. In some embodiments, reducing the frictional force reduces energy required to raise and/or lower the cot. In some embodiments, the energy is drawn from batteries utilized to power a hydraulic system configured to raise and/or lower the pair of fixed length legs and the pair of telescoping legs. In some embodiments, the fixed length legs are parallel to each other and pivotally connect to a foot-end cross tube of a base frame and a head-end cross tube of a top frame of the cot. In some embodiments, the fixed-length legs reduce hydraulic system pressure during raising of the cot.

The present invention also provides an ambulance cot comprising a tip angle monitoring, recording and alert system, wherein the tip angle system comprises a pressure transducer, wherein the pressure transducer is located within a hydraulic system and is configured to convert hydraulic system pressure to voltage information; an ultrasonic sensor, wherein the ultrasonic sensor is configured to provide voltage information relating to the distance between the ultrasonic sensor and another component of the cot; and an accelerometer, wherein the accelerometer is configured to provide voltage information relating to the angle of the cot; wherein the tip angle monitoring, recording and alert system captures and records cot operational use information. In some embodiments, the hydraulic system is configured to raise and lower the legs of the cot. In some embodiments, the cot further comprises a firmware component, wherein the firmware is configured to calculate and record tip angle of the cot utilizing cot load measured by the pressure transducer; cot height measured by the ultrasonic sensor; and cot angle measured by the accelerometer. In some embodiments, cot height is determined via the ultrasonic sensor indicating the distance between the ultrasonic sensor and another component of the cot. In some embodiments, the ultrasonic sensor is mounted on a slider housing present upon the foot end portion of a top frame of the cot, wherein the ultrasonic sensor measures the distance between the sensor and a slider block attached to a cross tube attached to the main rails of telescoping legs of the cot that resides in the slider housing, wherein the distance correlates to the distance between the wheels of a telescoping load rail assembly component of the cot and the surface upon which the cot is transported. In some embodiments, the system further comprises a controller, wherein the controller monitors, processes and/or records the voltage information. In some embodiments, the voltage information of the pressure transducer is utilized by the controller to calculate load weight upon the cot. In some embodiments, cot operational use information comprises unsafe cot operation angles. The present invention is not limited by the type of cot operational use information. In some embodiments, cot operational use information includes, but is not limited to, cot angle, cot height, cot load weight, user identification, calendar date, and time. In some embodiments, the tip angle monitoring, recording and alert system comprises audio and/or visual alerts that warn a user of an unsafe cot tip angle. In some embodiments, the audio alert comprises a pulsed tone signal and a solid tone signal. In some embodiments, the pulsed tone signal sounds when the angle of the cot is three degrees or less from the tipping point of the cot. In some embodiments, the solid tone signal sounds when the angle of the cot reaches the tipping point of the cot. In some embodiments, the cot comprises an automatic retract system. In some embodiments, the voltage information of the ultrasonic sensor is utilized by the controller to raise the cot to a specific height. In some embodiments, the voltage information of the accelerometer is utilized by the controller to monitor the angle of the cot with respect to a horizontal plane that is perpendicular to the earth's gravitational force.

The present invention also provides a method of monitoring, recording and analyzing information associated with use of an ambulance cot. In some embodiments, a method of monitoring, recording and analyzing information associated with use of an ambulance cot comprises providing an ambulance cot, wherein the ambulance cot comprises a tip angle monitoring, recording and alert system, wherein the system comprises a controller and a memory component, wherein the controller records information acquired from the tip angle monitoring, recording and alert system into the memory component. The present invention is not limited by the type of information monitored, recorded and/or analyzed. In some embodiments, the information comprises information regarding when the cot is removed from an ambulance and/or when the cot is loaded into an ambulance. In some embodiments, the information comprises information regarding whether a cot was taken up and/or down a surface (e.g., an inclined surface (e.g., a flight of stairs)). In some embodiments, the information comprises information regarding whether the cot traversed a surface in a foot-first or a head-first orientation. In some embodiments, the information comprises identification of a specific time at which a subject is placed upon and/or removed from the cot. In some embodiments, the information is utilized in an effort to assist a user of the cot to operate the cot according to one or more identified operating procedures. In some embodiments, the information associated with use of an ambulance cot is analyzed for a plurality of users.

The present invention also provides an ambulance cot comprising a hand-lever operated braking system. In some embodiments, the system comprises a hand brake ramping mechanism. In some embodiments, the ramping mechanism comprises a first hand brake lever cable connected to a hand brake lever, wherein the a first hand brake lever cable is connected to a plurality of second hand brake lever cables via a hand brake pull block, wherein the second hand brake lever cables are connected to rotary ramped lifters that act upon two or more wheels of the cot. In some embodiments, the rotary ramped lifters transfer linear motion of the second hand brake lever cables to rotary motion. In some embodiments, the rotary motion is converted back into linear motion via cam surfaces of linear ramped lifters. In some embodiments, the liner motion of the linear ramped lifters pivots brake arms into the outside diameter of the two or more wheels. In some embodiments, the present invention also provides a method of controlling the speed of an ambulance cot comprising utilizing an ambulance cot hand-lever operated braking system.

The present invention also provides an ambulance cot comprising a power system comprising a plurality of non-series wired batteries. In some embodiments, the cot comprises a controller comprising an analog to digital microprocessor with a field-effect transistor. In some embodiments, the ambulance cot is configured to draw power from only a single battery at any given time. In some embodiments, reverse polarity protection is utilized to provide a plurality of batteries in parallel wherein any single battery is not charging another battery. In some embodiments, the controller is configured to automatically switch to a separate, fully charged battery within the plurality of batteries when a first battery reaches a depleted charge. In some embodiments, the depleted charge is a charge incapable of operating components of the cot.

DESCRIPTION OF DRAWINGS

FIG. 30 shows attachment points for a hydraulic system to a cot in one embodiment of the invention.

FIG. 31 shows components of a hydraulic system in one embodiment of the invention.

FIG. 32 shows components of a hydraulic system in one embodiment of the invention.

FIG. 33 shows components of a manual release for a hydraulic system in one embodiment of the invention.

FIG. 53 shows a multiple layer cot system of the present invention.

FIG. 69 shows a table comprising height, weight and tip angles for a cot of one embodiment of the present invention.

DEFINITIONS

Figure 1:
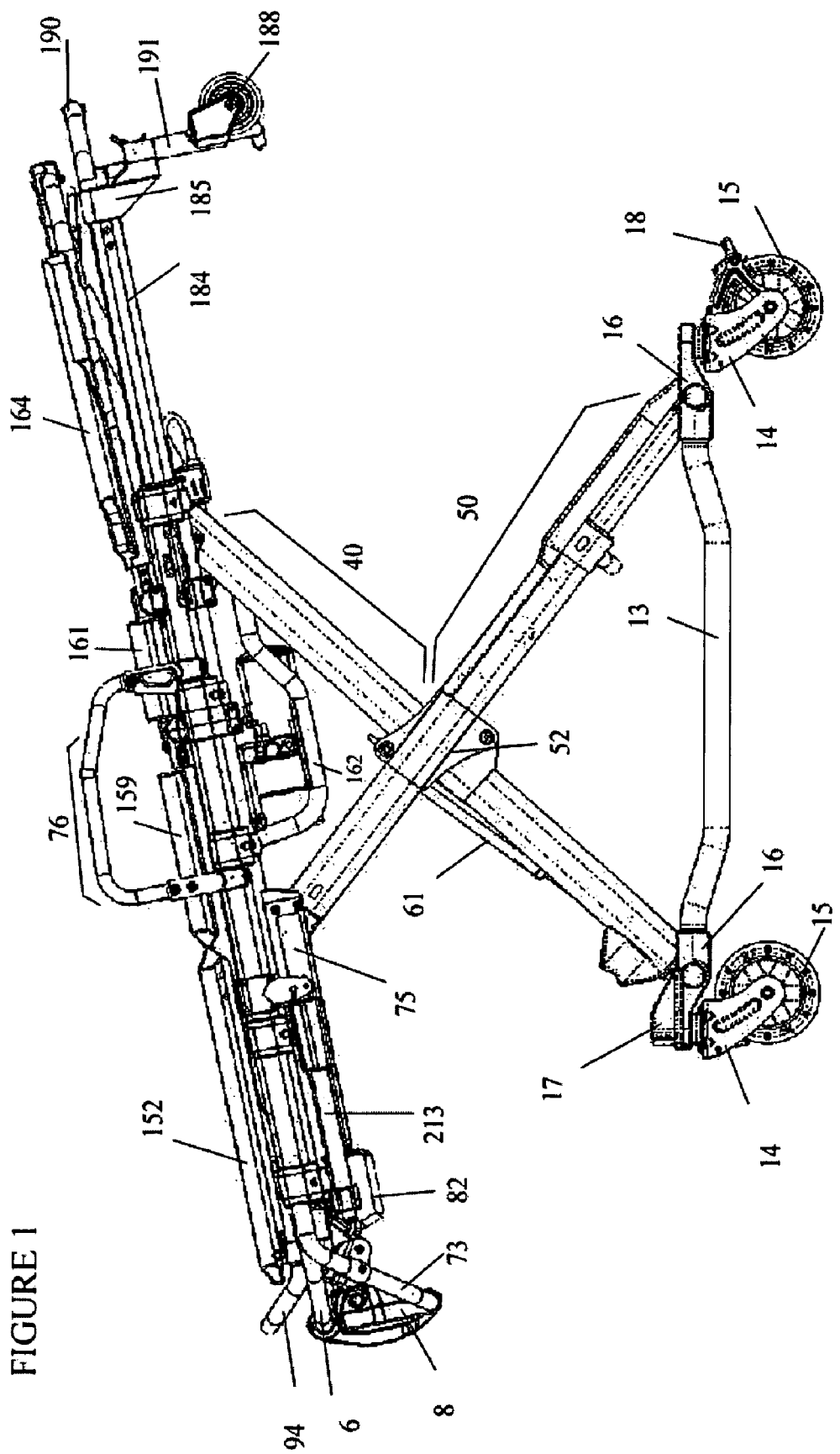
FIG. 1 shows an illustrated side view of a cot according to the invention in a fully raised position.

To facilitate an understanding of the present invention, a number of terms and phrases are defined below:

As used herein, the term "subject" refers to a human or other vertebrate animal. It is intended that the term encompass patients.

As used herein, the term "amplifier" refers to a device that produces an electrical output that is a function of the corresponding electrical input parameter, and increases the magnitude of the input by means of energy drawn from an external source (i.e., it introduces gain). "Amplification" refers to the reproduction of an electrical signal by an electronic device, usually at an increased intensity. "Amplification means" refers to the use of an amplifier to amplify a signal. It is intended that the amplification means also includes means to process and/or filter the signal.

As used herein, the term "receiver" refers to the part of a system that converts transmitted waves into a desired form of output. The range of frequencies over which a receiver operates with a selected performance (i.e., a known level of sensitivity) is the "bandwidth" of the receiver.

As used herein, the term "transducer" refers to any device that converts a non-electrical parameter (e.g., sound, pressure or light), into electrical signals or vice versa.

The term "circuit" as used herein, refers to the complete path of an electric current.

As used herein, the term "resistor" refers to an electronic device that possesses resistance and is selected for this use. It is intended that the term encompass all types of resistors, including but not limited to, fixed-value or adjustable, carbon, wire-wound, and film resistors. The term "resistance" (R; ohm) refers to the tendency of a material to resist the passage of an electric current, and to convert electrical energy into heat energy.

The term "housing" refers to the structure encasing or enclosing at least one component (e.g., circuit board) of the devices of the present invention. In some embodiments, the housing comprises at least one hermetic feedthrough through which leads extend from the component inside the housing to a position outside the housing.

As used herein, the term "hermetically sealed" refers to a device or object that is sealed in a manner that liquids or gases located outside the device are prevented from entering the interior of the device, to at least some degree. "Completely hermetically sealed" refers to a device or object that is sealed in a manner such that no detectable liquid or gas located outside the device enters the interior of the device. It is intended that the sealing be accomplished by a variety of means, including but not limited to mechanical, glue or sealants, etc. In particularly preferred embodiments, the hermetically sealed device is made so that it is completely leak-proof (i.e., no liquid or gas is allowed to enter the interior of the device at all).

As used herein the term "processor" refers to a device that is able to read a program from a computer memory (e.g., ROM or other computer memory) and perform a set of steps according to the program. Processor may include non-algorithmic signal processing components (e.g., for analog signal processing).

As used herein, the terms "memory component," "computer memory" and "computer memory device" refer to any storage media readable by a computer processor. Examples of computer memory include, but are not limited to, RAM, ROM, computer chips, digital video disc (DVDs), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, magnetic tape, flash memory, and servers for streaming media over networks.

As used herein the terms "multimedia information" and "media information" are used interchangeably to refer to information (e.g., digitized and analog information) encoding or representing audio, video, and/or text. Multimedia information may further carry information not corresponding to audio or video. Multimedia information may be transmitted from one location or device to a second location or device by methods including, but not limited to, electrical, optical, and satellite transmission, and the like.

As used herein, the term "Internet" refers to any collection of networks using standard protocols. For example, the term includes a collection of interconnected (public and/or private) networks that are linked together by a set of standard protocols (such as TCP/IP, HTTP, and FTP) to form a global, distributed network. While this term is intended to refer to what is now commonly known as the Internet, it is also intended to encompass variations that may be made in the future, including changes and additions to existing standard protocols or integration with other media (e.g., television, radio, etc). The term is also intended to encompass non-public networks such as private (e.g., corporate) Intranets.

As used herein the term "security protocol" refers to an electronic security system (e.g., hardware and/or software) to limit access to processor, memory, etc. to specific users authorized to access the processor. For example, a security protocol may comprise a software program that locks out one or more functions of a processor until a certain event occurs (e.g., until an appropriate password is entered, authorized radio-frequency identification (RFID) tag is presented, proper biometric match is made, or the like).

As used herein the term "resource manager" refers to a system that optimizes the performance of a processor or another system. For example a resource manager may be configured to monitor the performance of a processor or software application and manage data and processor allocation, perform component failure recoveries, optimize the receipt and transmission of data, and the like. In some embodiments, the resource manager comprises a software program provided on a computer system of the present invention.

As used herein the term "in electronic communication" refers to electrical devices (e.g., computers, processors, communications equipment) that are configured to communicate with one another through direct or indirect signaling. For example, a conference bridge that is connected to a processor through a cable or wire, such that information can pass between the conference bridge and the processor, are in electronic communication with one another. Likewise, a computer configured to transmit (e.g., through cables, wires, infrared signals, telephone lines, etc) information to another computer or device, is in electronic communication with the other computer or device.

As used herein the term "transmitting" refers to the movement of information (e.g., data) from one location to another (e.g., from one device to another) using any suitable means.

DETAILED DESCRIPTION OF THE INVENTION

The present invention relates to ambulance cots, cot systems and methods of using the same. In particular, the present invention provides an ambulance cot comprising a hydraulic system and a tip angle monitoring, recording and alert system, and methods of using the same (e.g., to transport subjects and/or to detect and/or record operational data related to cot usage).

The following embodiments are provided by way of example and are not intended to limit the invention to these particular configurations. Numerous other applications and configurations will be appreciated by those of ordinary skill in the art.

Figure 2A:
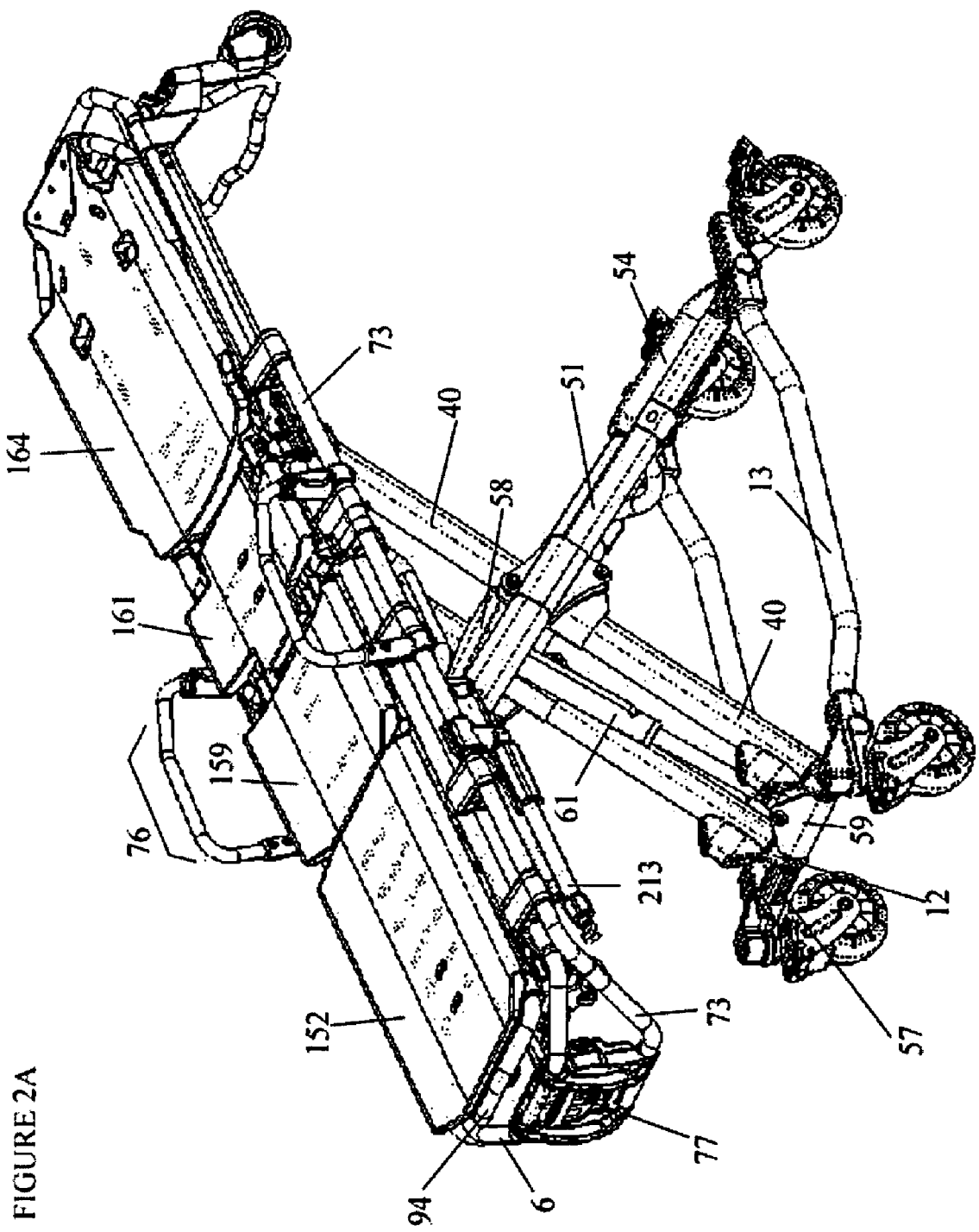
FIG. 2 shows an illustrated side view of a cot according to the invention in (A) a fully raised and (B) a fully collapsed position.
Figure 2B:
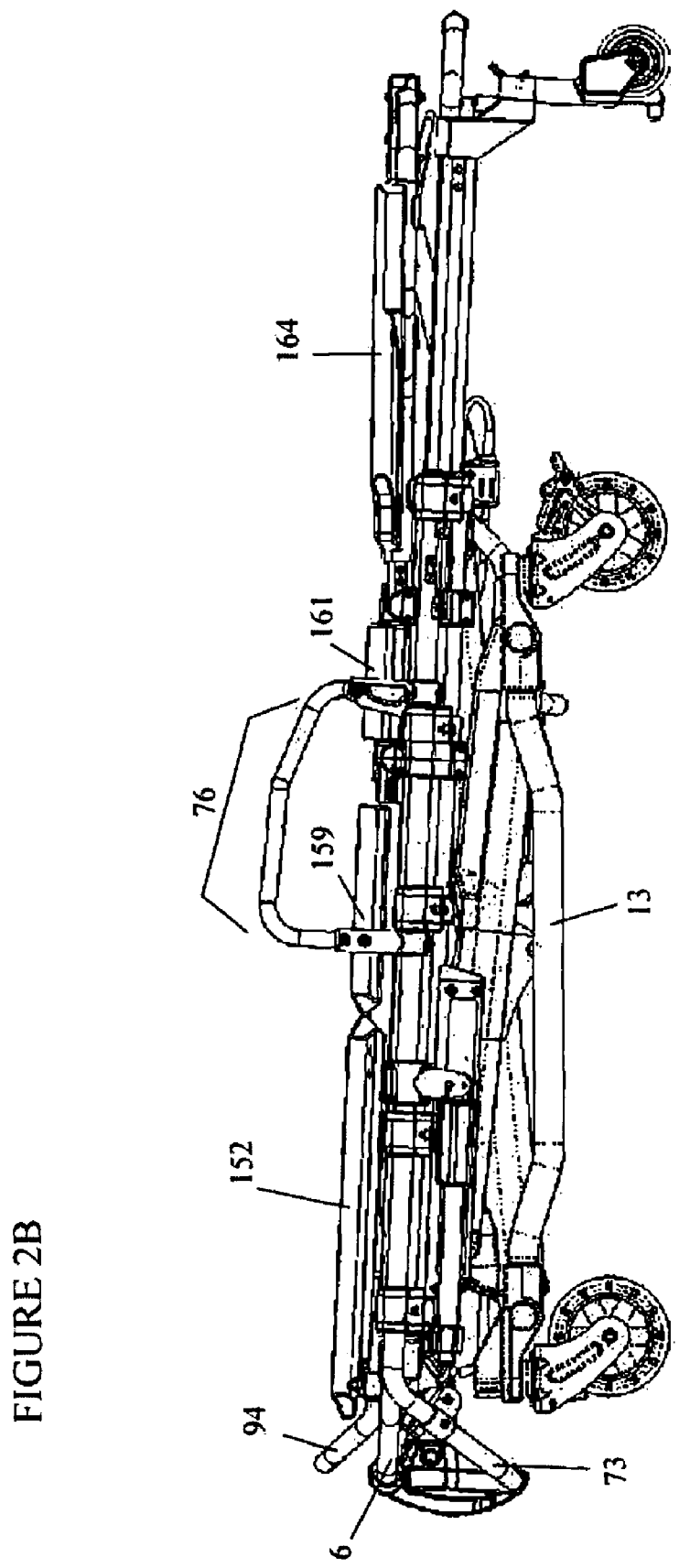
Figure 3:
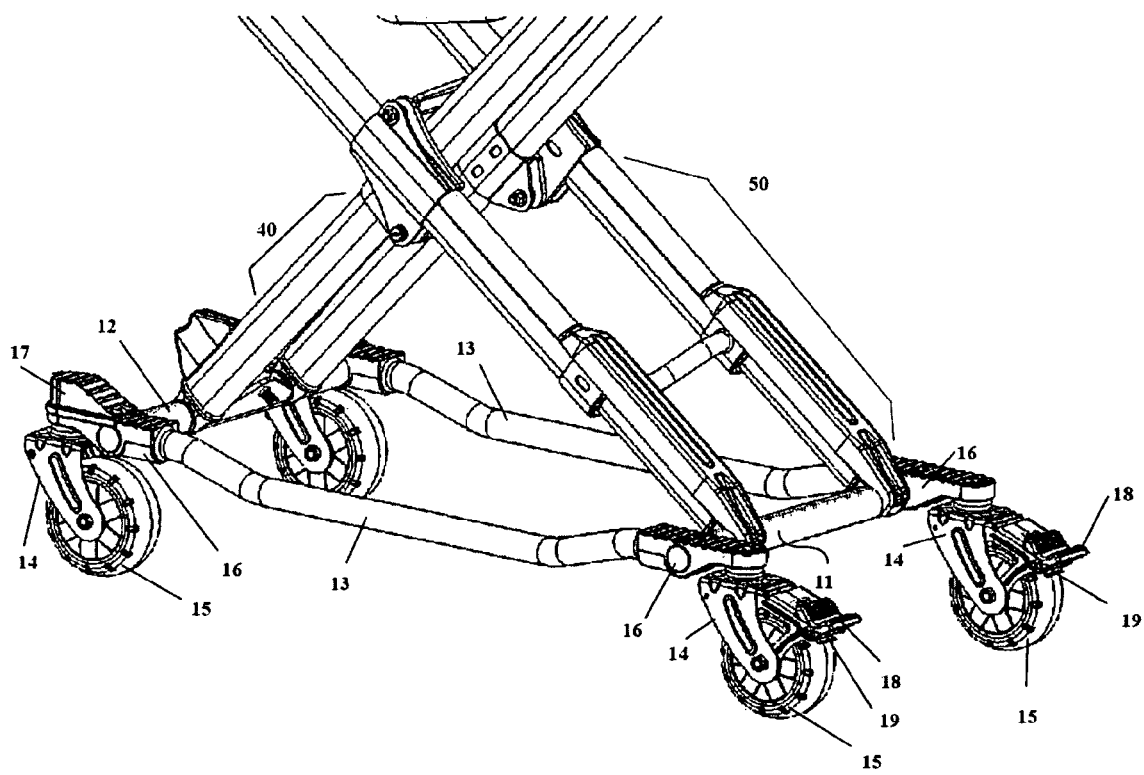
FIG. 3 shows components of the base frame, wheels and leg assemblies of a cot according to the invention.
Figure 52:
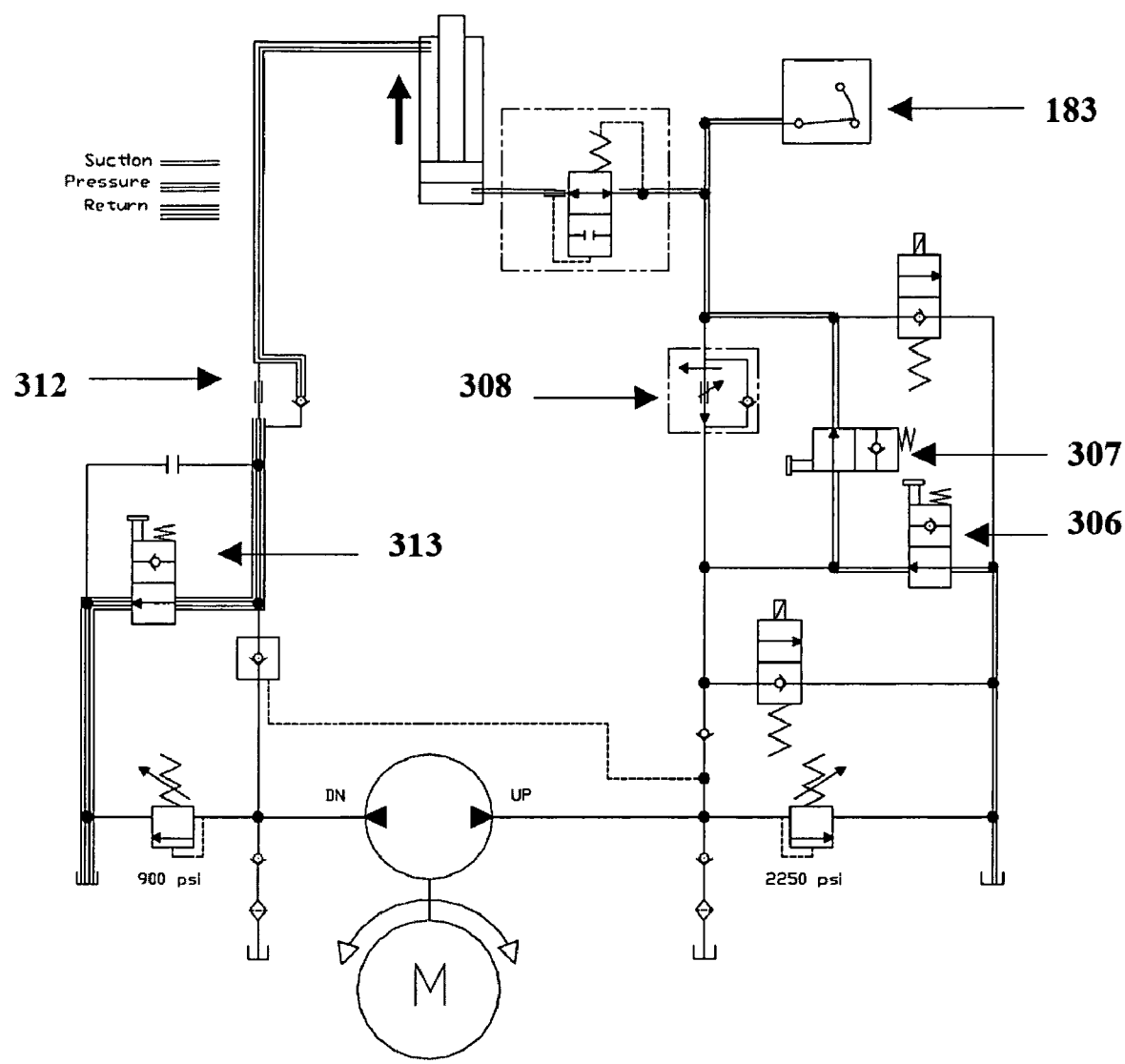
FIG. 52 shows valve configuration of a hydraulic system manifold during a manual raising of a cot via lowering the legs (e.g., with a head-end portion of the cot resting on an ambulance deck) in one embodiment of the invention.

An ambulance cot system of the present invention is depicted in the drawings. For example, an ambulance cot system 1 embodied by the invention is shown in FIGS. 1-52. In some embodiments, the ambulance cot system 1 comprises a pair of frames comprising a base frame 10 and a top frame 74 as shown, for example, in FIGS. 1 and 2. The base frame 10 includes a foot-end cross tube 12 and a head-end cross tube 11, a plurality of base connectors 16 and base side rails 13. In some embodiments, the cross tubes 11,12 are connected on each end to a base connector 16, as are the base side rails 13 (e.g., as shown in FIG. 3). The base connectors 16 provide a foot placement point (e.g., non-slip foot placement point) for a user of the cot (e.g., for placement of the user of the cot in a position above a subject upon the cot).

As shown in FIG. 3, the base frame 10 can be connected via each base connector 16 to castor forks 14 that attach to wheels 15. The present invention is not limited by the type of wheels utilized. In some embodiments, cot wheels are constructed of rubber, plastic, composite (e.g., polycarbonate), or other type of material. It is preferred that the wheel material is not too hard (e.g., thereby reducing vibration artifacts (e.g., while the cot is in motion over a surface and/or while the cot is mounted in a moving ambulance)) nor too soft or porous (e.g., such that debris (e.g., rocks, glass, mud, etc.) could collect and/or build up in and/or on the wheels). Thus, the wheels are an important component of the cot in that by decreasing vibration artifacts (e.g., by utilizing a wheel with an optimal durometer) they can reduce the risk of erroneous readings of a subject's vital signs (e.g., blood pressure, heart monitor, EKG tracings, etc.) that might otherwise occur (e.g., due to vibration artifacts that occur with use of poorly constructed wheels). In some embodiments, cot wheels comprise greaseless, sealed bearings (e.g., titanium or other metallic bearing (e.g., that prevent entrance of patient body fluids, water, snow, or other fluids). In some embodiments, the bearings provide a smooth roll of the cot and permit a user to maneuver the cot more easily (e.g., with less back twist and/or torsion). In some embodiments, wheel bearings prevent wheel wobble.

The present invention is not limited by the size of the wheels utilized. In some embodiments, the diameter of the wheels utilized is greater than 6.5 inches, although larger (e.g., greater than 6.7 inches, greater than 7 inches, greater than 7.5 inches, greater than 8 inches or larger) and smaller (e.g., diameter greater than 3 inches, greater than 4 inches, greater than 4.5 inches, greater than 5 inches, greater than 6 inches) are utilized. In some embodiments, the width of a wheel is 1-1.5 inches, 1.5-2.0 inches, 2.0-2.5 inches, 2.5-3.0 inches, 3.0-3.5 inches or larger. In some embodiments, the wheels utilized are 6.5 inches in diameter and are 2.25 inches wide. Wider wheels provide superior handling and maneuverability over rough terrain and also provide a lower initial push weight to get a cot moving (e.g., rolling). In some embodiments, cot wheels comprise a customizable trim ring on the sidewall of the wheel (e.g., that permit users (e.g., purchasers of a cot of the present invention)) to customize the cot (e.g., the wheels). In some embodiments, a user may utilize alpha numeric characters for customization (e.g., for departmental customization (e.g., City Fire, City EMS, etc.)). The trim ring and/or alpha numeric characters may be any color (e.g., thereby permitting easy recognition of a cot (e.g., thereby reducing "cot confusion" in a mass casualty or multiple service response)). In some embodiments, the wheels comprise a camber (e.g., that provides the least amount of resistance to roll while providing sufficient surface contact for maximum traction). In some embodiments, the wheels comprise a tread pattern that permits maximum traction, water, snow and/or ice displacement, and/or low resistance. In some embodiments, the wheels are utilized in the context of an independent suspension and/or traction control system. In some embodiments, wheel rotation is utilized to generate electric power and/or to charge one or more batteries associated with the cot's use.

A castor fork 14 that is connected to a cot wheel 15 is designed to prevent bearing wear at the top of the castor where it connects and rotates about a base connector 16. In some embodiments, the top castor bearing is constructed of a material that allows maximum rotation and that prevents the bearing from cracking and disintegrating (e.g., TEFLON or other suitable material known to those of ordinary skill in the art).

Figure 4A:
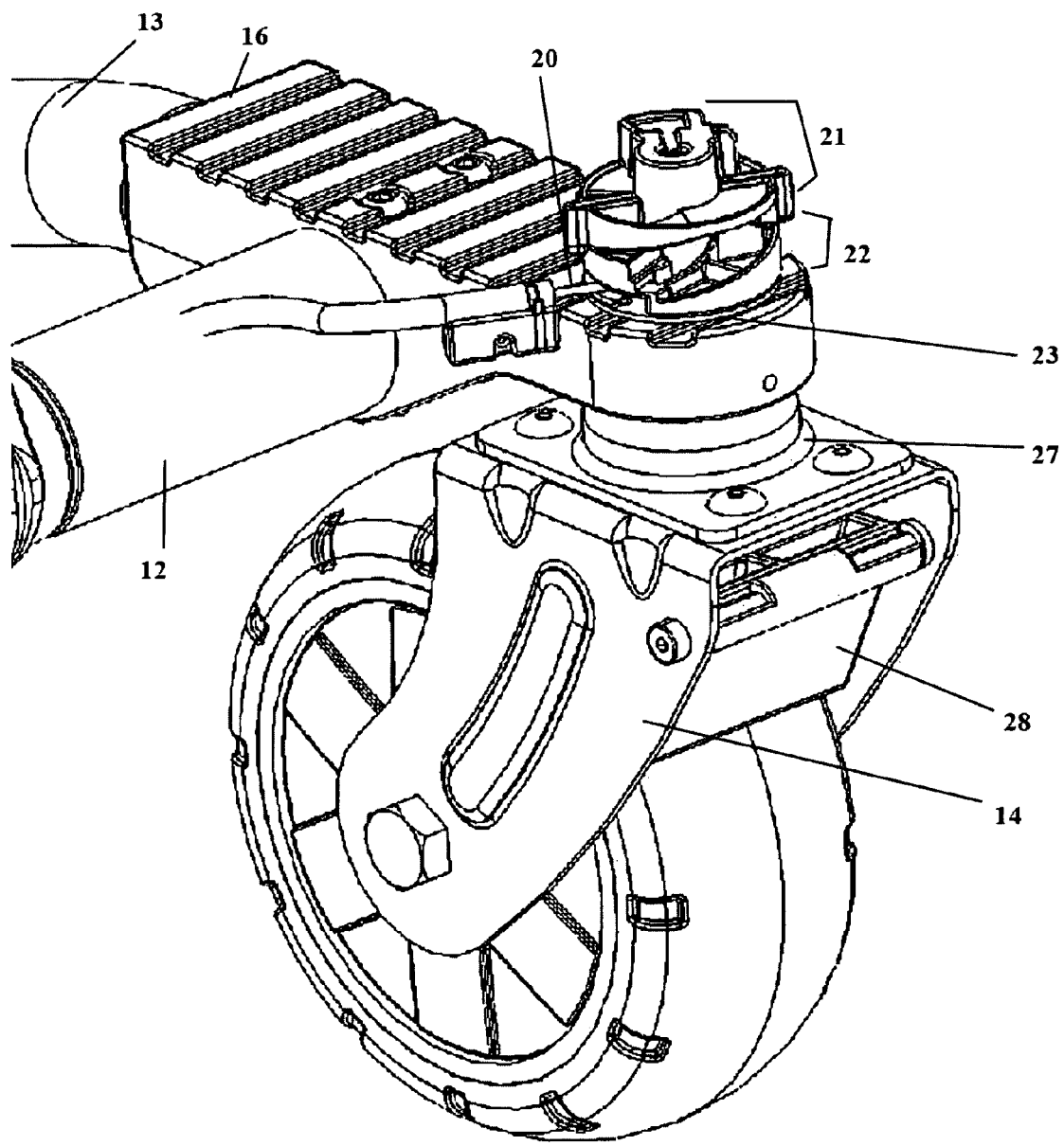
FIGS. 4A-4E show components of a hand braking mechanism of one embodiment of the invention.
Figure 4B:
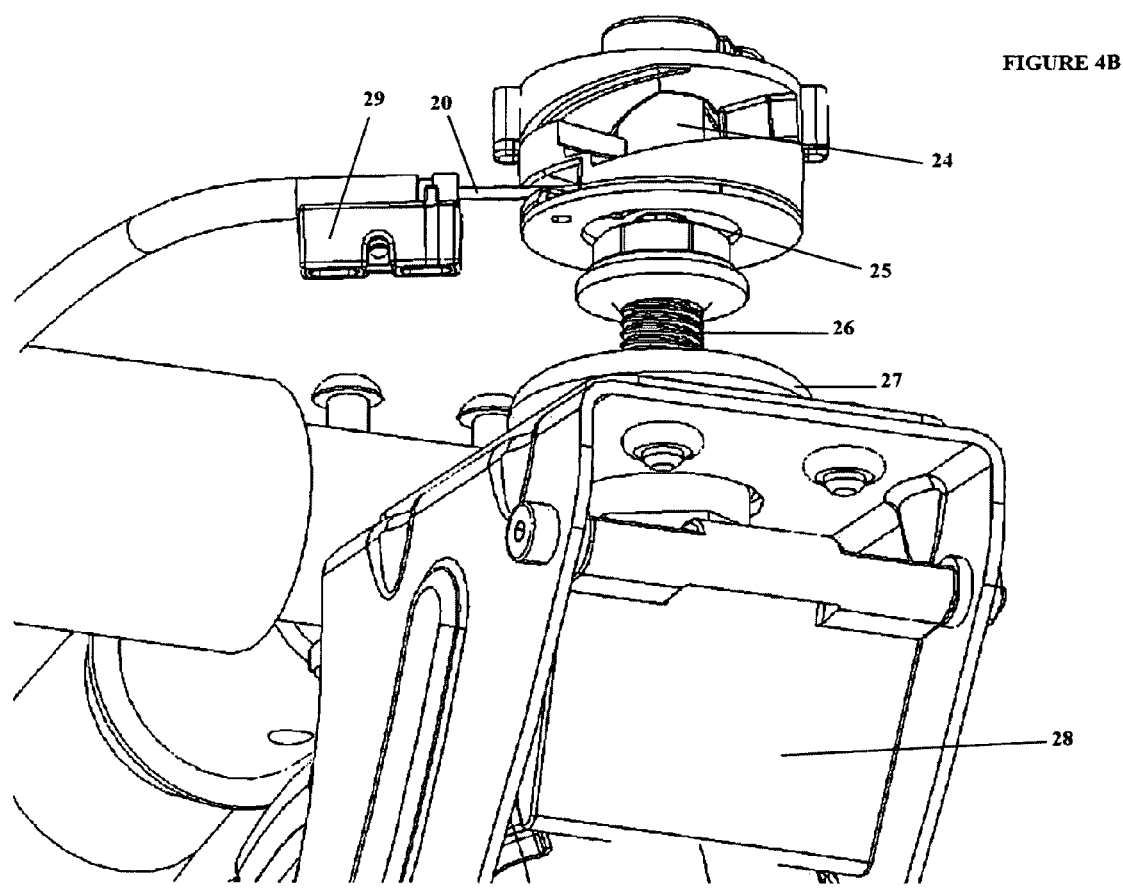
Figure 4C:
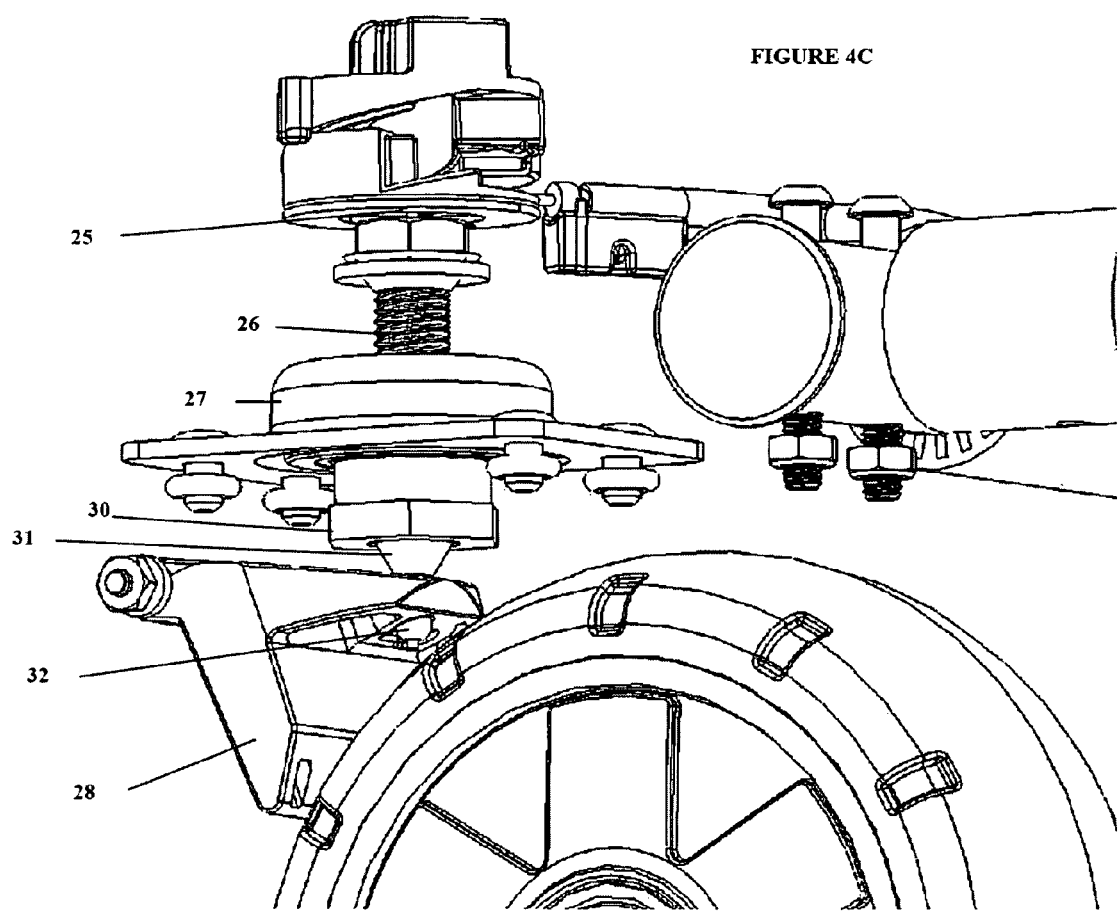
Figure 4D:
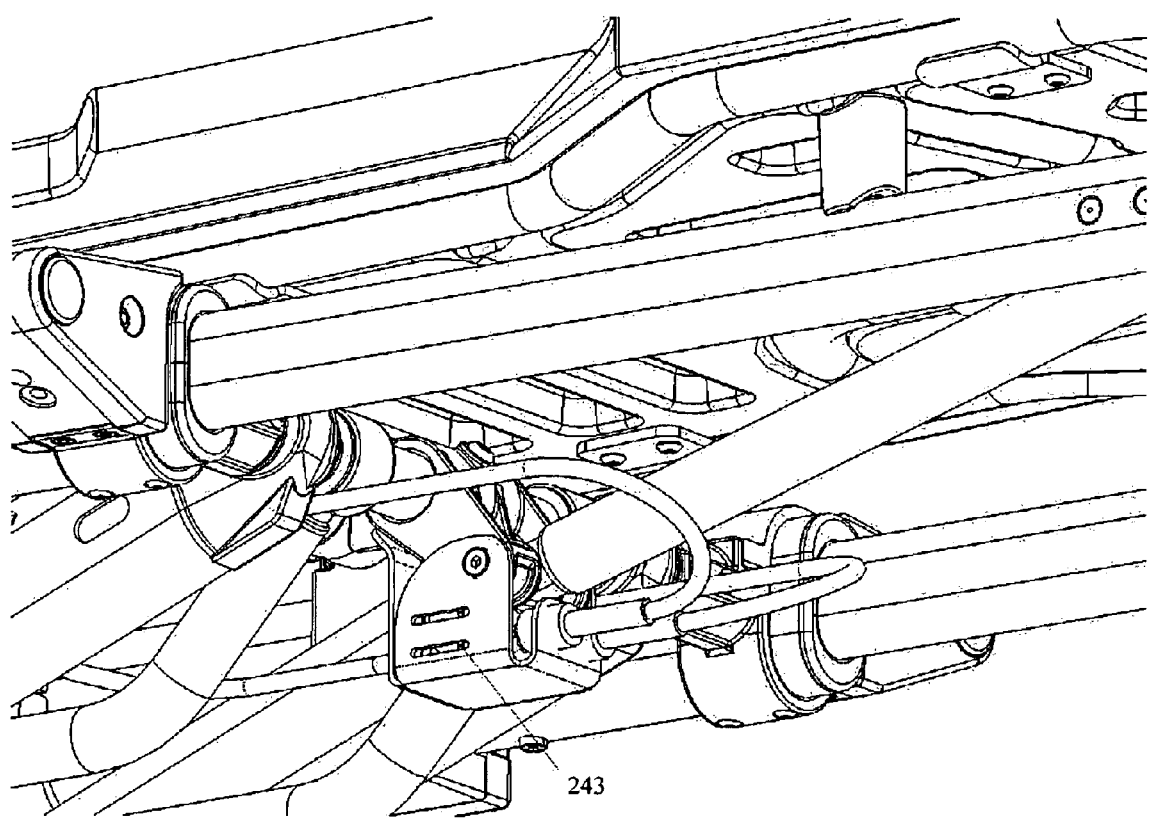
Figure 4E:
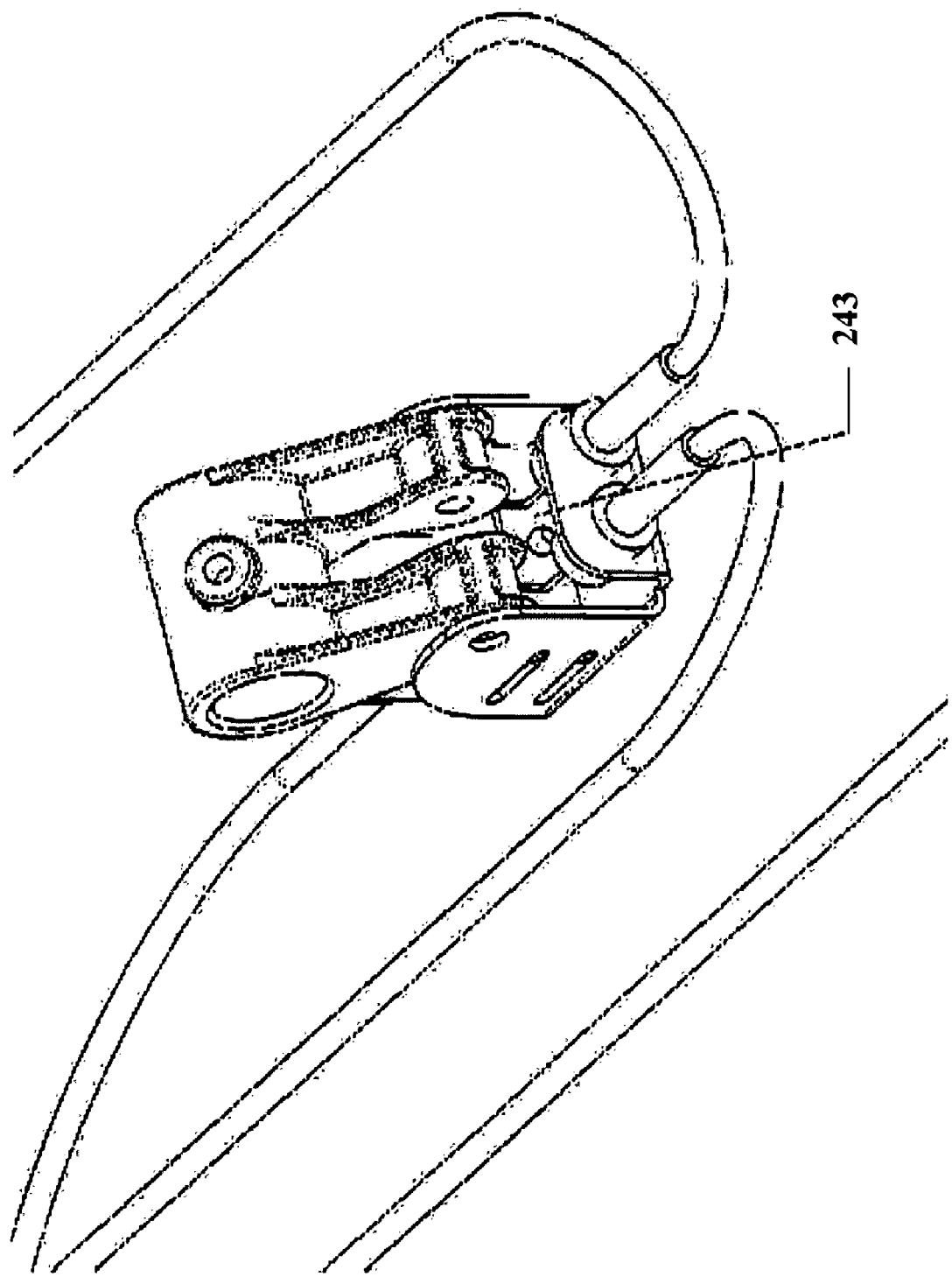
Figure 5:
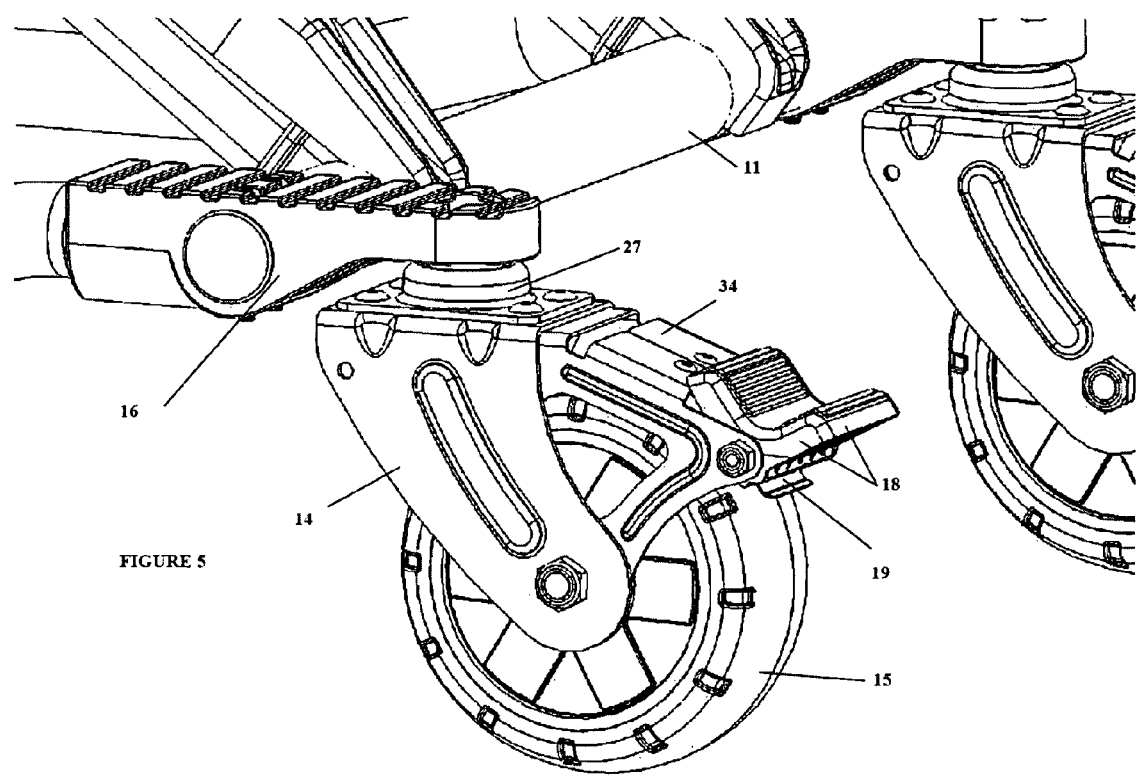
FIG. 5 shows components of a foot brake of one embodiment of the invention.
Figure 6:
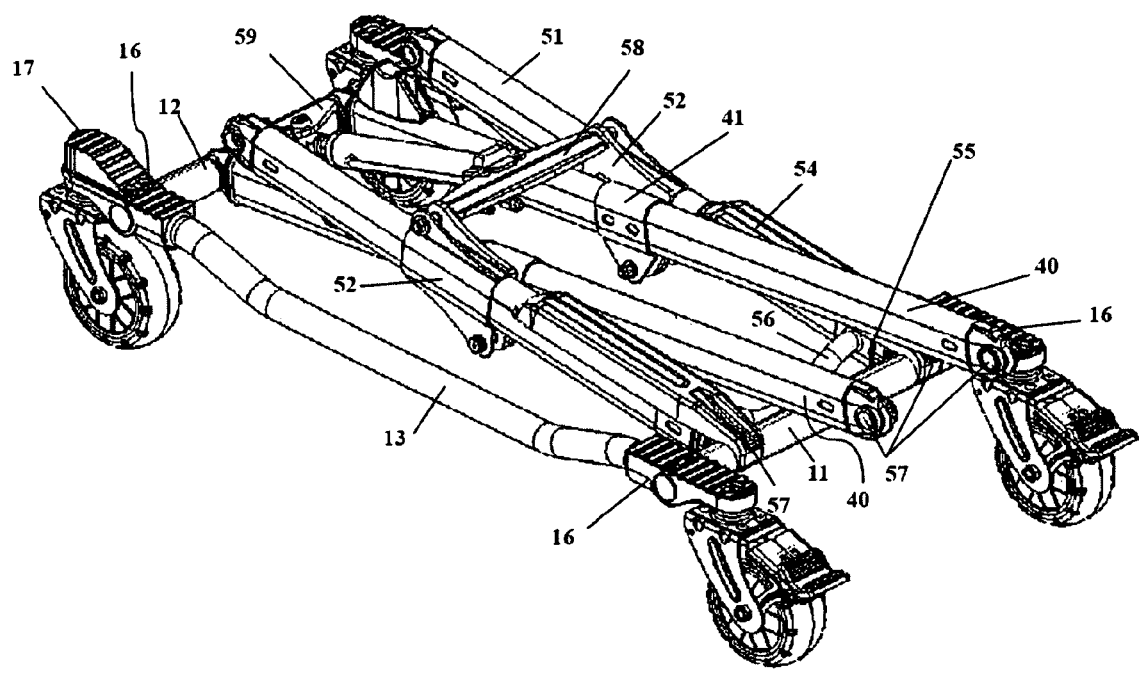
FIG. 6 shows base frame, fixed-leg assembly and telescoping leg assembly components of a cot in a fully collapsed position of one embodiment of the invention.

As illustrated in FIGS. 4A-4C, the base connectors 16 attached to the foot-end cross tube 12 can also attach to connector covers 17 that house a hand brake ramping mechanism 2. In some embodiments, the hand brakes allow a cot user (e.g., EMT, fire department personnel, etc.) to control the speed of the cot (e.g., while in motion (e.g., thereby providing unprecedented safety for a subject on the cot)). Thus, a hand brake system provided herein allows a cot to be used under conditions that no rapid stops of the cot occur (e.g., ameliorating twisting and stress placed on a cot user's back and legs) and also reduces the risk of unsafe cot speed and/or movements (e.g., thereby preventing tipping of a cot).

In some embodiments, a hand braking system provided herein works by transferring motion created by the user to the wheels, causing a temporary interference at the wheel. For example, in some embodiments, a user applies a force to a lever 208 that is connected to the hand brake lever cable 20, which allows for a linear motion to be transferred. The single hand brake lever cable 20 is connected to two other hand brake lever cables via hand brake pull block 243 that act on 2 different wheels, allowing a single lever 208 to actuate 2 separate brakes. At each wheel, the hand brake lever cable 20 is connected to a rotary ramped lifter 22 that transfers the linear motion from the cable to a rotary motion. That rotary motion is then converted back to a linear motion via the cam surface of the linear ramped lifter 21, and is lifted up. The brake arm cable 25 connects the linear ramped lifter 21 and the brake arm 28. The linear motion of the linear ramped lifter 21 is used to pivot the brake arm 28, which pivots into the outside diameter of the wheel. A hand brake ramping mechanism 2 of the invention may be configured as shown in FIGS. 4A-4C.

The hand brake lever cable 20 connects to the lever 208 via a cable stop 32 located in a pocket. The lever 208 is attached to the tube 190 by having a shoulder screw run through the lever 208 pivot. The hand brake lever mount top and hand brake lever mount bottom retain the lever by having the shoulder screw attached. The shoulder screw can be tightened, but still allow for clearance for the lever to rotate. The hand brake lever mount top and hand brake lever mount bottom are attached to the tube 190 by a screw that runs through a hole in the tube 190. The lever 208 is actuated approximately 45 degrees, and is stopped by the tube 190 to limit travel. The hand brake lever cable 20 goes to the hand brake cable mount where a threaded end of the covering sheath is attached to the plate. The threaded end allows for adjustment of the length of the hand brake cable to account for manufacturing conditions. The hand brake lever cable 20 end mounts to the hand brake pull block 243 via cable stop 32, and two other hand brake lever cables 20 are attached via cable stops 32. The force and motion of the first hand brake lever cable 20 is transferred to the second two, allowing for two brakes to be used simultaneously. The second two hand brake lever cables are attached to the same hand brake cable mount via threaded ends. The threaded ends allow for adjustment of the cable length to account for manufacturing conditions. At each wheel, the hand brake lever cable 20 pulls on the rotary ramped lifter 22 and rotates it approximately 90 degrees. The hand brake lever cable 20 is covered in a sheath that has a slotted metal end to allow for it to be located on the connector cover 17 with the hand brake cable locator 29. The hand brake cable locator 29 is riveted to the connector cover and has a tab that fits into the hand brake lever cable 20 locator slot. The hand brake lever cable 20 has a cable stop 32 on the end that is located in a pocket of the rotary ramped lifter 22. The rotary ramped lifter 22 has a slot to allow for clearance. The rotary ramped lifter 22 is housed in a connector cover 17 which constrains the outside diameter of the rotary ramped lifter 22 and the thrust washer 23 constrains the rotary ramped lifter 22. The thrust washer 23 is constrained by the base connector 16 and the connector cover 17. The thrust washer 23 is used to reduce friction of the bottom surface of the rotary ramped lifter 22. The linear ramped lifter 21 is constrained in the connector cover 17 by two tabs that do not allow for rotary motion, only linear. The cam surface of the rotary ramped lifter 22 pushes onto the linear ramped lifter 21 and moves it upwards (e.g., approximately 0.280 inches, or more) during braking. The rotary ramped lifter is biased such that the brake is relaxed (e.g., collapsed) by way of a torsion spring between linear ramped lifter and the rotary ramped lifter. The brake arm cable 25 is constrained in a pocket of the linear ramped lifter 21 by a cable stop 32 on its end, and is located at the center of the wheel caster rotation. This allows for the wheel to rotate freely without the cable becoming twisted. The brake arm cable 25 has a cable stop 32 on the other end that is constrained in a pocket of the brake arm 28. The rotary ramped lifter 22, linear ramped lifter 21, and the brake arm 28 have a sufficient hole and slot that allow for the cables to be attached to the part with the balls already swaged. The brake arm 28 pivots about a shoulder bolt. The brake arm 28 is biased such that the brake arm 28 is not in contact with the wheel unless a force is applied by the user by way of a conical spring 31 applying a force. The brake arm 28 is located such that it drags against the wheel, and not digging into the wheel (e.g., that could cause a sudden complete and un-safe stop). A conical spring 31 is used to allow for a larger range of motion. The caster wheel nut 30 is used to fasten the base connector 16 to inner raceway of the ball bearing that is pressed into the castor bracket sleeve 27. The caster wheel nut 30 has a counter bore that allows for the retention of the conical spring 31.

The present invention also provides other types of hand braking systems. For example, in some embodiments, a braking system configuration (e.g., shown in FIGS. 4A-4E) comprising a brake arm 28 utilizes replaceable pads (e.g., brake pads (e.g., thereby making maintenance easier)). In some embodiments, a hand braking system comprising a cable system as described above is utilized to actuate one or a plurality of brake arms into the side(s) of a wheel or hub (e.g., the brake arm rotates on an axis at 90 degrees compared to the configuration as shown in FIGS. 4A-4C).

In some embodiments, the present invention provides a cot comprising wheels that are easily changeable in order to adapt to a particular environment. For example, in some embodiments, a cot user may change cot wheels to a nobbied wheel for an off pavement rescue/recovery (e.g., through a corn field or forest). In some embodiments, a cot utilizes skis and/or treads (e.g., an adapted tank tread) in place of wheels (e.g., for a snow environment). In some embodiments, a cot of the present invention comprises a locking mechanism that engages a pair of wheels (e.g., the wheels on the foot-end, or the wheels on the head-end) in a fixed, straight position. This type of fixing/locking provides a means to keep the wheels, and the cot, straight (e.g., allowing the cot to track better (e.g., precluding the cot from getting sideways (e.g., on inclines))). In some embodiments, because each castor fork 14 can move independently from the others, this allows a cot of the present invention to roll forward (e.g., down or up an incline) at a sideways angle. In some embodiments, a castor fork 14 comprises an integrated spring suspension system (e.g., reducing and/or preventing vibration artifacts, increasing patient/subject comfort, and/or participating in a traction control system).

Castor forks 14 attached to base connectors 16 attached to the head-end cross tube 11 can attach to a foot brake 18 comprising a wheel brake plate 19 (e.g., as shown in FIG. 3).

As illustrated in the figures (e.g., FIGS. 3 and 8), the head-end cross tube 11 and foot-end cross tube 12 of the base frame 10 attach to leg assemblies of the cot 1. For example, the head-end cross tube 11 pivotally attaches to a telescoping leg assembly comprising a pair of telescoping legs 50, and the foot-end cross tube 12 pivotally attaches to a fixed leg assembly comprising a pair of fixed legs 40. The foot-end cross tube 12 of the base frame 10 also pivotally attaches to the hydraulic cylinder base pivot 59, a component of a hydraulic system that powers a hydraulic cot system described herein. In some embodiments, the base frame 10 may comprise a light emitting component (e.g., a light, a light tube, rope light, etc.) that illuminates the base frame and/or surrounding area (e.g., for nighttime visibility and/or daytime safety (e.g., in the event the cot is utilized to function as a "safety cone," indicator or other type of barrier)). Additionally, the base frame 10 may comprise storage plates (e.g., top mounted storage plate) and/or fasteners (e.g., for attaching other components (e.g., a resuscitation system and/or other accessories)). The base frame 10 may be utilized to house and/or support a traction control system, suspension package (e.g., independent suspension), and/or attachment components for a cot mounting system.

Figure 7:
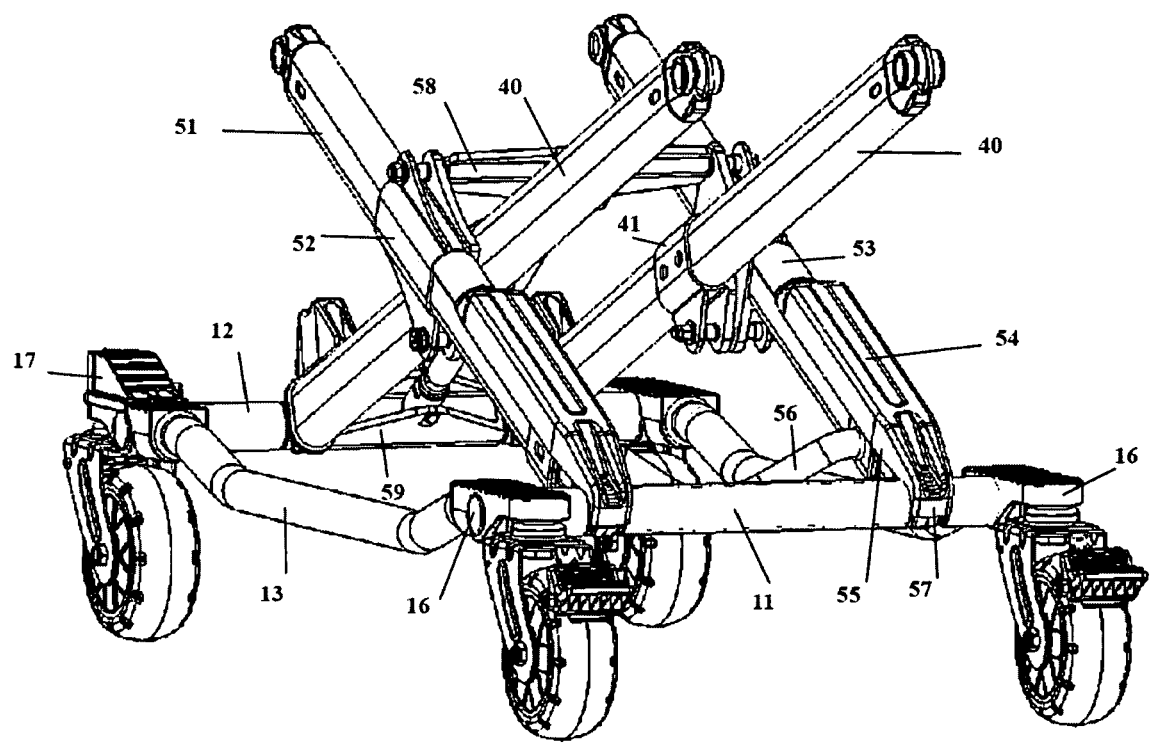
FIG. 7 shows base frame, fixed-leg assembly and telescoping leg assembly components of a cot in a position such that the a patient litter, if attached, would be in a level position of one embodiment of the invention.
Figure 8:
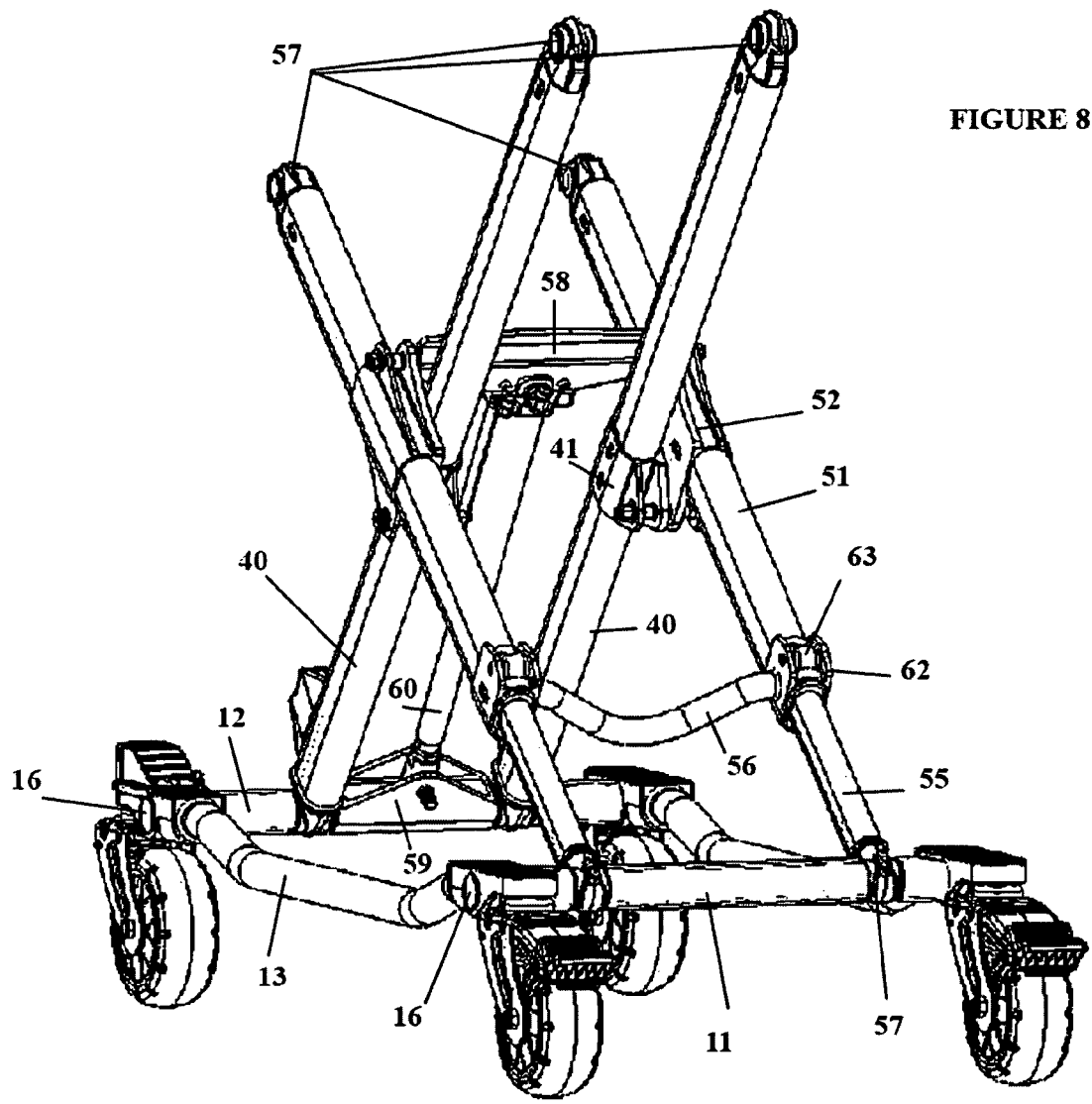
FIG. 8 shows base frame, fixed-leg assembly and telescoping leg assembly components of a cot in a fully raised position of one embodiment of the invention.
Figure 9:
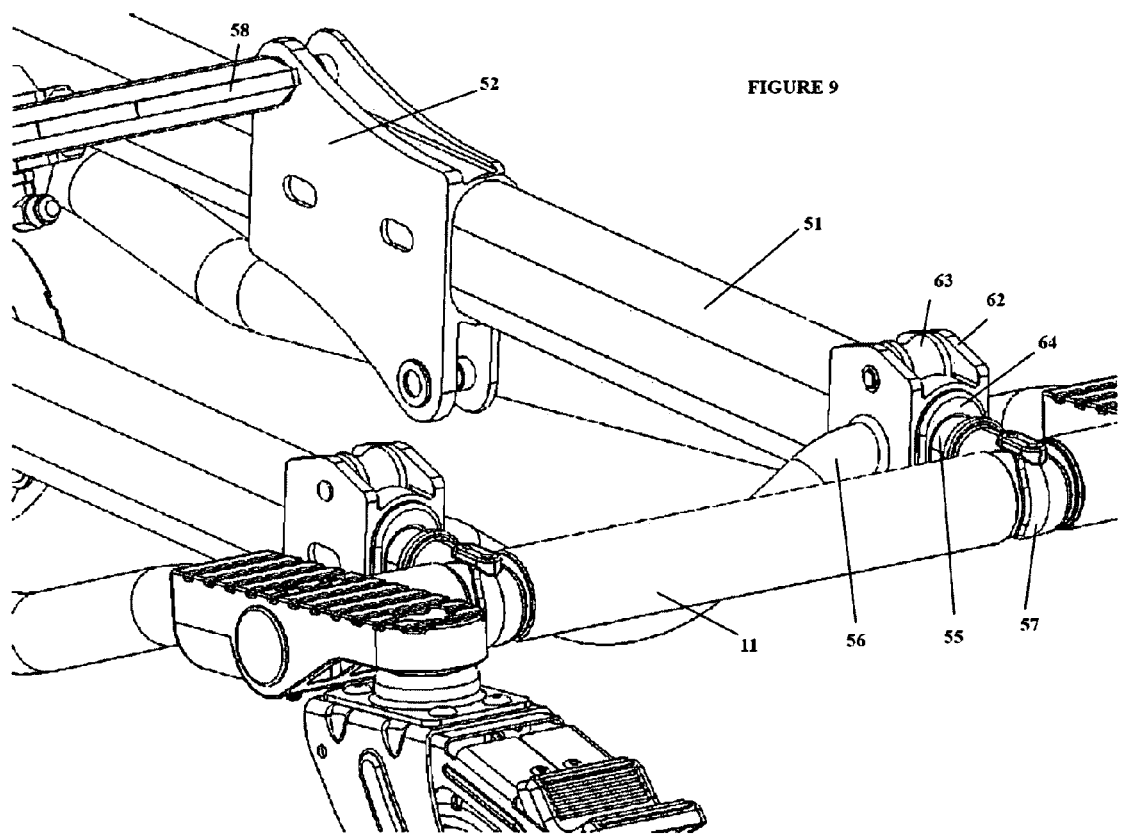
FIG. 9 shows a view of the telescoping leg assembly of a cot of one embodiment of the invention.
Figure 10:
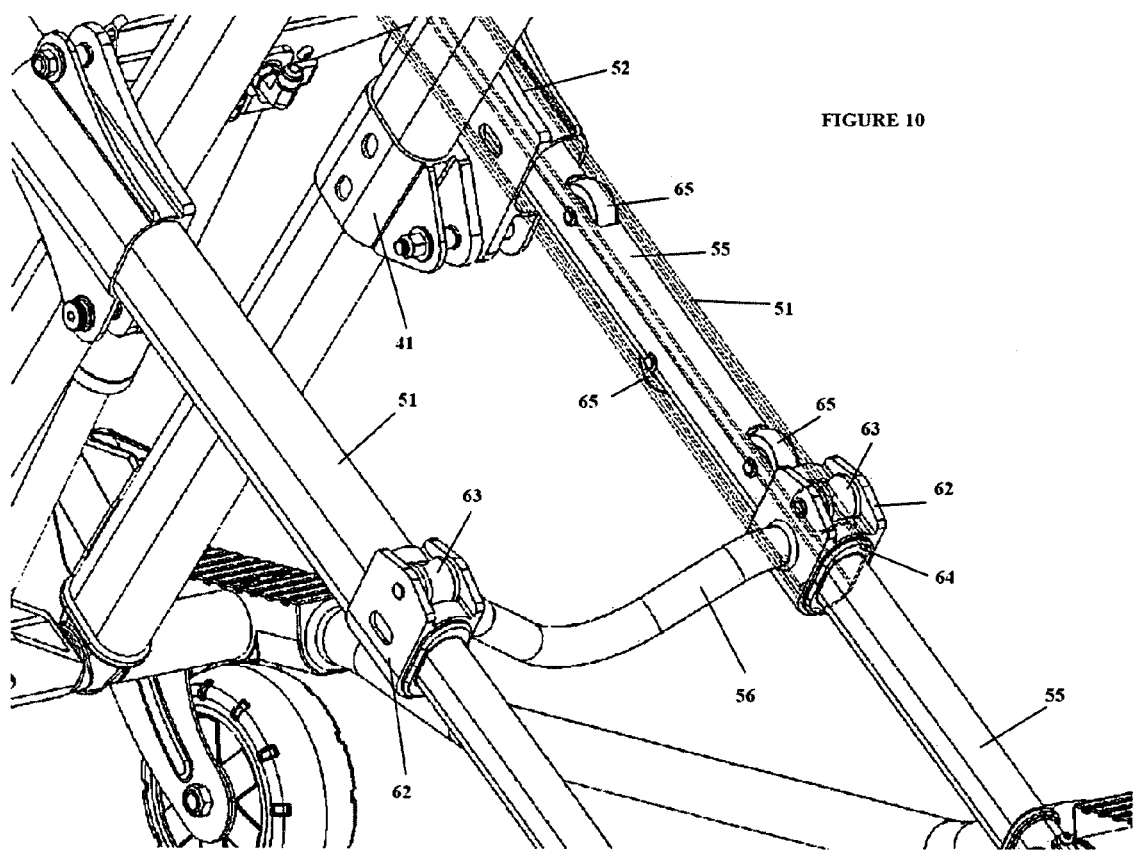
FIG. 10 shows a view of the telescoping leg assembly wherein the main rail has been made transparent (represented by the plurality of parallel lines) thereby providing a view of the inner rail and rollers attached thereto, in one embodiment of the invention.

As illustrated in FIGS. 6-11, an ambulance cot system 1 comprises a telescoping leg assembly comprising a pair of telescoping legs 50. The telescoping legs 50 comprise a main rail 51 and an inner rail 55 wherein the inner rail 55 moves in a telescoping manner within and outward from the main rail 51. Experiments were conducted during the development of embodiments of the invention in order to generate leg assemblies (e.g., that are part of a cot system (e.g., a hydraulically powered cot system 1)) that are sturdier, more robust, and more energy efficient (e.g., that provide a cot system with longer battery life, less friction and less hydraulic system pressure (e.g., providing a cot with a longer usable life and less servicing requirements than other available ambulance cots)). Thus, in some embodiments, the present invention provides telescoping legs 50 comprising a main rail 51 and an inner rail 55, wherein the main rail 51 comprises a top side and a bottom side, wherein the top side of the main rail 51 comprises an extruded portion 62 that is fastened to a roller bearing 63 (e.g., as shown in FIGS. 8-11). The extruded portion 62 comprises a roller mount for fastening a roller bearing 63. The extruded portion 62 comprises an orifice through which the roller bearing 63 extends such that it sits upon the top side of the inner rail 55, and rolls along the top side of the inner rail 55 (e.g., when the cot is raised or collapsed). As illustrated in FIGS. 8 and 10, the main rails 51 of the telescoping legs 50 are fastened to each other via a cross tube 56 that is attached to each of the extruded portions 62 of the main rails 51.

The cross tube 56 serves multiple functions in a cot system 1 of the present invention. The cross tube 56 harmonizes the movement of each of the telescoping legs 50 (e.g., the main rails 51 and inner rails 55) when a cot 1 is raised or collapsed. Additionally, the cross tube 56 steadies the cot 1 when the cot 1 is raised or lowered (e.g., by absorbing energy associated with movement about a pivot point of the cot (e.g., that occurs when a cot 1 is raised or collapsed)).

Thus, in some embodiments, the present invention provides a cot comprising a pair of fixed legs 40 and a pair of telescoping legs 50, wherein the main rails 51 of the telescoping legs 50 are fastened to each other via a cross tube 56 that is attached to each of the extruded portions 62 of the main rails 51. In the absence of the cross tube 56, raising and lowering of the cot created excessive telescoping frame flexure (twisting) leading to additional frictional forces at the telescoping legs. This in turn increased hydraulic system pressures, battery current draw, and produced a less stable cot. Experiments conducted during development of embodiments of the invention initially utilized a cot lacking the cross tube 56.

For example, a cot comprising a pair of fixed length legs and a pair or telescoping legs was tested for its ability to raise and lower weight (e.g., representing a subject). Tie rods were utilized to relieve the telescoping legs of excessive sliding friction (between inner rail and outer main rail) due to the large bending moment created by the cylinder's force about the pivot point and acting at the telescoping legs. However, the presence of the fixed length legs created a circumstance in which the tie-rods were required to expand and contract in length as the cot traveled through it's range of motion. The tie rod length and placement was determined by analyzing the cot in the retracted, level and raised positions. In each of these three configurations the tie rod was of one length. But, as the cot moved from one position to the next, the tie rod decreased and increased in length. Thus, there existed a sinusoidal effect on tie-rod length. The sinusoidal effect on tie-rod length caused excessive side loading of the cylinder rod, which in part led to breakage of a cylinder rod stud during lifting experiments conducted during embodiments of the invention.

Thus, it was determined that use of a tie rod design did not function within a cot of the present invention (e.g., comprising a pair a fixed-length legs and a pair of telescoping legs). Having two legs of fixed length precluded the use of tie rods that shared cylinder load with the telescoping legs. This in turn led to the need to develop a system that reduced the effect of the large bending moment on the telescoping legs. A roller bearing system of the present invention provides a solution to this problem.

Figure 11:
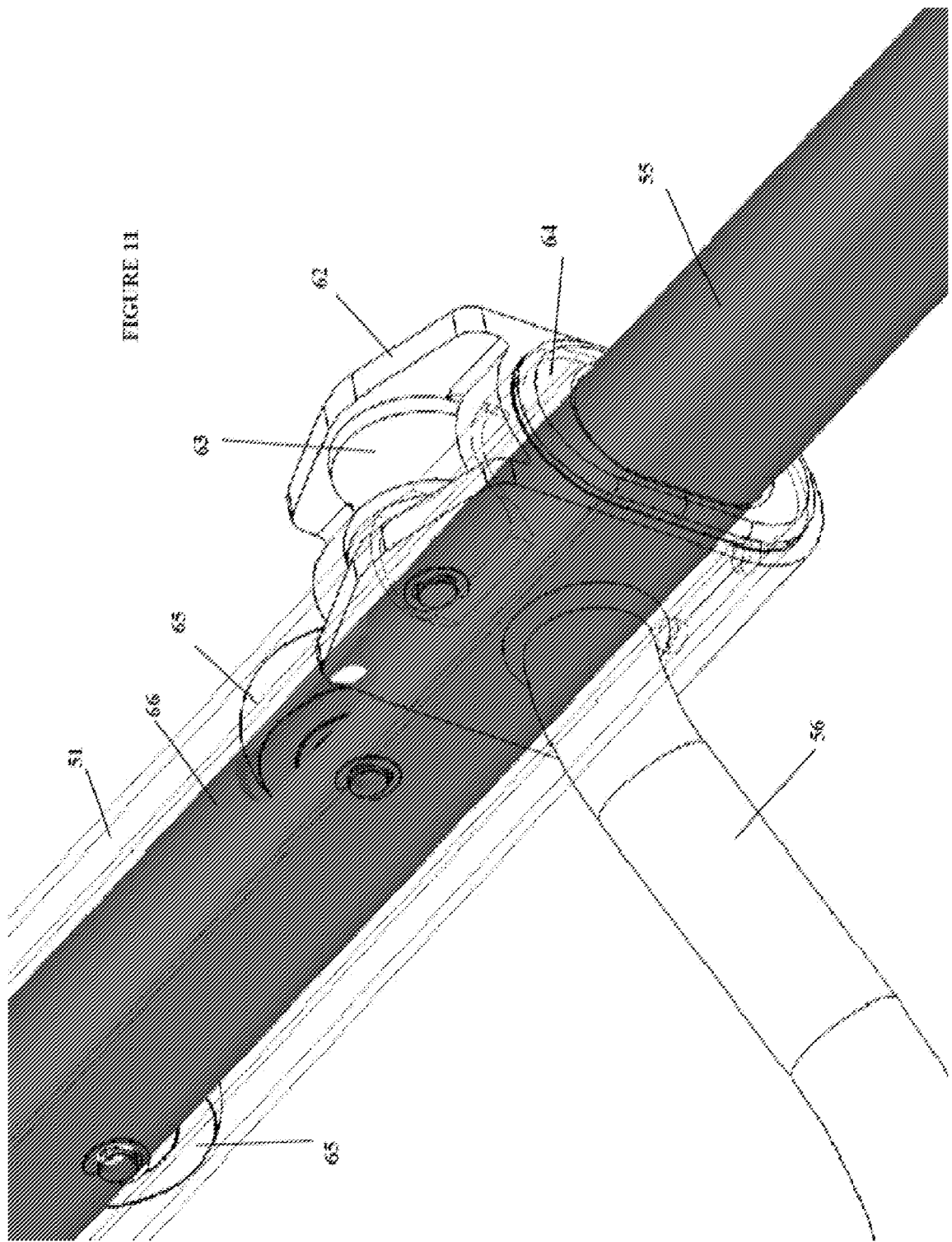
FIG. 11 shows a view of the telescoping leg assembly wherein the main rail has been made transparent (represented by the plurality of parallel lines) thereby providing a view of the inner rail (shaded) including openings therein, and rollers attached thereto and extruding therefrom, in one embodiment of the invention.

Also illustrated in FIGS. 8-11, the telescoping legs 50 of the cot system 1 of the invention comprise an inner rail 55. The inner rail telescopingly moves inside and outward from the main rails 51. As illustrated in FIGS. 10 and 11, the inner rails 55 comprise a top side and bottom side wherein one or more roller bearings 65 are connected to a top portion and one or more roller bearings 65 are attached to a bottom portion of the inner rail 55 such that the roller bearings 65 roll along the inside face of the top side and the inside face of the bottom side of the main rail 51 (e.g., when the cot is raised or collapsed). For example, FIG. 11 illustrates one configuration of a roller bearing system of the invention. The main rail 51 is shown in a transparent manner in order to visualize components of the roller bearing system within the main rail 51. For example, the inner rail 55 is shown in grey, comprising a roller bearing 65 present on a top portion (e.g., the roller bearing 65 attached to the inner rail 55 that is adjacent to the extruded portion 62 of the main rail 51) as well as a roller bearing 65 attached to a bottom portion of the inner rail 55 that rests upon and rolls along the inside face of the bottom side of the main rail 51. Thus, the present invention provides telescopic movement of the inner rails 55 along and outward from the main rails 51 made possible by the presence of roller bearings 65 attached to the inner rail 55 that roll along the inside of the main rail 51, as well as by roller bearings 63 attached to the extruded portion 62 of the main rail 51 that roll along the top side of the inner rail 55.

The present invention is not limited by the number of roller bearings 65 attached to the inner rail 55 (e.g., on a top portion or on a bottom portion of the inner rail 55). For example, an inner rail 55 may comprise two, three, four, five or more roller bearings 65 attached to a top portion of the inner rail 55 (e.g., that contact and/or roll along the inside face of the top side of the main rail 51) and/or two, three, four, five or more roller bearings 65 attached to a bottom portion of the inner rail 55 (e.g., that contact and/or roll along the inside face of the bottom side of the main rail 5 1). Similarly, the main rail 51 may comprise a plurality of roller bearings 63 attached to the extruded portion 62 of the main rail 51. For example, in addition to the roller bearing 63 attached to the extruded portion 62 of the main rail 51 shown in FIGS. 10 and 11, a cot system 1 of the present invention may comprise additional roller bearings 63 (e.g., attached to a bottom portion of the extruded portion 62 (e.g., whereby the roller bearing 63 contacts and rolls along the bottom of the inner rail 55)). In some embodiments, a roller bearing 63 attached to the extruded portion 62 of the main rail 51 comprises a concave surface (e.g., that contacts and rolls along a convex inner rail 55 surface). In some embodiments, a roller bearing 65 attached to an upper portion or a lower portion of the inner rail 55 comprises a convex surface (e.g., that contacts and rolls along a concave main rail 51 surface (e.g., the inside face of the top side or the inside face of the bottom side of the main rail 51)). The present invention is not limited by the type of material utilized for roller bearings 63, 65. Indeed, a variety of materials are well known to those of ordinary skill in the art including, but not limited to, rubber, metal (e.g., steel), plastics, composites, glass, or ceramic. In some embodiments, roller bearings 63, 65 utilized in a cot system 1 of the present invention comprise a cross section that matches the profile of the inner rail 55 and/or main rail 51 of the telescoping leg 50.

Thus, in some embodiments, the present invention provides a telescoping leg assembly 50 comprising a roller bearing system, wherein the system comprises a telescoping leg comprising a main rail and an inner rail, wherein the main rail comprises one or more roller bearings that contact and roll along the inner rail and wherein the inner rail comprises one or more roller bearings that contact and roll along the inside of the main rail (e.g., during telescoping movement of a portion of the inner rail from within the main rail to a position outside of the main rail). Thus, a roller bearing system of the present invention reduces frictional force associated with raising and/or lowering a patient on a cot (e.g., increasing or decreasing the length of the telescoping legs). As such, a roller bearing system of the present invention provides reduced hydraulic system pressure, less energy draw (e.g., decreased current drawn from one or more batteries utilized to power a system described herein), and significantly increases battery, hydraulic system and overall cot system lifespan. In alternative embodiments, a roller bearing system of the present invention utilizes any rolling means known to one of skill in the art (e.g., a polymeric roller or the like (e.g., DELRIN roller (DUPONT, Wilmington, Del.))) that reduces and/or eliminates sliding friction associated with raising and/or lowering cot legs (e.g., telescoping legs).

As illustrated in FIG. 7, a main rail 51 may be attached to one or more pieces of material that act as guards 53, 54 of the telescoping leg assembly 50 (e.g., that protect the leg assembly (e.g., from ambulance rear bumper) and that protect the exterior roller bearings). For example, the main rail may comprise a lower guard 54 and/or an upper guard 53 that protect the telescoping leg components (e.g., the main rail 51 and inner rail 55) during loading and/or unloading of a cot system 1 of the invention into or out of an ambulance. In some embodiments, each inner rail 51 that attach to the head-end cross tube 11 of the base frame 10 comprise attachment points (e.g., screw and/or mount holes (e.g., within pivot attachment points 57)) for attachment of a guard (e.g., plastic or other type of material) that protects the leg (e.g., when being loaded into and/or unloaded from the back of an ambulance (e.g., that absorbs contact forces between the cot and ambulance)).

Figure 14:
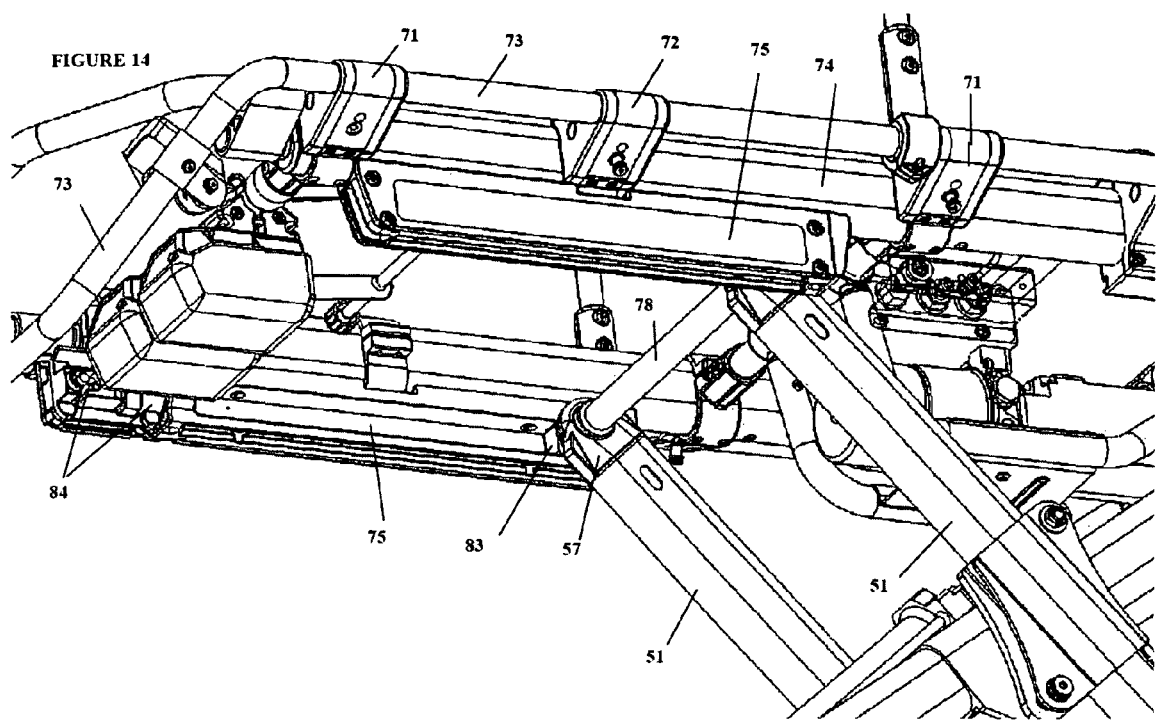
FIG. 14 shows a view of foot end components of a cot in a fully raised position, with patient litter components removed, in one embodiment of the present invention.
Figure 17:
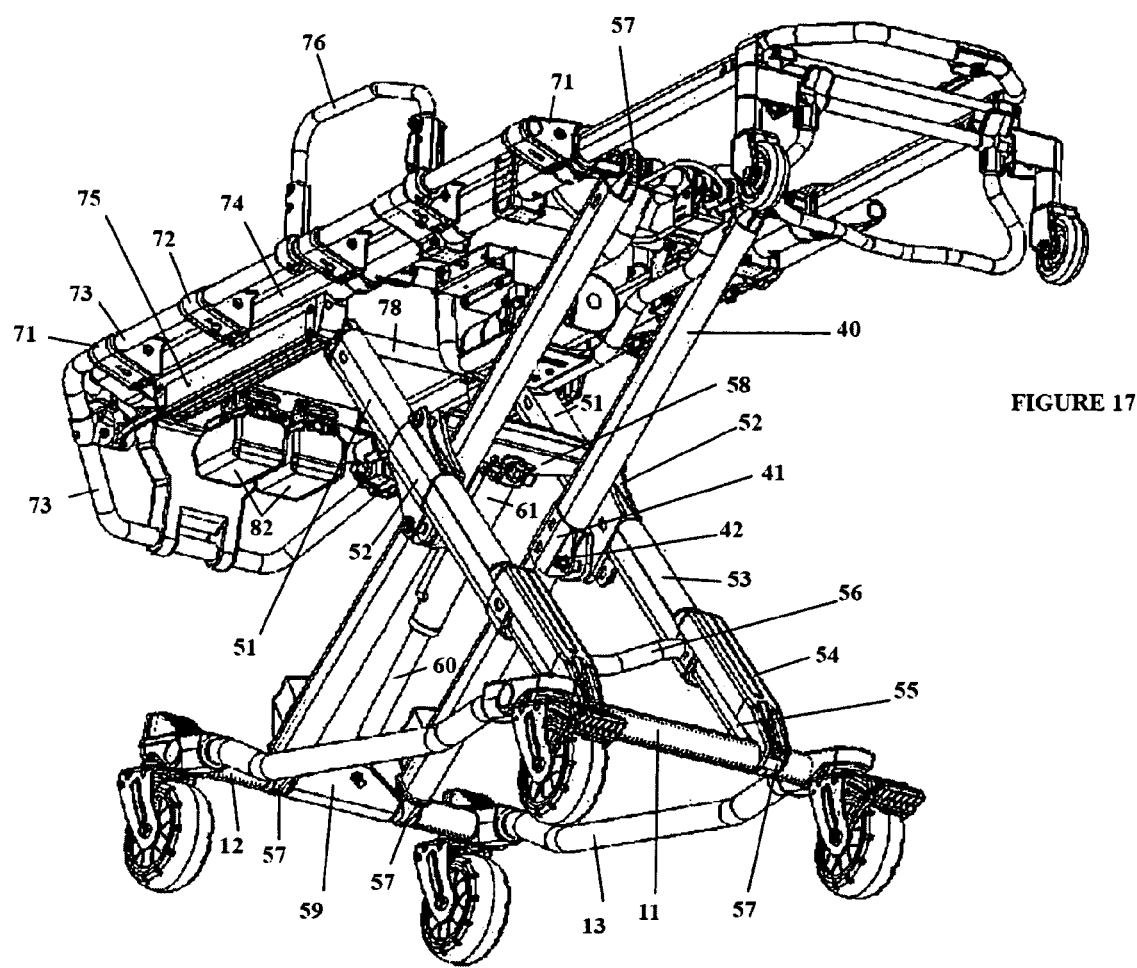
FIG. 17 shows a view of the bottom of a cot in one embodiment of the invention, including the base frame, leg assemblies, top frame and team lift rail, with patient litter components removed.

FIGS. 8 and 17 illustrate that the telescoping leg assembly 50 comprising a main rail 51 and an inner rail 55 pivotally connects to the head-end cross tube 11 of the base frame 10. In particular, the inner rails 55 pivotally connect 57 to the head-end cross tube 11 of the base frame 10. As illustrated in FIGS. 14 and 17, the main rails 51 pivotally connect 57 to a cross tube 78 residing in a slider housing 75 attached to a foot-end portion of the top frame 74.

A cot system of the present invention also comprises a fixed leg assembly comprising a pair of fixed-length legs 40 (e.g., as illustrated in FIGS. 7, 8 and 17). The fixed length legs 40 are parallel to each other and pivotally connect 57 to the foot-end cross tube 12 of the base frame 10 and a head-end cross tube 81 of the top frame 74 (See, e.g., FIG. 30). In some embodiments, a pair of fixed-length legs provide a cot of the present invention a sturdier, more robust configuration (e.g., than a cot figured without a pair of fixed-length legs (e.g., comprising two pairs of telescoping legs)). In some embodiments, a pair of fixed-length legs (e.g., independently or together with a pair of telescoping legs comprising a roller bearing system) provide a means of reducing hydraulic system pressure (e.g., pressure within and/or exerted upon hydraulic system components of a hydraulic system utilized with a cot described herein). Moreover, as described herein, a reduction in hydraulic system pressure provides a more energy efficient cot (e.g., described herein (e.g., that draws and utilizes less energy)).

Figure 12:
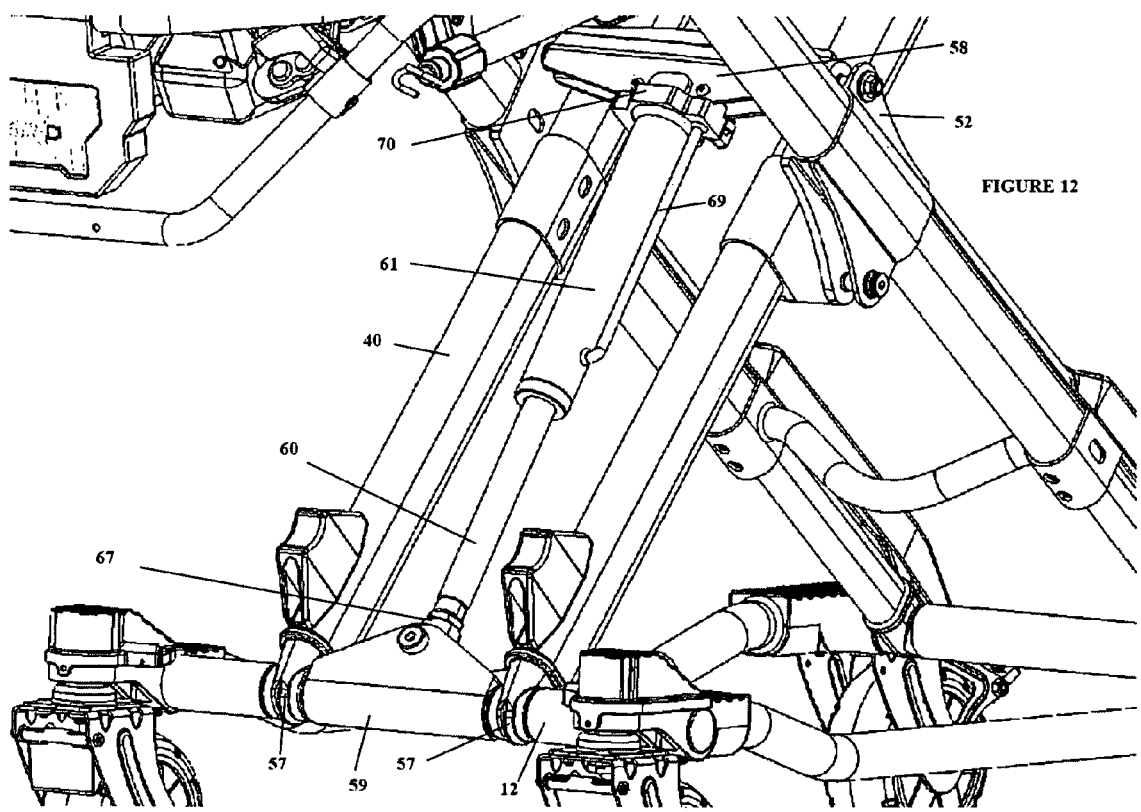
FIG. 12 shows a view of connections of some of the components of a hydraulic system of a cot in one embodiment of the present invention.

As illustrated in FIGS. 12 and 17, a pair of pivots 52 are irremoveably connected to the main rails 51 of the telescoping legs 50 and to the fixed-length legs 40. The pivots 52 are also connected to a hydraulic cylinder mount 58, that is connected a cylinder cap 70 attached to a cylinder 61 and rod 60. The rod end 67 is attached to a cylinder base pivot 59 that is pivotally connected to the foot-end cross tube 12 of the base frame 10. The configuration of a cot system 1 shown in FIGS. 12 and 17 provides leg assemblies (e.g., fixed leg and telescoping leg assemblies) that pivot about an axis that resides below the legs themselves. Thus, the present invention provides a cot pivot point that is below the legs (e.g., compared to other cots that pivot about an axis that runs through the center of the legs). In some embodiments, a configuration of a cot of the present invention (e.g., comprising a pivot about an axis that resides below the legs) provides a sturdier and more robust cot. For example, the pivot axis running below the legs allows a fixed-length leg, together with a telescoping leg, to be configured such that the cot at its fully collapsed position is low enough (e.g., comprises a litter seat height of about 15.5 inches to the ground, and at its fully raised position is high enough (e.g., comprises a load wheel height of about 36 inches to be useful (e.g., from an energy usage perspective (e.g., for loading a subject onto a cot and/or loading a cot carrying a subject onto and/or off of an ambulance)).

In some embodiments, the present invention provides a cot that comprises a position of the pivot point that satisfies certain requirements. For example, in some embodiments, a cot comprising a fixed leg assembly (e.g., comprising one pair of legs of fixed length) and a telescoping leg assembly (e.g., comprising a pair of legs with variable length) comprises a litter seat height that, at the lowest cot position (e.g., a fully collapsed position), is around 15 inches from the ground. The present invention is not limited to this height. Indeed, at the lowest cot position (e.g., a fully collapsed position), several different litter seat heights are contemplated including, but not limited to, around 9 inches, 10 inches, 11 inches, 12 inches, 13 inches 14 inches, 16 inches, 17 inches, 18 inches, or heights below or above these amounts. In some embodiments, it is preferred to keep the litter as close to "level" as possible when to cot is at its lowest (e.g., most compact) position. Accordingly, in some embodiments, some degree of "negative slope" (e.g., head lower than feet) is tolerated (e.g., due to the combination of fixed and variable length legs). In some embodiments, the negative slope of the cot when the cot is at the lowest cot position (e.g., is fully collapsed) is around 2 degrees (although lower (e.g., 1 degree or less) and higher (e.g., 3 degrees 4 degrees, 5 degrees or more) are also contemplated). Similarly, in some embodiments, some degree of "positive slope" (e.g., head higher than feet) is tolerated (e.g., due to the combination of a fixed leg assembly and a telescoping leg assembly). In some embodiments, the positive slope of the cot when the cot is at a fully raised position (e.g., when a load wheel 189 height of 36 inches or higher is achieved and/or when the litter seat height is about 43 inches and is around 12 degrees "positive slope".

In some embodiments, when the litter is in a semi-raised position to a point at which the litter is approximately parallel to the ground, the litter seat height is about 28 inches high. In some embodiments, the litter seat height will be less than 28 inches (e.g., 27, 26, 25, 24 inches or less) or more than 28 inches (e.g., 29, 30, 31, 32 or more inches) when the litter is approximately parallel to the ground. In some embodiments, having the litter seat parallel to the ground at about 28 inches from the ground helps to facilitate the transfer of a patient (e.g., to and/or from a bed, to and/or from another cot, etc.).

Thus, a cot system 1 of the present invention comprises a pivot point that is fixed about an axis residing below (e.g., that is 0.125 inches to 0.25 inches below, 0.25-0.5 inches below, 0.5-1.0 inch below, 1.0-1.5 inches below, 1.5-2.0 inches below, more than two inches below) the centerline of the legs (e.g., fixed legs and/or telescoping legs). In some embodiments, placement of the pivot point location (e.g., fixed about an axis residing below the centerline of the legs) provides a sturdier, more robust, more energy efficient and thereful a more useful cot.

Additionally, the configuration of a cot of the present invention comprising a pivot point axis residing below the centerline of the legs provides a configuration that keeps the cylinder stroke of the hydraulic system short (e.g., making the stroke stronger and less prone to breaking). For example, a cot of the present invention (e.g., comprising a pivot point axis residing below the centerline of the legs) comprises a cylinder stroke (e.g., from a fully collapsed to a fully raised position) that is less than 9 inches in length (e.g., that is 8-9 inches in length, 7-8 inches in length, or shorter (e.g., that permits a cot to raise from a fully collapsed position (e.g., a litter seat height of about 15.5 inches or lower from the ground) to a fully raised position (e.g., a maximum height of the load wheels 189 of a load rail assembly of 36 inches from the ground (See, e.g., FIGS. 1-3 and 35)))).

In some embodiments, the cot is configured to have a cylinder stroke of no more than 7.5 inches (e.g., from a fully collapsed to a fully raised position), although longer (e.g., greater than 7.5 inches) and shorter (e.g., less than 7.5 inches) cylinder stroke lengths are contemplated. Experiments conducted during development of embodiments of the invention identified cot configurations (e.g., comprising a telescoping leg assembly (e.g., comprising a roller bearing system) together with a fixed leg assembly, and a hydraulic system described herein) that utilizes a preferred cylinder stroke length of about 7.5 inches.

Set-backs were encountered during development of embodiments of the invention (e.g., involving breakage of the cylinder rod stud (9/16 inch)) in that initial cot configurations suffered from excessive side loading of the cylinder rod caused by a sinusoidal effect encountered with tie-rod length and cylinder rod characteristics. Prior to development of embodiments of a cot of the present invention comprising a roller bearing system, it was determined that excessive side loading of the rod was due to frame flexure and frictional forces that led to telescoping legs binding and the cylinder mounts flexing. Cylinder pivot mounts and the cylinder rod mounts were bending and being deformed. Only through development and deployment of a roller bearing system of the present invention was it possible to eliminate side-loading of the cylinder rod (e.g., caused by frictional force as well as the tie-rod sinusoidal effect. Additionally, it was further determined that using a cylinder rod with a diameter greater than 5/8 inch (e.g. 1 inch) allowed an increase in the size of the threaded stud (e.g., to 5/8 inch thread) in the cylinder rod (e.g., providing a more robust system (e.g., complementing and/or enhancing a roller bearing system described herein)).

Figure 63:
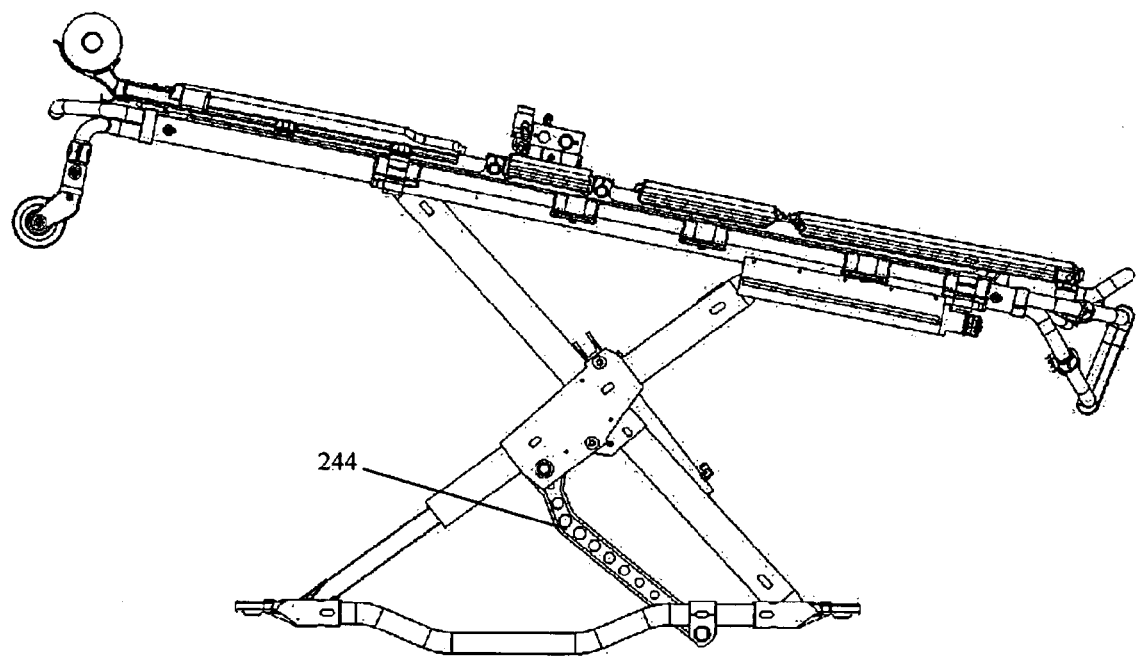
FIG. 63 shows a diagram of components of a cot generated and tested in one embodiment of the invention.
Figure 64:
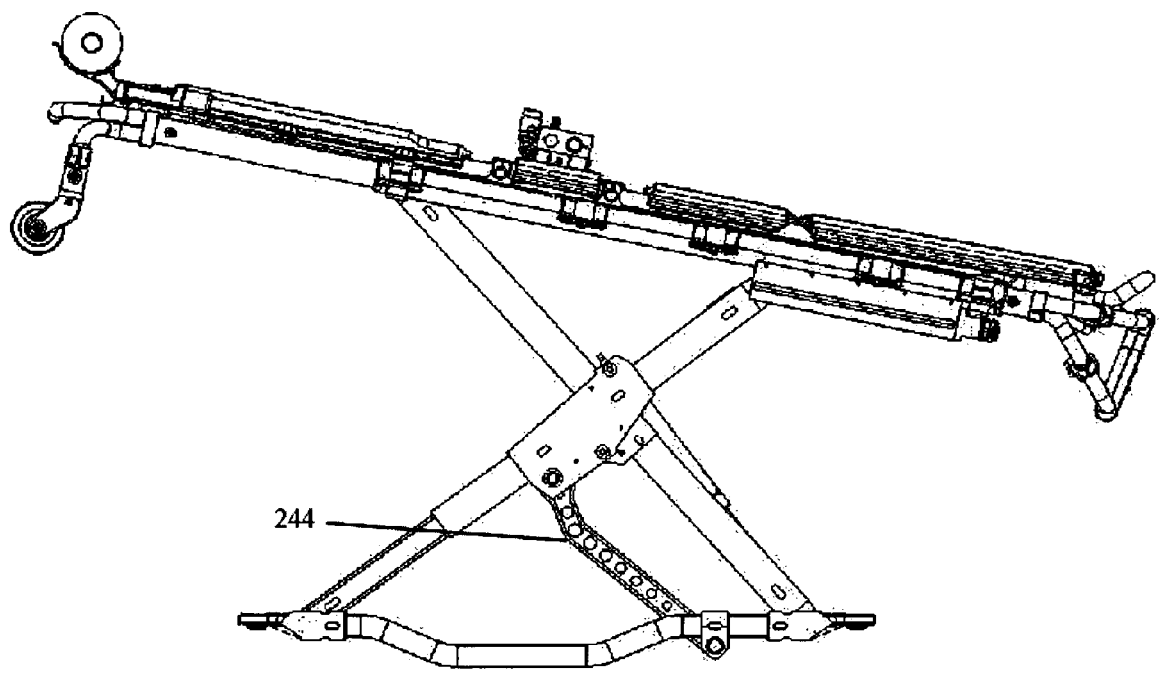
FIG. 64 shows a diagram of components of a cot generated and tested in one embodiment of the invention.
Figure 65:
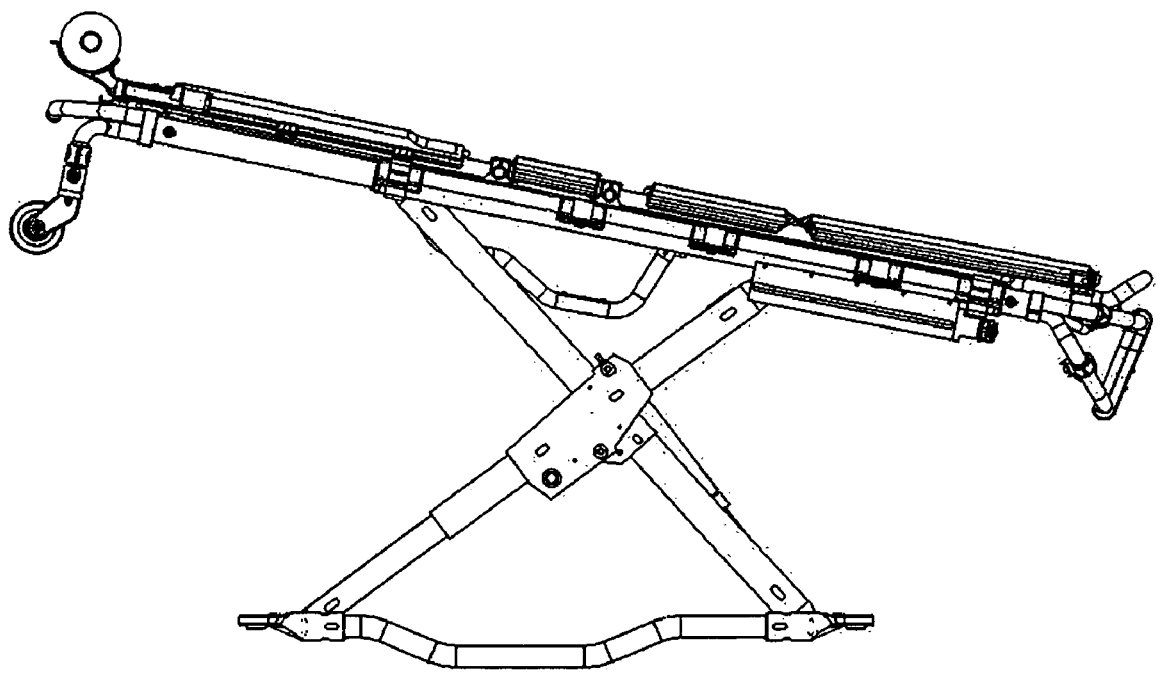
FIG. 65 shows a diagram of components of a cot generated and tested in one embodiment of the invention.
Figure 66:
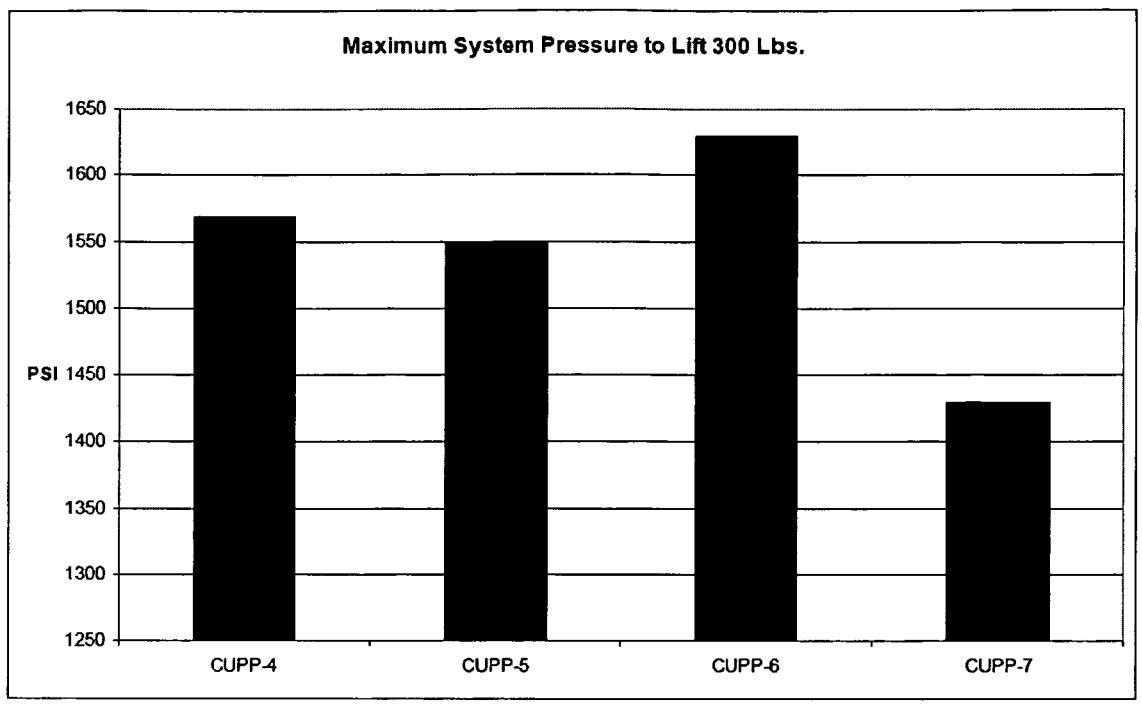
FIG. 66 shows a table of the maximum system pressure recorded during a hydraulically powered lift of 300 pounds using various cots generated and tested in embodiments of the invention.

For example, a significant change in system pressure for a 300 pound lift was observed among different cot configurations generated and tested during development of embodiments of the invention. FIG. 66 shows the maximum system pressure recorded during a hydraulically powered lift of 300 pounds. CUPP-4 shows the maximum system pressure (pounds per square inch (PSI)) recorded using a hydraulically powered cot comprising one pair of fixed legs, one pair of telescoping legs, and a pair of tie rods 244, as well as a cylinder comprising a 5/8 inch diameter cylinder rod (e.g., as shown in FIG. 63) that lifted weight to a height of 32 inches from the ground to the center of the load wheels. Surprisingly, as the height of the litter increased so did the system pressure and energy needed to raise the cot (e.g., system current). CUPP-5 shows the maximum system pressure recorded using a hydraulically powered cot comprising one pair of fixed legs, one pair of telescoping legs (without a roller bearing system), and a pair of tie rods 244, as well as a cylinder comprising a 1 inch diameter cylinder rod mounted to a redesigned cylinder mount(e.g., shown in FIG. 64) that lifted weight to a height of 37 inches from the ground to the center of the load wheels. As the height of the litter increased so did the system pressure and energy needed to raise the cot (e.g., system current). CUPP-6 shows the maximum system pressure recorded using a hydraulically powered cot comprising one pair of fixed legs, one pair of telescoping legs (without a roller bearing system), where the telescoping legs were designed to be 3.5 inches longer than the legs of CUPP-5 to increase spacing between the bushings, as well as a cylinder comprising a 1 inch diameter cylinder rod (e.g., shown in FIG. 65) that lifted weight to a height of 37 inches from the ground to the center of the load wheels.

Each of these configurations, CUPP-4, CUPP-5, and CUPP-6 suffered from high system pressures (e.g., required to raise a cot bearing weight) corresponding to a high current draw (e.g., leading to excessive battery drain, shortened battery life). For example, although the target for each of these cots had been a peak current draw of 40 amps, each of these configurations yielded current draws of 50 amps. Moreover, as described above, the increased system pressure resulted in a significantly higher load force translated to the frame assembly, thereby causing instability in the cot frame and even breakage of a cot cylinder rod stud.

Figure 67:
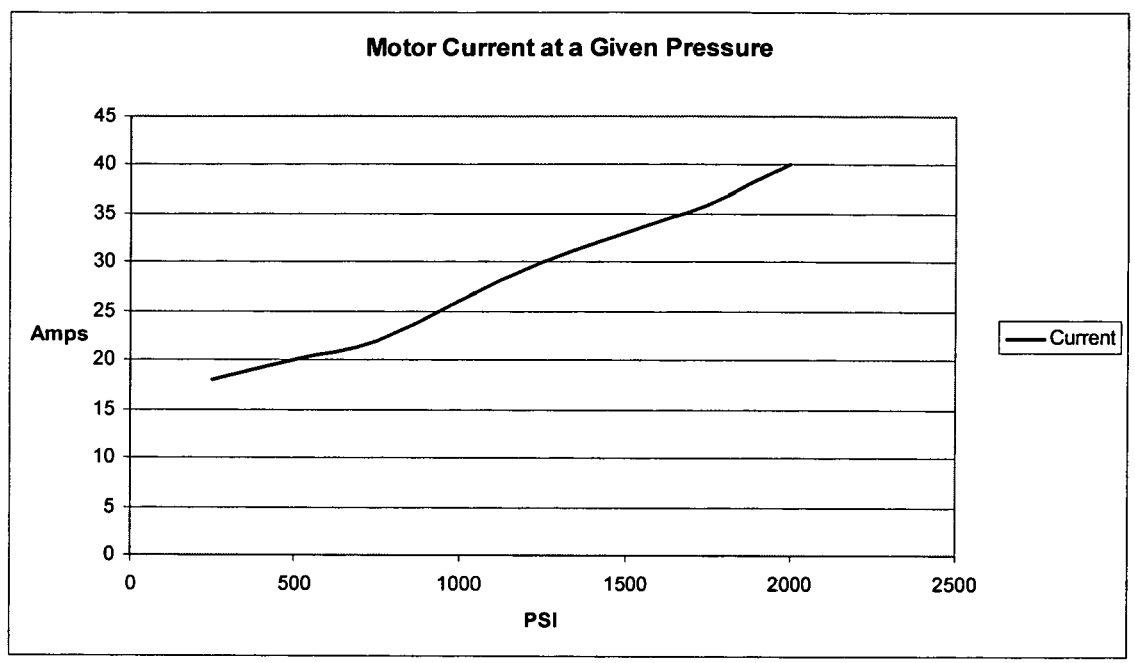
FIG. 67 shows a table depicting how hydraulic system pressure correlates with energy consumption.
Figure 68:
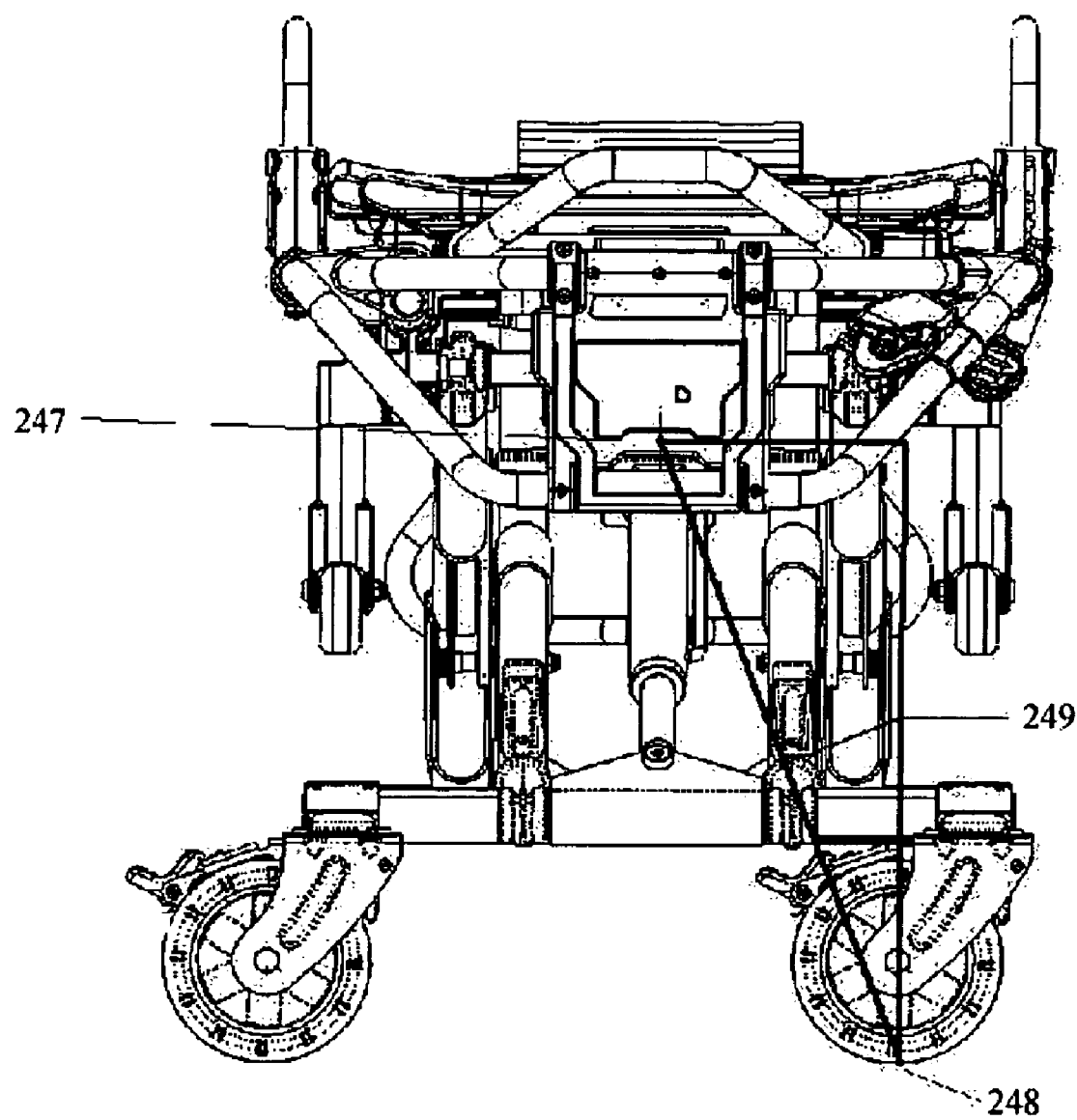
FIG. 68 shows a diagram depicting tip angle of a cot comprising a tip angle monitoring, recording and alert system of the present invention.

Only after breaking the cylinder rod stud of the hydraulic system as described above was it determined alternative methods needed to be generated to displace the weight and forces experienced (e.g., friction) by the fixed and telescoping leg assemblies. Although stronger cot frame components were tested, these components led to an undesirable increase in weight of the cot, and were unable to address large energy draw required to raise the cot. These setbacks led to the development and deployment of the roller bearing system within the telescoping legs of the present invention. As shown in FIG. 66, a cot comprising a pair of fixed length legs and a pair of telescoping legs comprising a roller bearing system as described herein was determined to significantly reduce the friction associated with the translation of inner rails 55 relative to the outer main rails 51 while raising the legs (e.g., performing a lift) thereby providing a stronger, more robust cot (See, e.g., FIG. 66, CUPP-7). Moreover, the reduced friction provided by a cot comprising a pair of fixed length legs and a pair of telescoping legs comprising a roller bearing system as described herein resulted in lower hydraulic system pressure required for raising the cot (e.g., raising a given load with the cot (e.g., providing a stronger, more capable cot)). As shown in FIG. 67, lower hydraulic system pressure resulted in lower battery power consumption and thus, longer battery life (e.g., a cot that can be used for a greater period of time without need for recharging and/or replacement of the batteries).

Additionally, minimizing stroke length required of the cylinder (e.g., for a given bore) reduced the amount of hydraulic fluid transferred when raising and/or lowering the cot (e.g., with or without a subject loaded thereon). Thus, the present invention provides a cot system comprising minimized hydraulic fluid transfer (e.g., resulting in shorter lift times, less energy draw from the batteries and therefore longer battery life).

Figure 13:
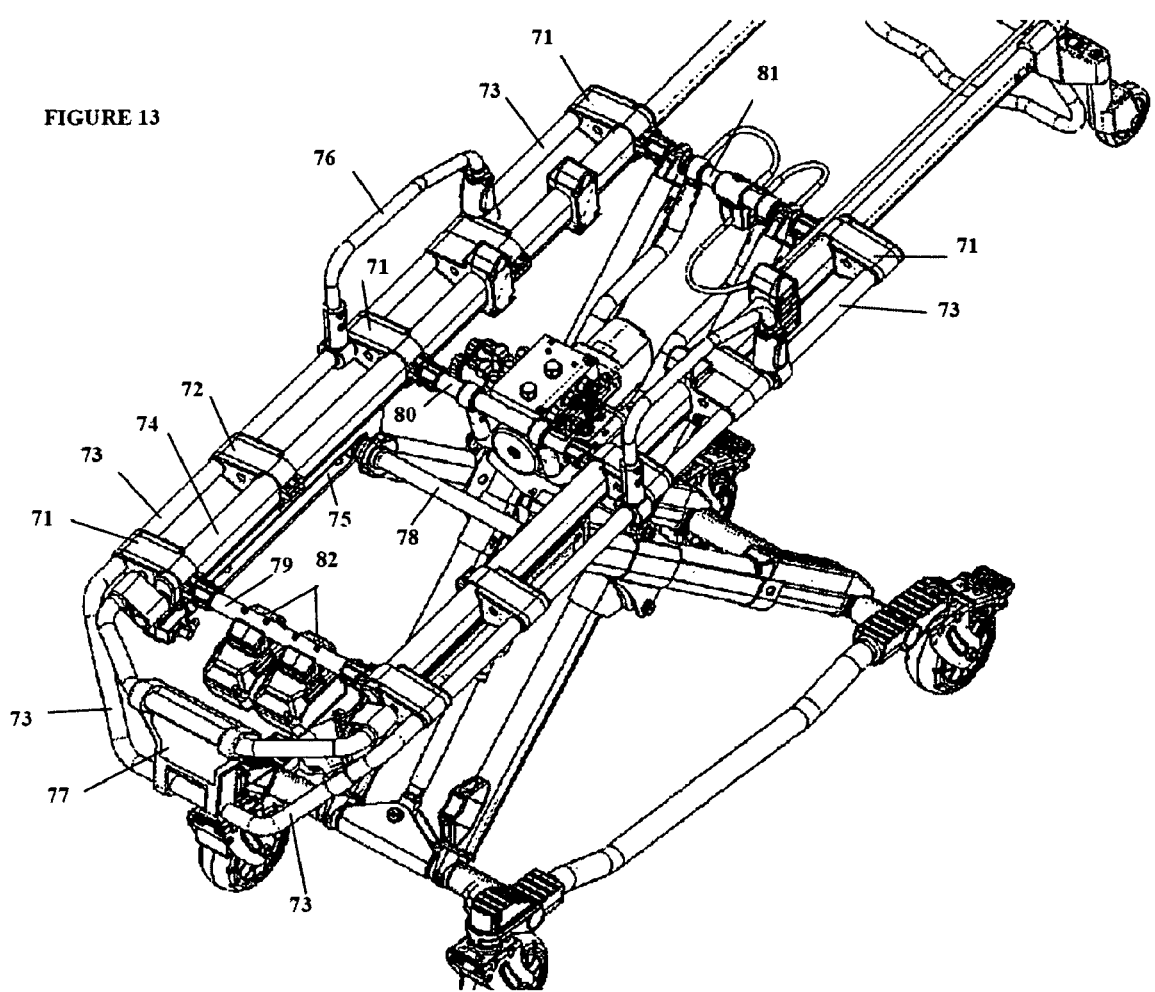
FIG. 13 shows a view of the top of a cot in one embodiment of the invention, including the top frame and team lift rail, with patient litter components removed.

FIGS. 13-17 illustrate a top frame 74 and components connected thereto and/or part thereof of a cot system of the present invention. As illustrated in FIG. 13, foot end portions of the top frame 74 are attached to slider housings 75. The slider housings 75 are configured to hold a cross tube 78 attached to the main rail 51 of the telescoping legs 50. As shown in FIG. 14, the cross tube 78 is connected on both ends to slider blocks 83 that slide within the slider housing 75. As described below, this configuration provides determination of cot height information used in a cot tip angle monitoring, recording and alert system of the present invention. FIG. 13 further illustrates that the top frame 74 comprises a foot-end cross tube 79, a middle region cross tube 80 and a head-end cross tube 81, wherein the cross tubes 79, 80, 81 are fastened to cross tube castings 71 that are fastened to the top frame 74. The top frame 74 fastens to a team lift rail 73 via cross tube castings 71 and team lift mount extrusions 72 that comprise an orifice into and/or through which the team lift rail 73 extends. The team lift rail 73 surrounds the foot end region and both sides of the top frame 74. The foot end portion of the team lift rail 73 provides a location for attachment of a control panel (e.g., user interface) 77 of the cot system 1. The control panel may also be attached to a foot end rail/lift handle 6 attached to the foot end of the top frame 74.

Various components attach to the top frame 74. For example, as shown in FIG. 17, the top frame 74 attaches to a telescoping load rail assembly 4 comprising wheels 188 (e.g., utilized for rolling the cot out of and into an ambulance deck). As shown in FIGS. 35-38, the wheels 188 are pivotally attached to the load wheel forks 191 which are fastened to the load wheel casting 185. The load wheel castings are attached to the load rail 184 via fasteners 197. The load rail bushings 203 attached to the load rail 184 provide a hard stop against a cap on the top frame fastened to the end of the main rail 74, to prevent the load rail assembly from being pulled completely out.

Figure 36:
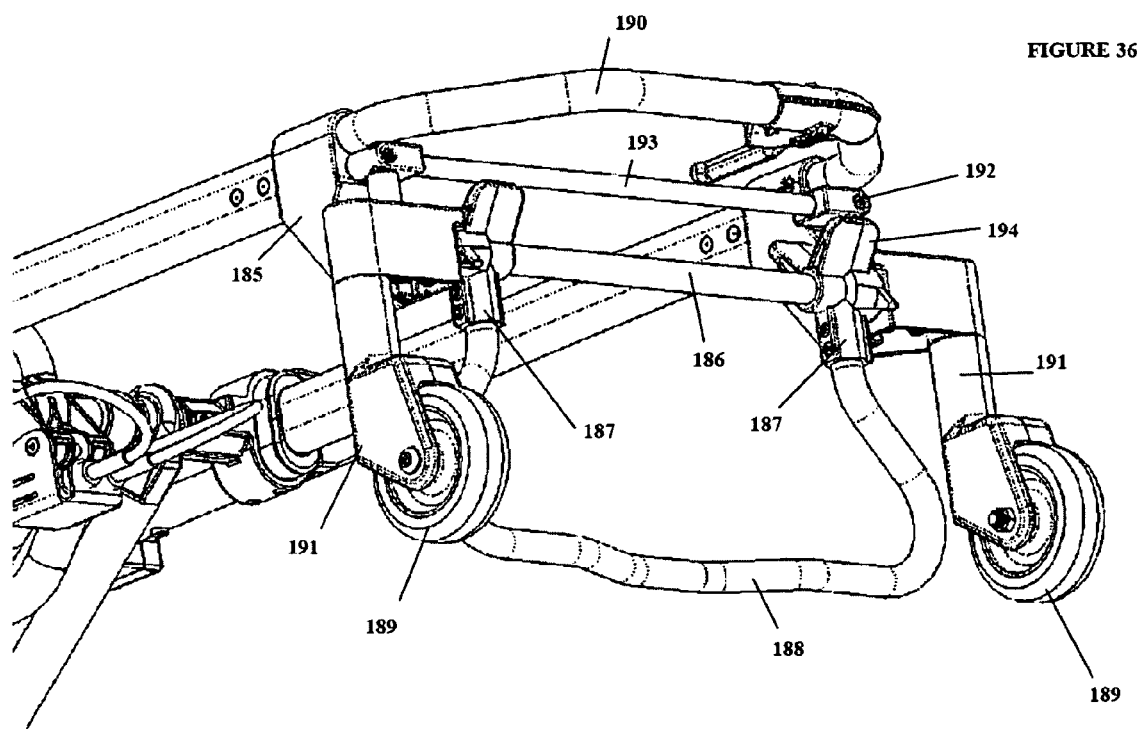
FIG. 36 shows components of a telescoping load rail assembly in one embodiment of the invention.
Figure 37:
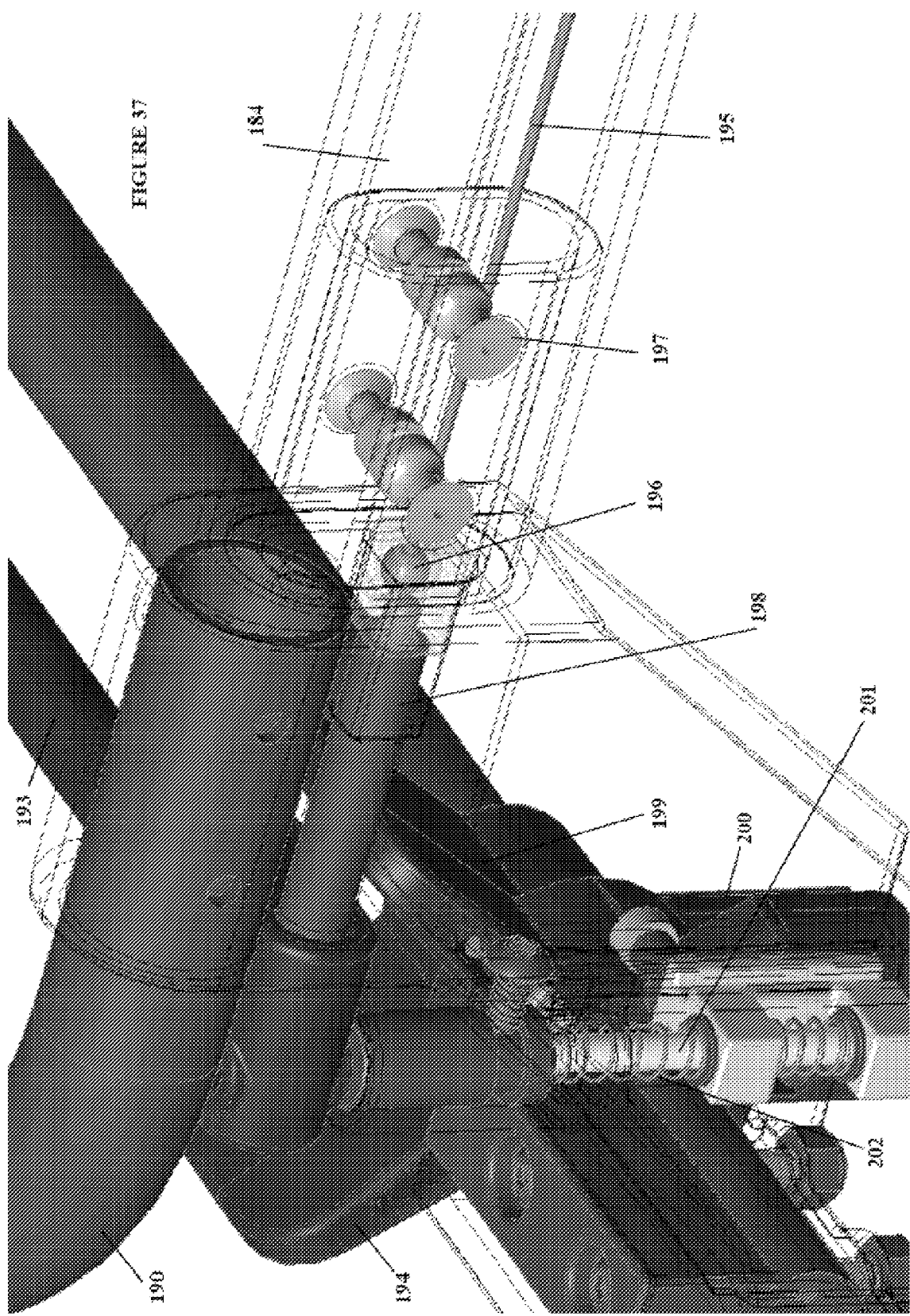
FIG. 37 shows components of a load rail release assembly in one embodiment of the invention.
Figure 38:
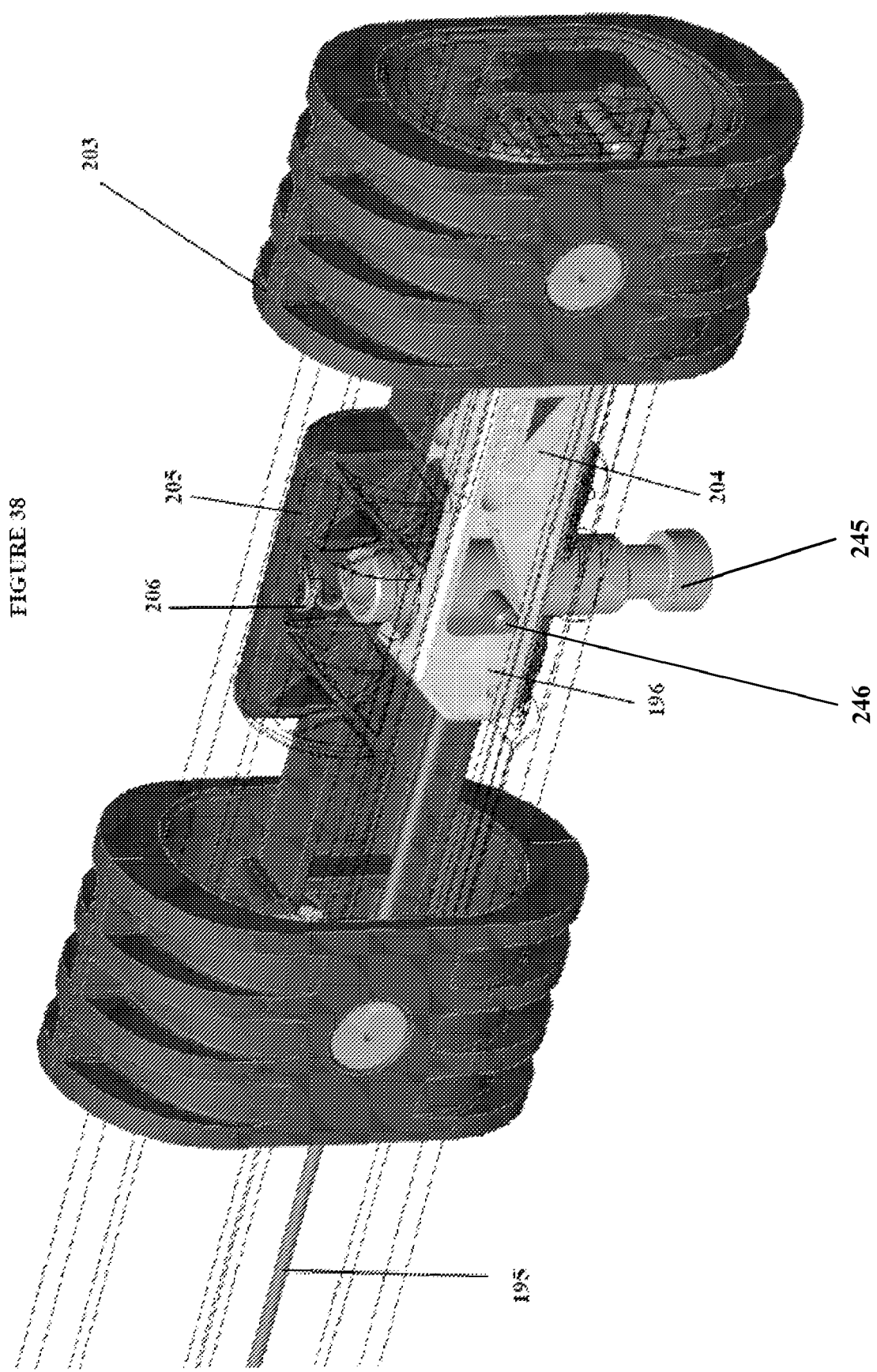
FIG. 38 shows components of a load rail release assembly in one embodiment of the invention.

As shown in FIGS. 36 and 37, the load rail assembly 4 is extended or retracted by pulling back on the release rod 193. The release rod 193 is attached to load release connectors 192. The release connectors 192 are attached to a release nut. A load release bushing 198 provides a bearing surface against the load wheel casting 185 for the load rail release mechanism as it slide within the bore of the load rail. The load release bushing 198 also acts as a spacer positioning a load release nut that is attached via a socket head screw at the appropriate distance from the load release rod 193. The release nut also provides a pocket into which a cable stop 196 can be placed. The cable stop 196 is attached to cable 195. The opposite end of the cable 195 has a similar cable stop 196 which is contained between two mating detent slides 204. When the release rod 193 is pulled, the cable 195 translates that motion to the detent slides 204, driving up the spring loaded detent plunger 245 as the detent plunger pin 246 rides up the ramped surface of the detent slide 204. The release nut bottoms out in a pocket of the load wheel casting 185 to provide a travel stop.

In some embodiments, and as shown in FIG. 17, the cot comprises a telescoping load-rail assembly 4. In some embodiments, the telescoping load-rail assembly 4 is designed to shorten the overall length of the cot when being used in confined spaces (e.g., narrow hallways, small elevators, etc.). In some embodiments, the load-rail assembly 4 is released by pulling back on a ½" round tube 193 that runs horizontally between the two load-wheel casting fork assemblies 191. This tube 193 is attached to a small connector assembly 192 at each of it's ends. These connector assemblies 192 run axially within the load-rails 184 and disengage, via cable assembly 195, a spring-loaded lock-pin assembly 201 mounted within each load-rail 184. The spring-loaded lock-pin assembly engages either of two holes placed within each of the outer main rails 74 of the litter assembly. One of these two holes provides the standard length position for the load-rails 184 and the other provides the shortened length. In some embodiments, the telescoping load-rail assembly 4 also features a system whereby properly securing the cot in a mount system prevents unintentional disengagement of a spring-loaded lock-pin assembly while the cot is secured within an ambulance. For example, the pin 201 is used to lock-out the telescoping rail release rod 193 when in ambulance. The catch bar pivots 187 attached to the catch bar 188 rotate pivotally about load rail cross tube 186 when properly secured in an ambulance. The catch bar pivots 187 push up the spring loaded pin assembly 201. The pin 201 engages a pocket in the release connector assemblies 192 and prevents the rod 193 from being pulled.

Figure 26:
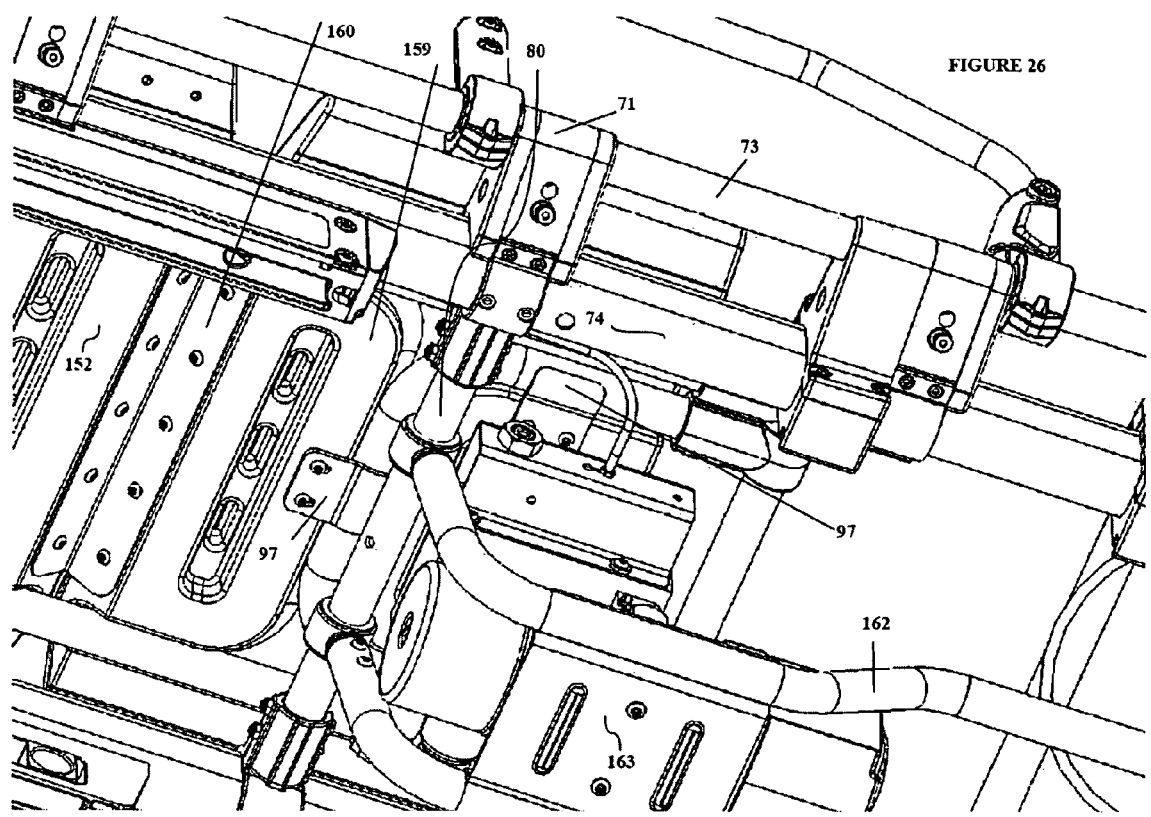
FIG. 26 shows a leg litter portion and a thigh litter portion and other components of a cot in one embodiment of the invention.
Figure 27:
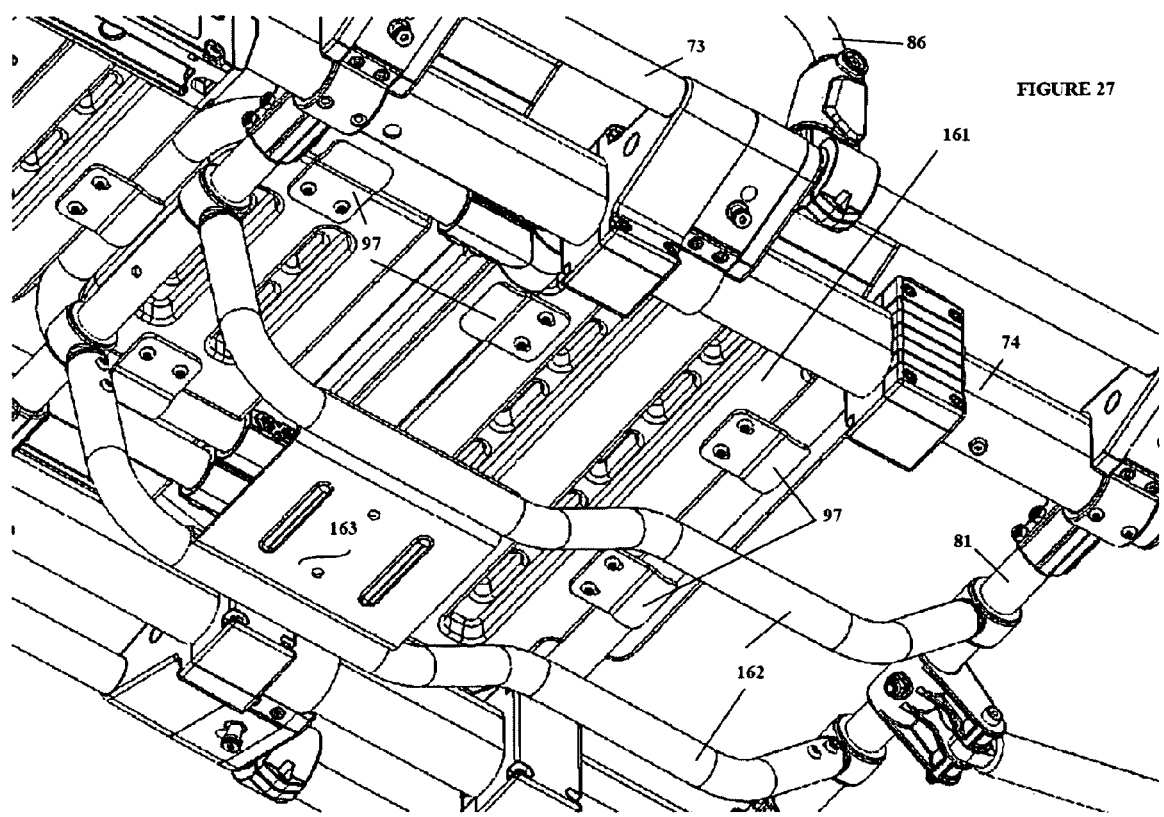
FIG. 27 shows a seat/lower torso litter portion and other components of a cot in one embodiment of the invention.

The fixed legs 40 pivotally attach to the head-end cross tube 81 of the top frame 74. Hydraulic system tubes (e.g., utilized to form a platform (e.g., to bear the weight) for hydraulic system components (e.g., hydraulic system power/pump unit 177 and motor 178, fluid reservoir 176 and hydraulic pan 163 (e.g., illustrated in FIG. 31))) also attach to the head-end cross tube 81 of the top frame 74, as well as the middle-region cross tube 80 of the top frame 74 (e.g., as shown in FIG. 26). A gas strut mount 167 used for attachment of a gas strut 168 that is connected to a head/upper torso litter 164 component of the patient litter is also attached to the head-end cross tube 81 of the top frame 74. One or more batteries 82 also attach to the top frame 74 at the foot-end cross tube 79 (e.g., as shown in FIG. 13). In some embodiments, a cot of the present invention comprises a non-series wired two battery power system. The present invention is not limited by the type of battery utilized. For example, multiple different types of batteries may be used with a cot of the present invention including, but not limited to, lithium-ion, lead acid, nickel metal hydride, nickel cadmium, alkaline (e.g., rechargeable alkaline), hydrogen, and/or solar photovoltaics. In some embodiments, the battery power system of the present invention powers components of the cot (e.g., the electrical components (e.g., the circuit board, controller, processor, memory components, transducers, ultrasonic sensors, accelerometers, etc.) as well as hydraulic system components (e.g., motor and/or pump)). In some embodiments, cot batteries may enjoy in ambulance charging (e.g., cot batteries are charged from ambulance shore line (e.g., from cot station (e.g., via cot floor mounting system))). In some embodiments, cot batteries are charged using mechanical energy (e.g., cot wheel rotation).

Figure 20:
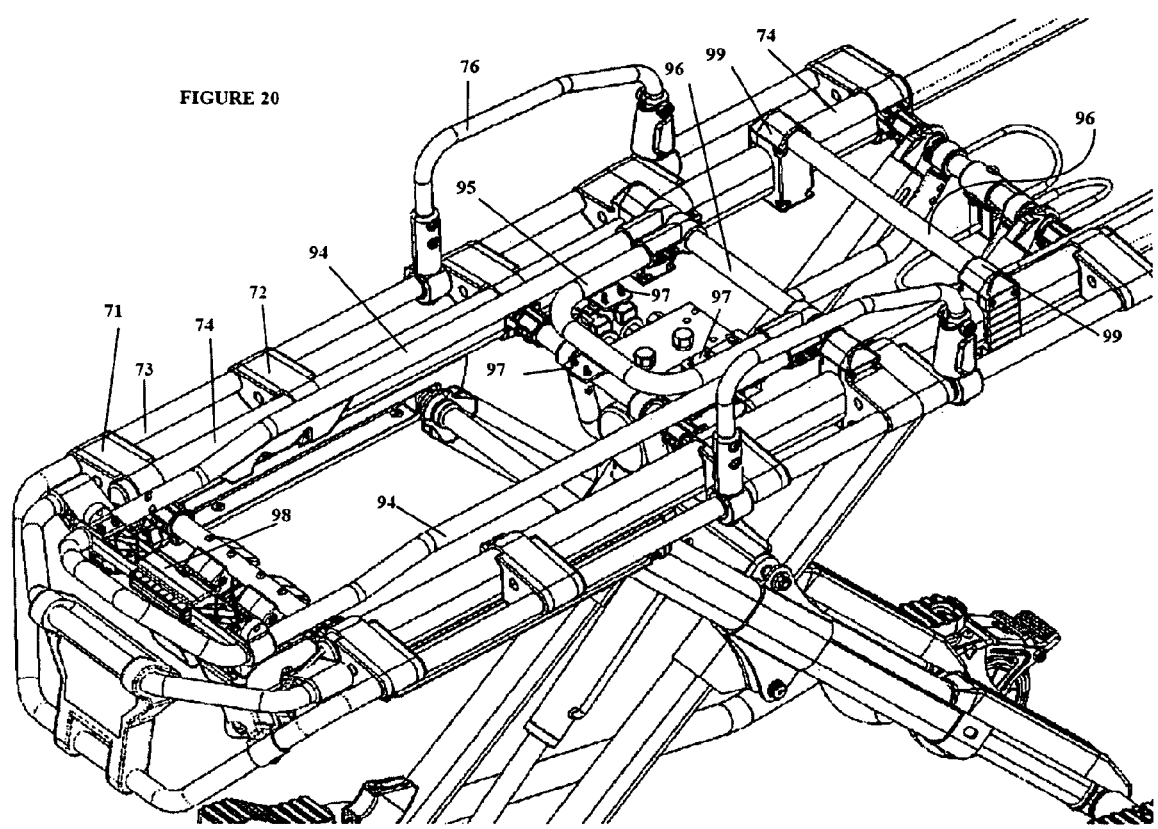
FIG. 20 shows a view of the top of a cot in one embodiment of the invention, including the top frame, team lift rail, and components for connecting a patient litter, in the absence of the patient litter.
Figure 21A:
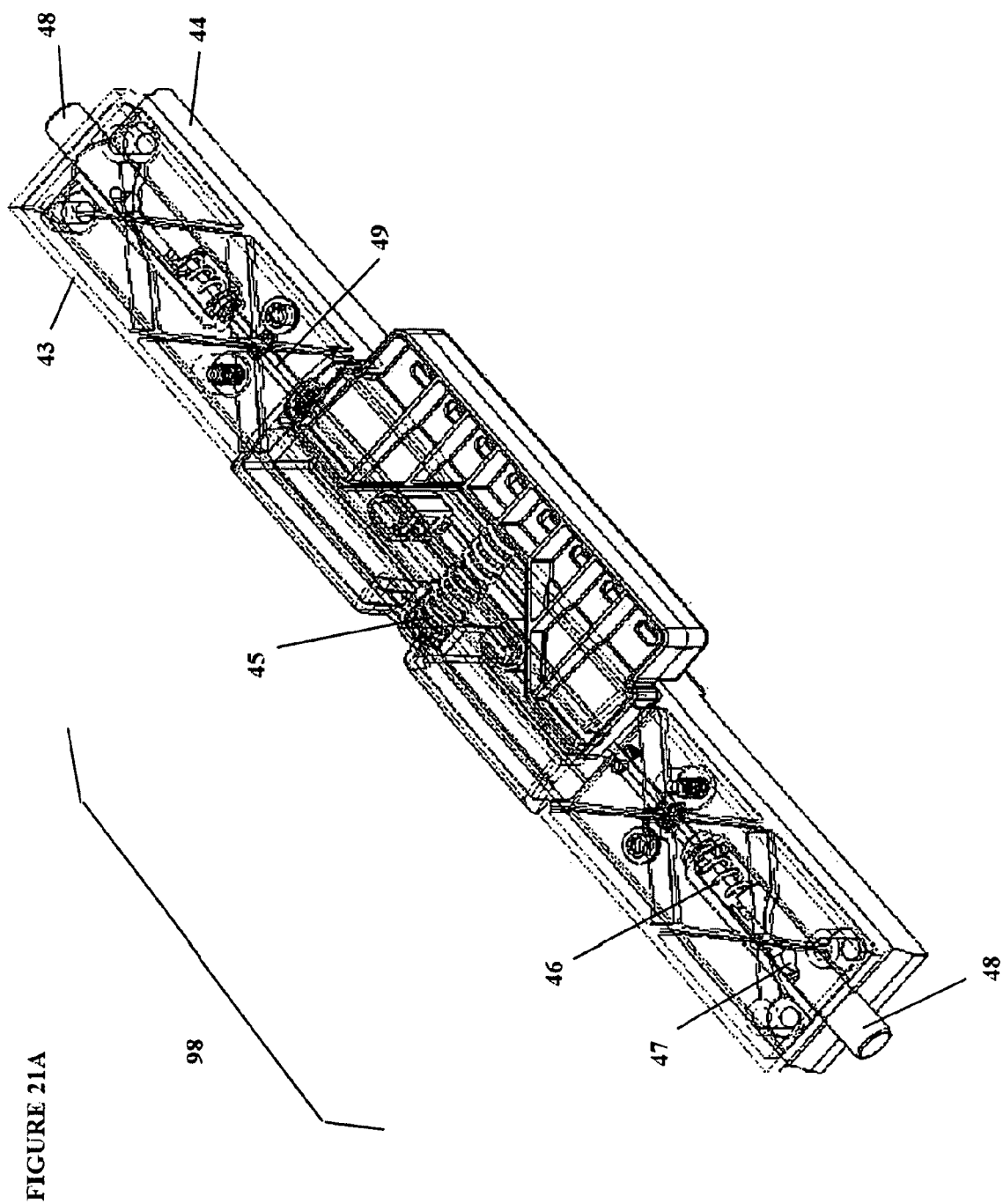
FIG. 21 shows components of a knee gatch detent assembly from both (A) a topside and (B) a side view in one embodiment of the invention.
Figure 21B:
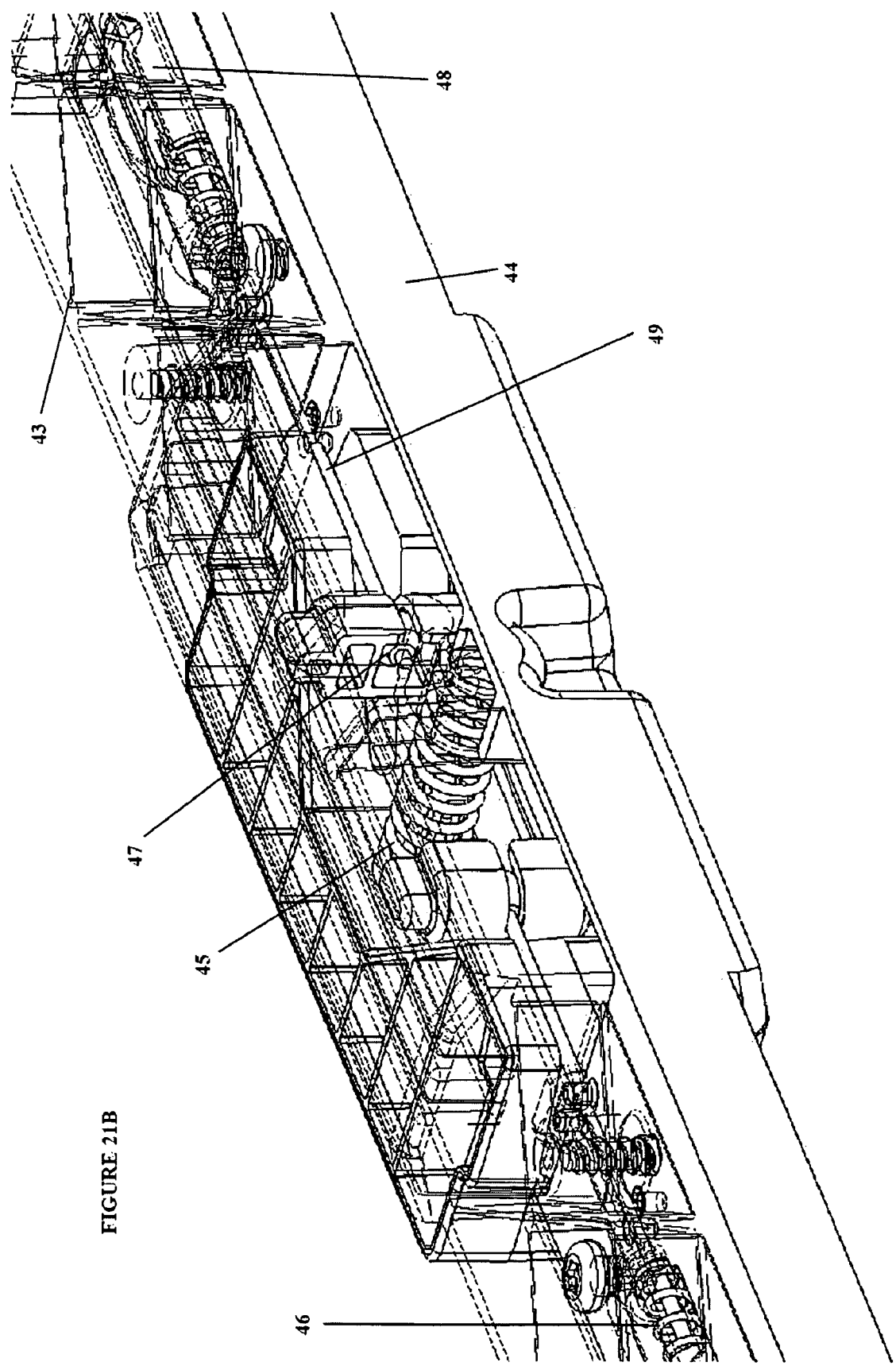
Figure 22:
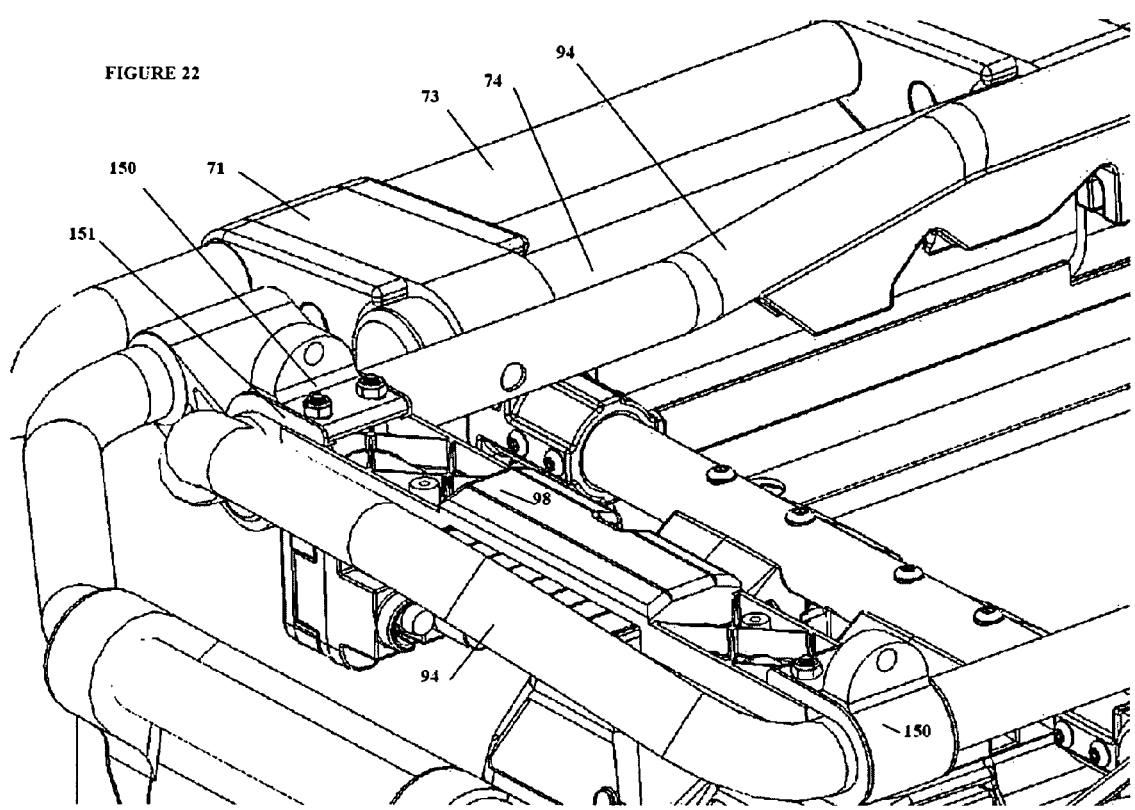
FIG. 22 shows the knee gatch detent assembly and its attachment to the litter leg tube via gatch pivots in one embodiment of the invention.
Figure 23:
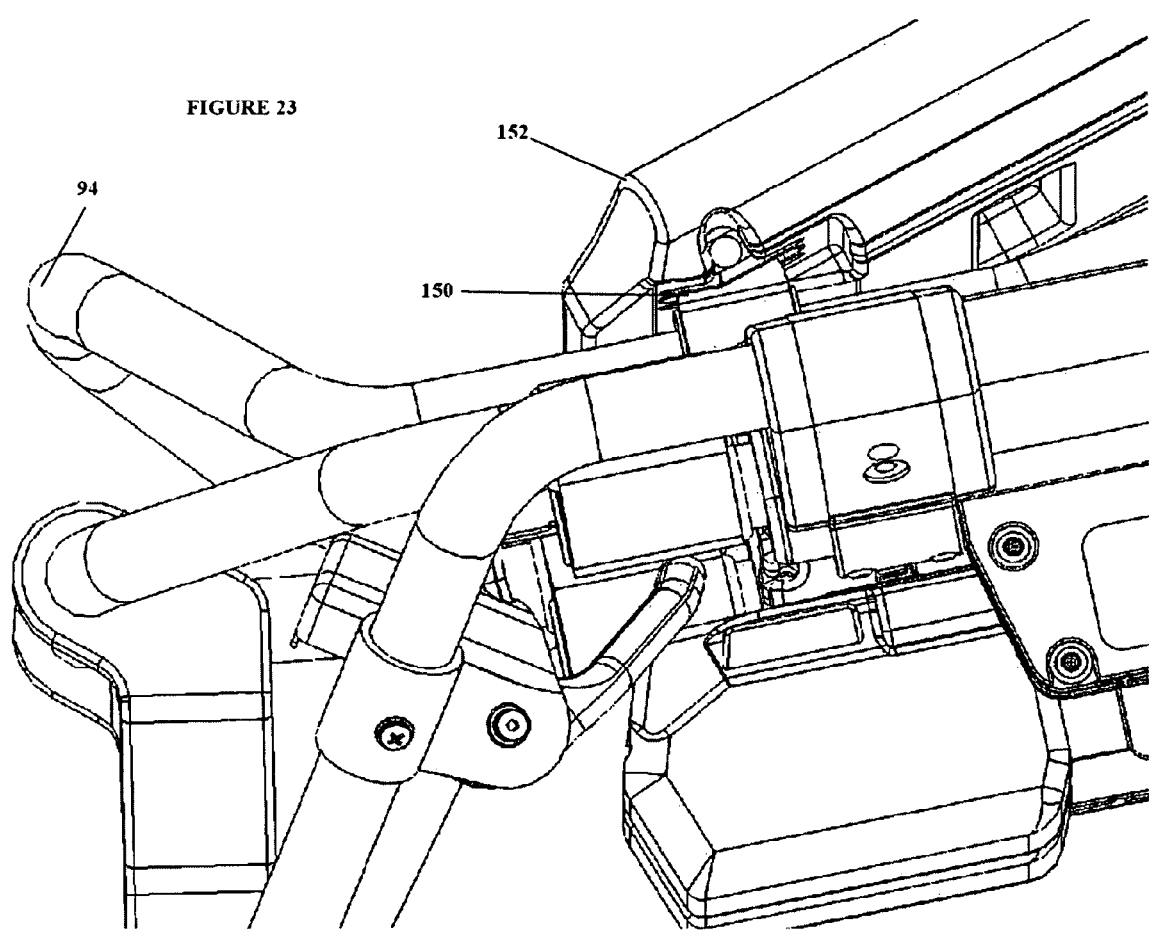
FIG. 23 shows attachment of a leg litter to the knee gatch pivot in one embodiment of the invention.

Components utilized to attach a patient litter to the top frame 74 also attach to the top frame 74. For example, as shown in FIG. 20, a litter leg tube 94 pivotally attaches to a seat pivot tube 96 attached to team lift mount extrusion 72 attached to the top frame 74 between the middle-region cross tube castings 71 and the head-end cross tube castings 71. A litter thigh tube 95 also attaches to the seat pivot tube 96. A second seat pivot tube 96 attaches to litter pivots 99 attached to the top frame 74 and is also located between the middle-region cross tube castings 71 and the head-end cross tube castings 71. The head/upper torso litter 164 pivotally connects 166 to the second seat pivot tube 96. Fasteners can be utilized to attach one or more litter components (e.g., a seat/lower torso litter) to pivot tubes 96 (e.g., pivot tubes 96 shown in FIG. 20).

In some embodiments, a patient litter of the present invention comprises a four section litter comprising a leg litter 152, a thigh litter 159, a seat/lower torso litter 161, and a head/upper torso litter 164. In some embodiments, the litter is made of roto-molded plastic, although the invention is not so limited. For example, the litter may be made of any of a variety of materials including, but not limited to, rubber or other type of composite material. The roto-molded and/or blow-molded patient litter of the present invention provides superior cleanability compared to other litters. For example, the solid, flat, non-porous surface of the molded litter of the present invention comprises no rivets or other type of connector into which bodily fluids flow and/or are collected (e.g., that can be hazardous to a cot user (e.g., due to the fluids and/or blood carrying infectious agents (e.g., HIV))). Furthermore, a molded litter of the present invention does not comprise slats (e.g., metal slats found on other litters) that often bend and/or dent. In addition, the solid, flat, non-porous surface of the molded litter of the present invention eliminates hand and/or finger pinch and/or entrapment points present in other litters (e.g., present in slotted aluminum slats). In some embodiments, a molded litter comprises tapered ends for maximum safety for a subject transported on the litter (e.g., the ends function to keep a subject centered on the litter, as well as provide additional space for a user of the cot to access the team lift rail 73). The solid, flat, non-porous surface of the molded litter of the present invention further provides a stronger more even surface that provides a uniform surface for a cot mattress (e.g., such that the mattress does not displace into a slat (e.g., aluminum slat) hole). If scratched or gouged, a blow-molded litter will not rust and may also be recycled. In some embodiments, a molded litter of the invention comprises antibacterial properties (e.g., comprises antibacterial plastic).

The present invention is not limited by the type of cot mattress utilized with a cot system of the invention. Indeed, a variety of cot mattresses find immediate use with a cot system described herein. Similarly, future cot mattresses may be designed specifically for use with a cot system described herein. In some embodiments, mattress design conforms to the unique design of the attachment point position of a shoulder strap harness of the present invention. In some embodiments, a cot mattress is constructed of a puncture resistant and/or rip resistant material (e.g., pliable vinyl or similar material). In some embodiments, a cot mattress is heat sealed (e.g., for maximum durability and cross-contamination prevention). In some embodiments, a cot mattress is constructed of an impervious, non-porous material (e.g. that is easy to clean and/or that comprises anti-microbial properties). In some embodiments, a cot mattress comprises built-in articulation seams (e.g., for maximum performance (e.g., around the knee gatch and torso joint areas)). In some embodiments, a cot mattress comprises recessed indentions for allowing a user to easily secure fasteners around the mattress (e.g., for attachment to the molded litter). In some embodiments, hook and loop fasteners (e.g., 3M DUO-LOCK fasteners) are utilized (e.g., with or without industrial grade adhesive) to attach a mattress to the blow-molded patient litter. In some embodiments, a cot mattress comprises a two-tone color pattern (e.g., for increased visibility and/or patient alignment upon the mattress). In some embodiments, a cot mattress comprises a padded flap on the head-end (e.g., to cover an oxygen bottle holder present at the head-end of the cot (e.g., for increased patient safety and/or comfort)). In some embodiments, a cot mattress comprises a visoelastic foam (e.g., TEMPERPEDIC mattress) or other type of memory foam. In some embodiments, a cot mattress comprises a neck roll head support. In some embodiments, a cot mattress is temperature controlled (e.g., utilizing the cot battery power and/or another power source). In some embodiments, temperature control includes both warming as well as cooling functionality (e.g., to warm (e.g., for hypothermia) and/or cool (e.g., heart condition, heat exhaustion, spinal injury, etc.) subjects residing on the cot). The present invention is not limited by the manner in which a cot mattress is heated or cooled. In some embodiments, a temperature controlled cot mattress utilizes heat consolidating beads. In some embodiments, a temperature controlled cot mattress utilizes heated and/or cooled water from an external source. In some embodiments, a temperature controlled cot mattress is reusable and/or disposable. In some embodiments, a disposable cot mattress is heated and/or cooled using similar chemical reactions found in a hot pack and or cold pack. In some embodiments, a temperature controlled cot mattress is stored flat on the cot and/or is rolled like a sleeping bag for easy storage and deployment. In some embodiments, a cot mattress comprises a design similar to that of a roller bearing warehouse shipping table (e.g., that assists in moving a subject off of the cot (e.g., onto an emergency room table or hospital bed).

Figure 18:
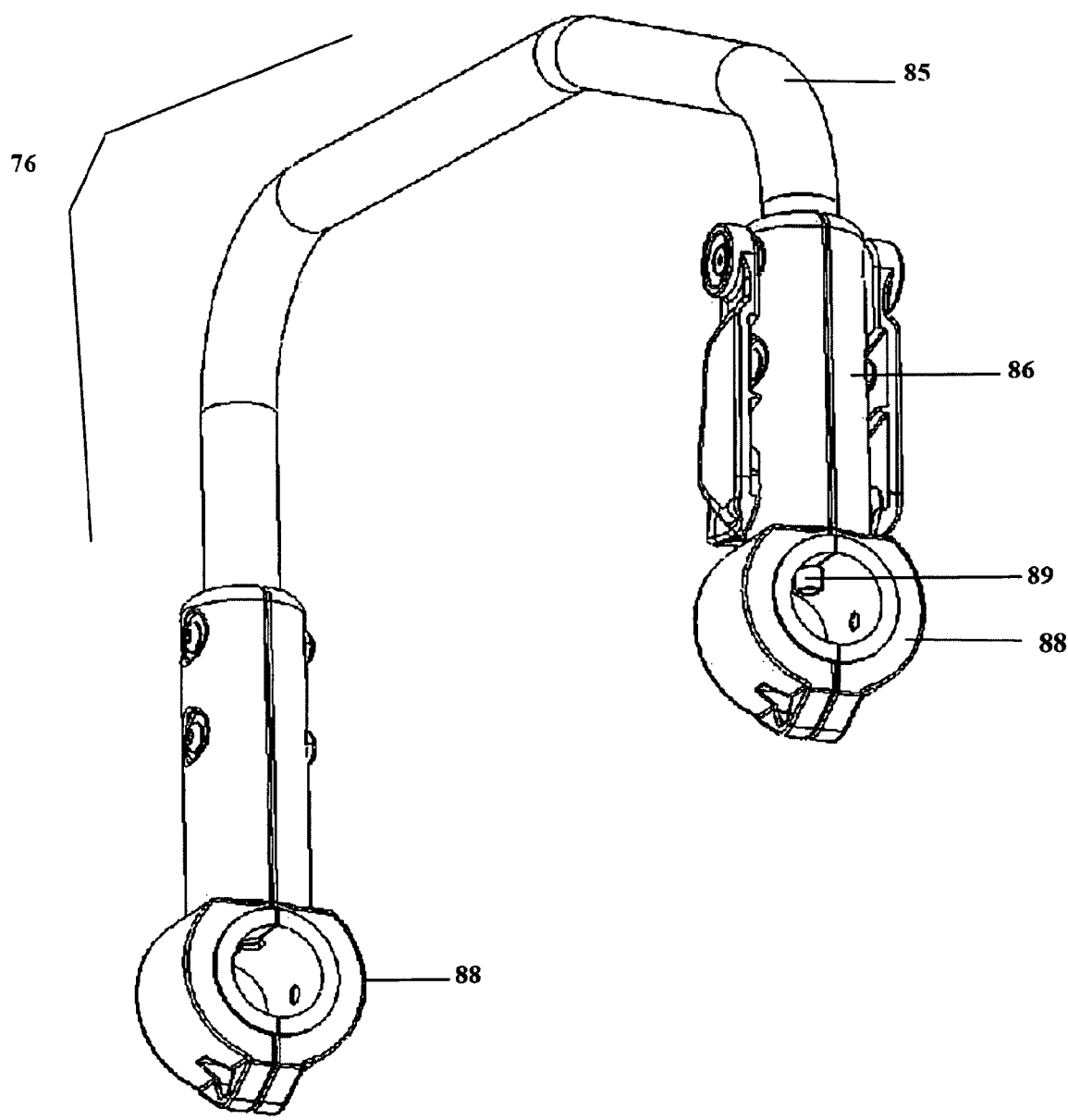
FIG. 18 shows a view of a side rail in one embodiment of the invention.
Figure 19:
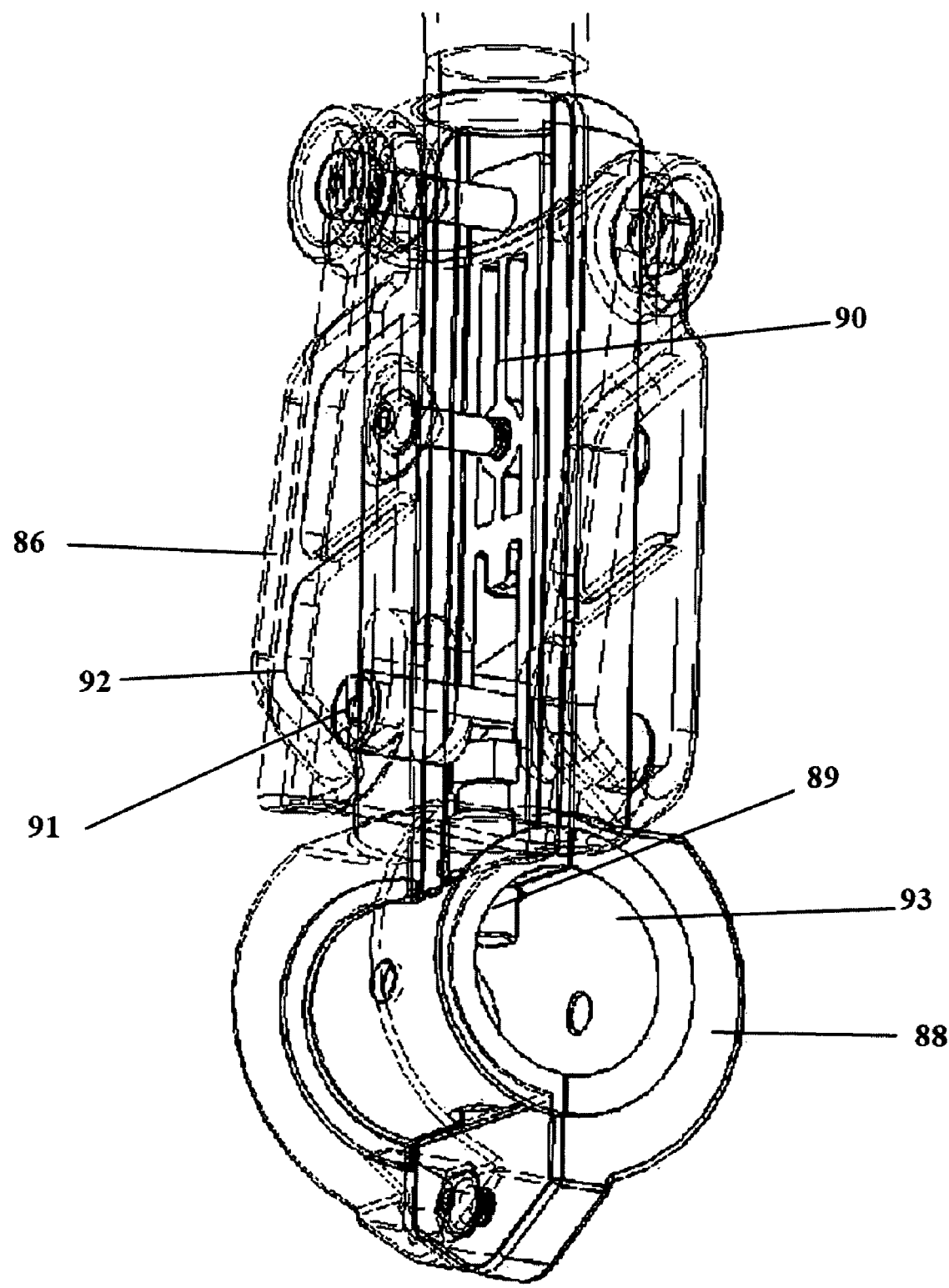
FIG. 19 shows components within a rail handle, drawn transparently, in one embodiment of the invention.

In some embodiments, a cot system 1 of the present invention comprises side rails 76 (e.g., shown in FIGS. 18-20). The side rails 76 are pivotably attached to the team lift rail 73 via side rail pivots 88. Side rail bearings 93 are located within the side rail pivot 88 to reduce friction and wear. The side rails 76 are locked in position by a spring plunger assembly 89. The spring plunger assembly 89 mounts within two mating rail lock housings 90 located within the side rail tube 85. The spring plunger 89 is mated with a spring block 91. The spring block 91 slides along a ramped surface on a side rail handle 92 which is pivotably attached to the side rail tube 85. As this side rail handle 92 is rotated, the pin block 91 slides along the ramped surface, lifting the spring plunger assembly 89 pin thereby disengaging it from a hole located in the team lift rail 73 allowing the side rail 76 to be rotated to the desired position. There are a plurality of holes in the team lift rail 73 into which the plunger assembly 89 pin can engage. In some embodiments, the patient side rails extend out sideways (e.g., to accommodate a subject that does not fit within the confines of rails not extended out sideways).

Figure 16:
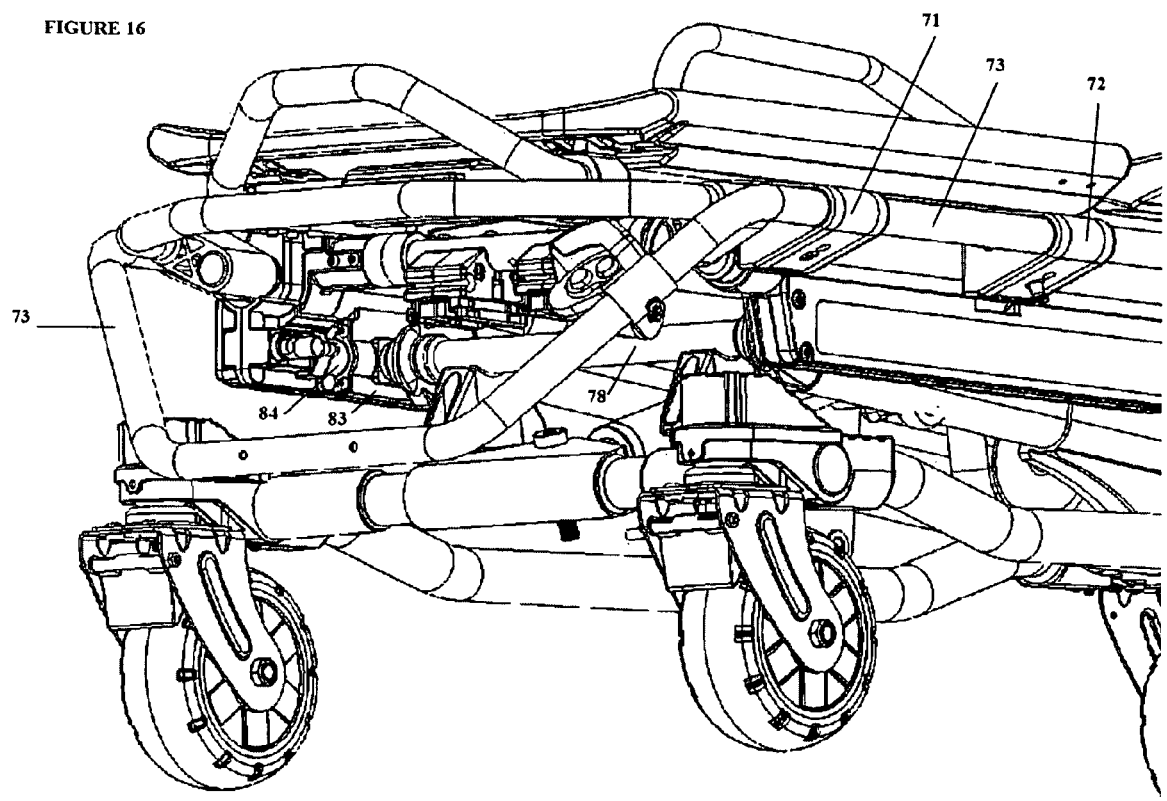
FIG. 16 shows a view of foot end components of a cot in a fully collapsed position in one embodiment of the present invention.

In some embodiments, a cot system 1 of the present invention also comprises a patient restraint system. In some embodiments, the patient restraint system comprises a lower leg restraint, lap restraint, and/or upper torso/shoulder restraint. In some embodiments, the restraint system comprises restraint attachment points 7 (e.g., present on team lift mount extrusions 72 (e.g., as shown in FIG. 16)). In some embodiments the restraint attachment point 7 is a shoulder bolt fastened to the team lift mount extrusion 72. In some embodiments, the restraints have a quick clip and/or snap clip belt end (e.g., similar to those used in automobile racing) that attach to the shoulder bolt (e.g., thereby providing for quick removal). In some embodiments, restraints may comprise an antimicrobial substance and/or an impervious material (e.g., that inhibits and/or reduces absorption of bodily fluids (e.g., blood)). In some embodiments, a restraint system of the present invention comprises a sensor and/or alert system (e.g., added to a female or male belt attachment point (e.g., that provides a warning tone when a subject is not strapped in (e.g., prior to and/or upon movement of an ambulance))). In some embodiments, a restraint strap comprises a male attachment point (e.g., so that if the attachment points on the cot line up across a subject's joint (e.g., knee, hip, etc.), the strap can attach to itself on the team lift handle (e.g., thereby avoiding strapping across the joint)).

Figure 29C:
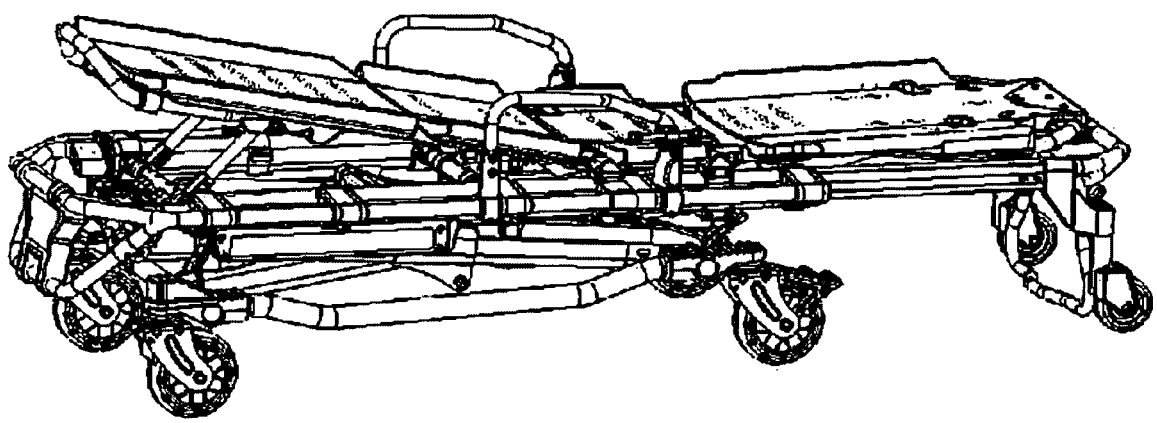
FIG. 29 shows a cot in one embodiment of the invention in (A) a flat, (B) elevated backrest (upper torso or Fowler's position) and knee-gatch position; and (C) a Trendelenburg (shock) position.

As shown in FIGS. 29A-29C, a cot of the present invention can be placed into a number of different positions.

Figure 28:
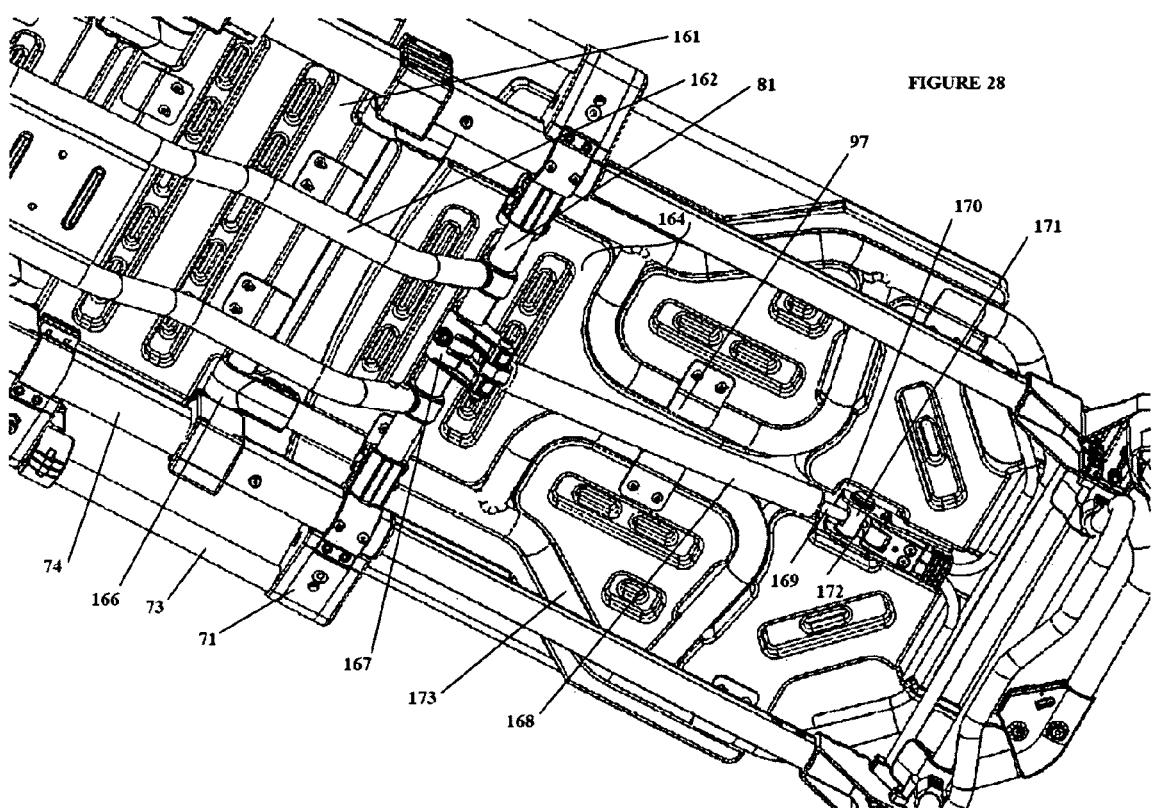
FIG. 28 shows a head/upper torso litter portion and other components of a cot in one embodiment of the invention.

The head/upper torso litter 164 elevation is controlled by a gas charged spring (strut) 168 (e.g., shown in FIG. 28) that is pivotably attached to the head/upper torso litter 164 and a strut mount 167 that is affixed to the head-end cross tube 81. This elevation can be changed by actuating the strut release handle 170 that is pivotably attached 171 to the backrest assembly. Actuating the strut release handle depresses a pin 172 within the strut piston rod 169. This allows the gas charged spring (strut) 168 to extend or contract in length.

The leg litter portion of the cot can be configured into or from a knee gatch position by actuating the knee gatch detent assembly 98 (e.g., shown in FIGS. 20-24). Depressing the spring loaded knee gatch detent button 45 linearly displaces two gatch slides that are slideably retained within the detent housing 44. The gatch slides retain cable stop 47 which are attached to cable 49. The linear translation of the gatch slides displace the gatch pins 48 which are then disengaged from their respective holes within the litter leg tube 94. This allows the knee gatch detent assemby 98, which is slideably attached to the litter leg tube 94 via the gatch pivot 150, to be repositioned to the desired configuration. The gatch bearing 151 provides a bearing surface for this motion.

Figure 24:
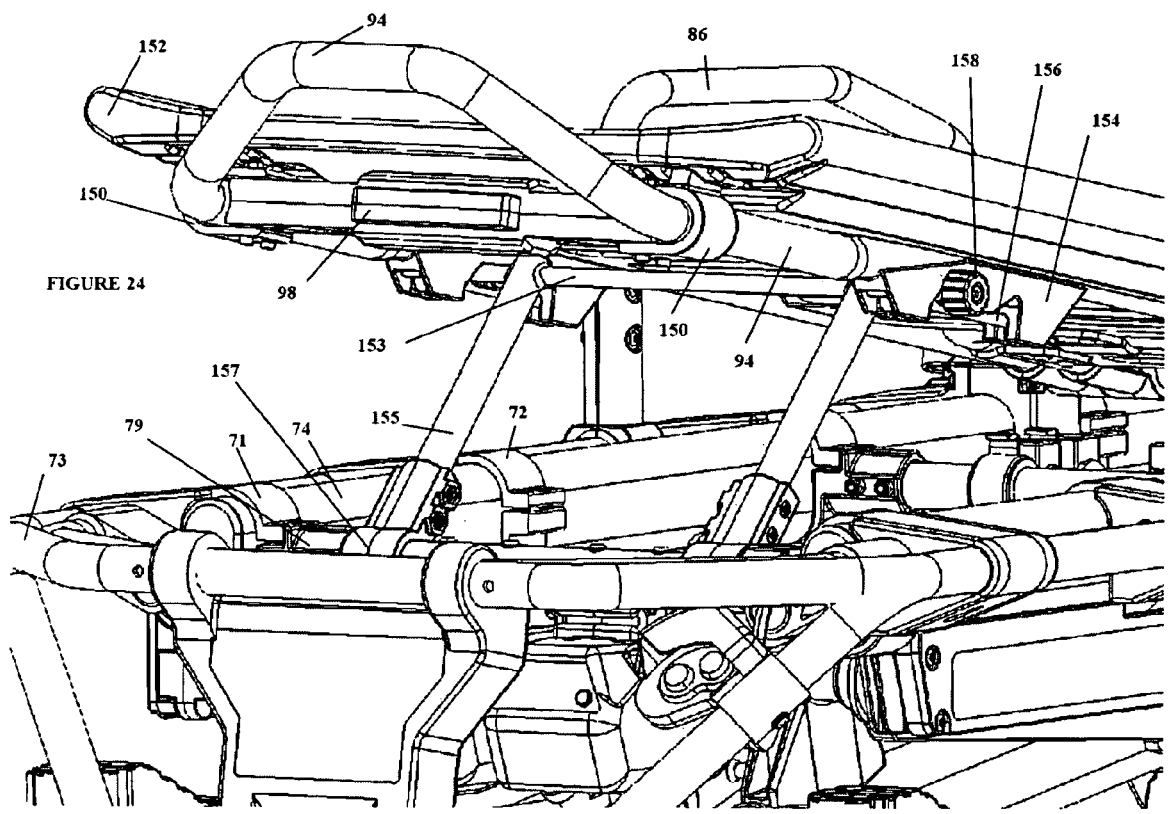
FIG. 24 shows components of a knee gatch detent assembly, patient litter attachments and a leg litter portion of a patient litter in a raised position in one embodiment of the invention.
Figure 25:
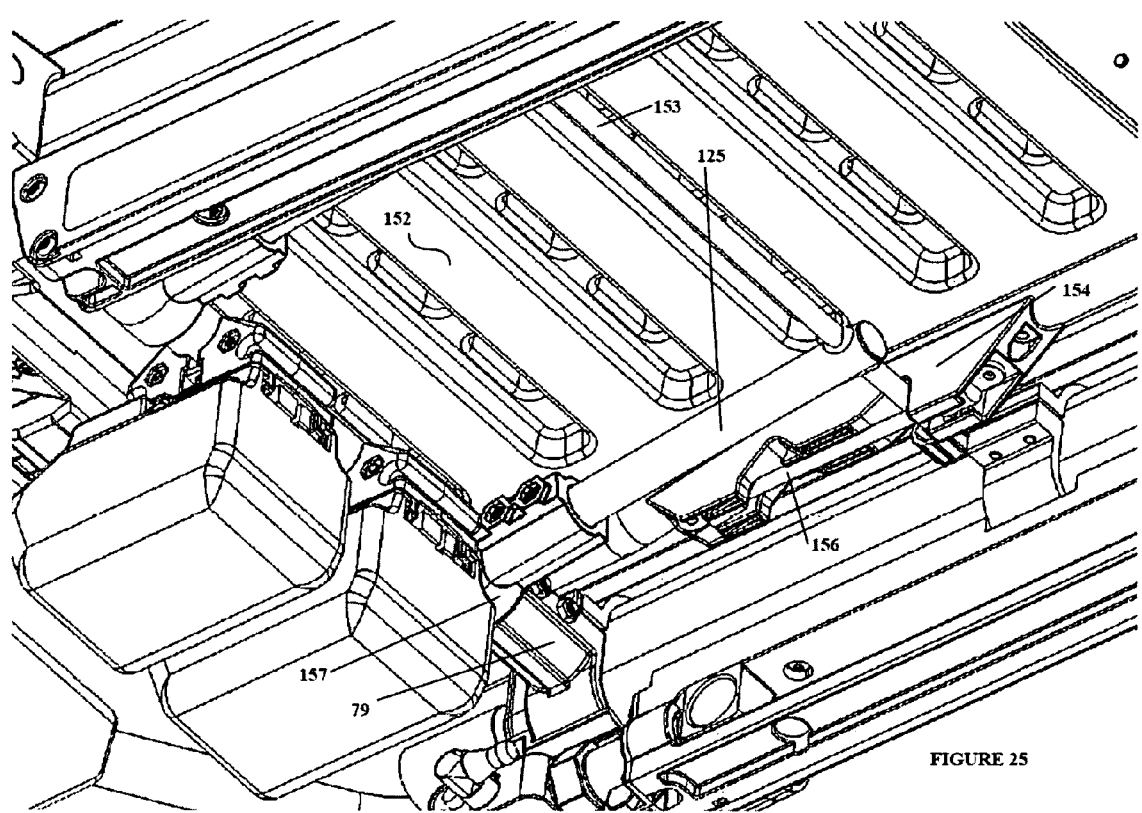
FIG. 25 shows a leg litter portion of a patient litter in a non-raised position in one embodiment of the invention.

As shown in FIG. 24, the leg litter portion of the cot can be configured into a Trendelenburg shock position by lifting up on the foot end of the litter leg tube 94 until the trendel rod 153 slides from it's down position along the trendel ramp 154 and becomes engaged in the elevated notch position along the trendel ramp 154. An elasticized shock cord 156 (e.g., a bungee type cord) serves to limit disengagement of the trendel rod 153 from the trendel ramp 154. The shock cord 156 also provides the necessary force to engage the trendel rod 153 into the trendel ramp 154 notch positions. The trendel knob 158 provides a grab point for the user to disengage the trendel rod 153 from the trendel ramp 154 when going from an elevated (Trendelenburg) position to a lowered (flat) position.

In some embodiments, a cot system 1 of the present invention comprises a hydraulic system. As illustrated in FIG. 12, the hydraulic system comprises a hydraulic cylinder mount 58 connected to a pair of pivots 52 connected to the main rails 51 of the telescoping legs 50 and to the fixed-length legs 40. The hydraulic cylinder mount 58 is connected to a cylinder cap 70 attached to a cylinder 61 and rod 60. The cylinder cap 70 comprises an orifice through which a cylinder retract line 69 extends. The rod end 67 attaches to a cylinder base pivot 59 that is pivotally connected to the foot-end cross tube 12 of the base frame 10.

Figure 41:
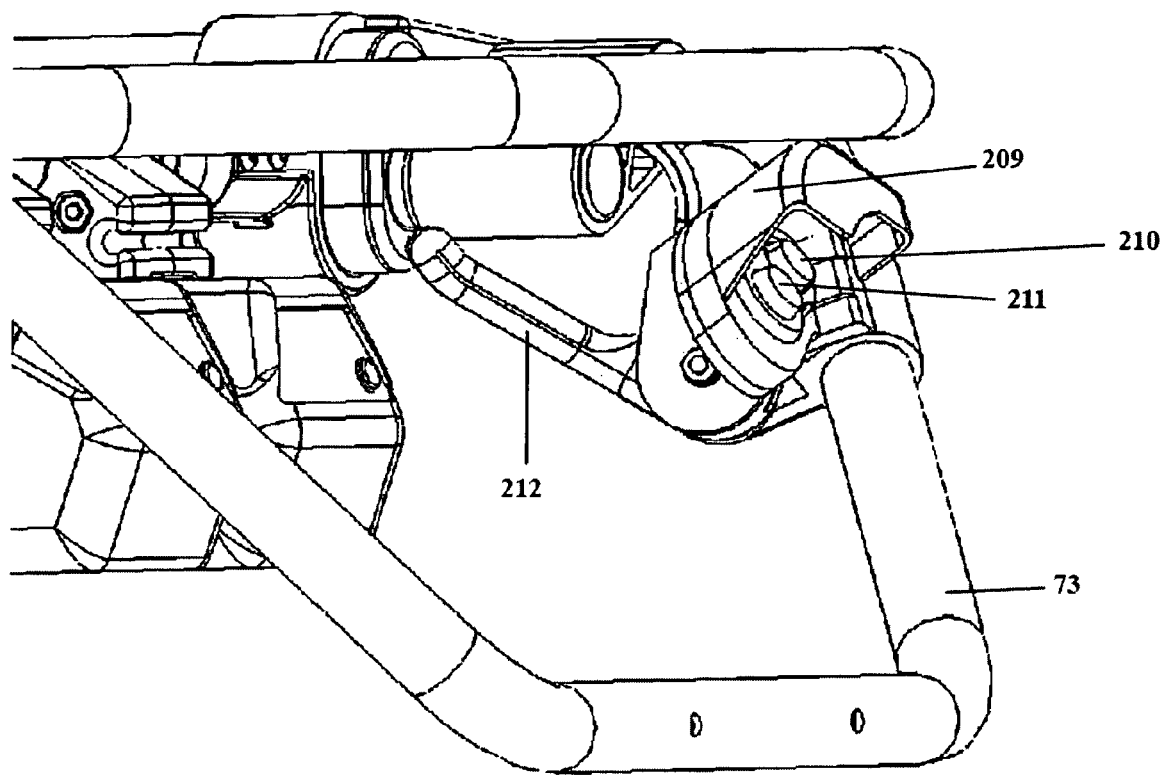
FIG. 41 shows the location of push button controls and manual release lever for a hydraulic system of one embodiment of the invention.
Figure 42:
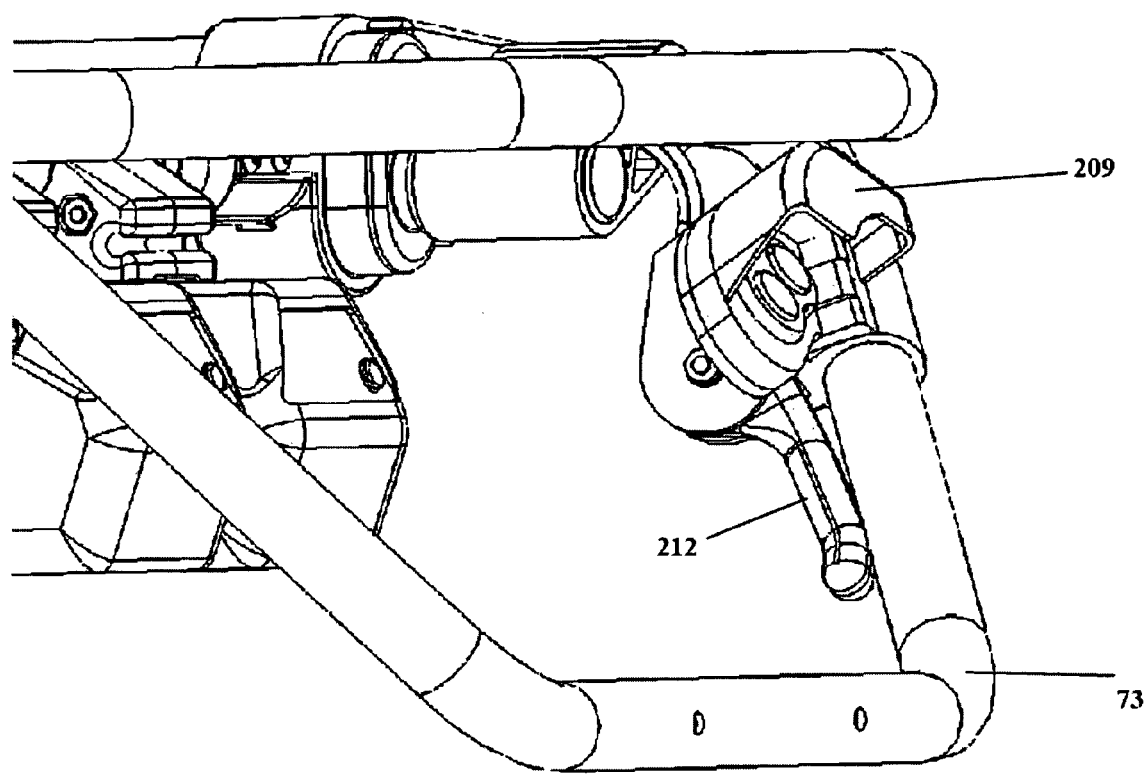
FIG. 42 shows the location of a manual release lever in an opened (released) position.
Figure 43:
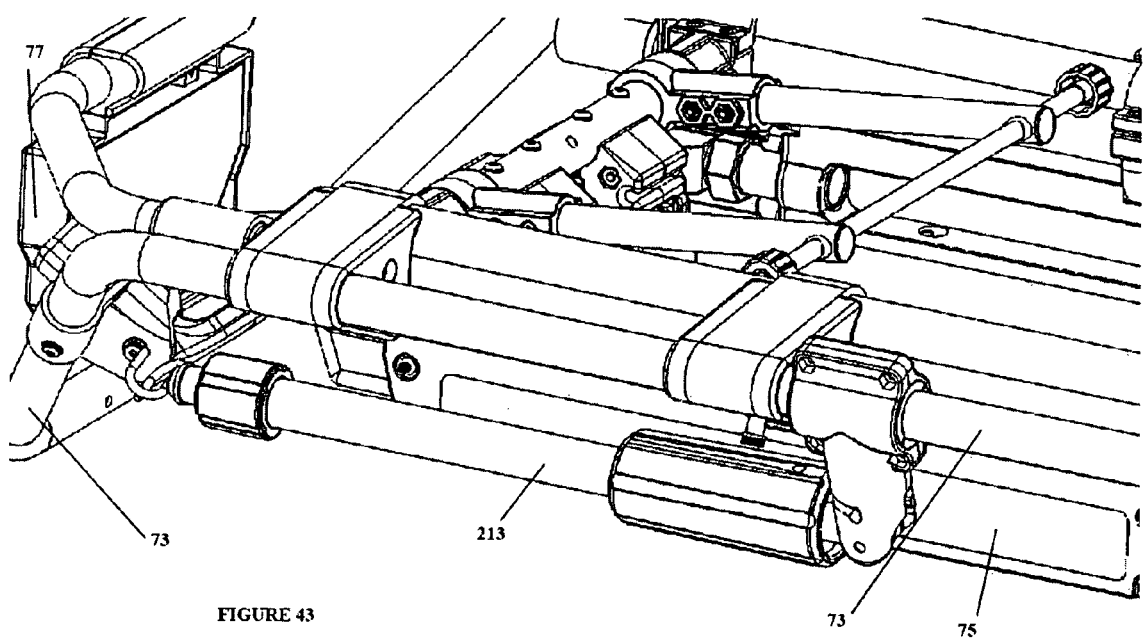
FIG. 43 shows a telescoping intravenous (IV) pole connected to the team rail assembly in one embodiment of the invention.

The hydraulic system can be utilized to raise and lower the leg assemblies of the cot (e.g., thereby raising and lowering the patient litter (e.g., for loading a subject onto the cot and/or for loading a cot carrying a subject into an ambulance)). The cylinder 61 and rod 60 are powered by a hydraulic unit comprising a hydraulic manifold 174 attached to a hydraulic power/pump unit 177 and motor 178 operationally connected to a hydraulic fluid reservoir 176. Components of the hydraulic unit are attached to a hydraulic pan 163 that is connected to hydraulic system tubes 162 attached to the top frame 74 as described above. FIGS. 32 and 33 illustrates additional components of the hydraulic system including a manifold 174 comprising a spring loaded manual release cable 180 (e.g., that attaches to a manual release lever 212 at the foot-end of the cot, shown, for example in FIGS. 41 and 42), attached to a cable stop 32 capable of moving a pull valve plate 182 that actuates manual release valves 181. The manifold 174 also comprises a spring loaded plunger 179 which actuates the flow control bypass valve 107 when the hydraulic system pressure nears 0 psi (e.g., when the load wheels 189 of a load rail assembly are resting upon the deck of an ambulance and the base frame 10 is outside of the ambulance (e.g., suspended above the ground)). This enables the operator to lift the base frame 10 in manual mode with less effort, because the hydraulic fluid is not being forced through the pressure compensated flow control valve 108.

Figure 44:
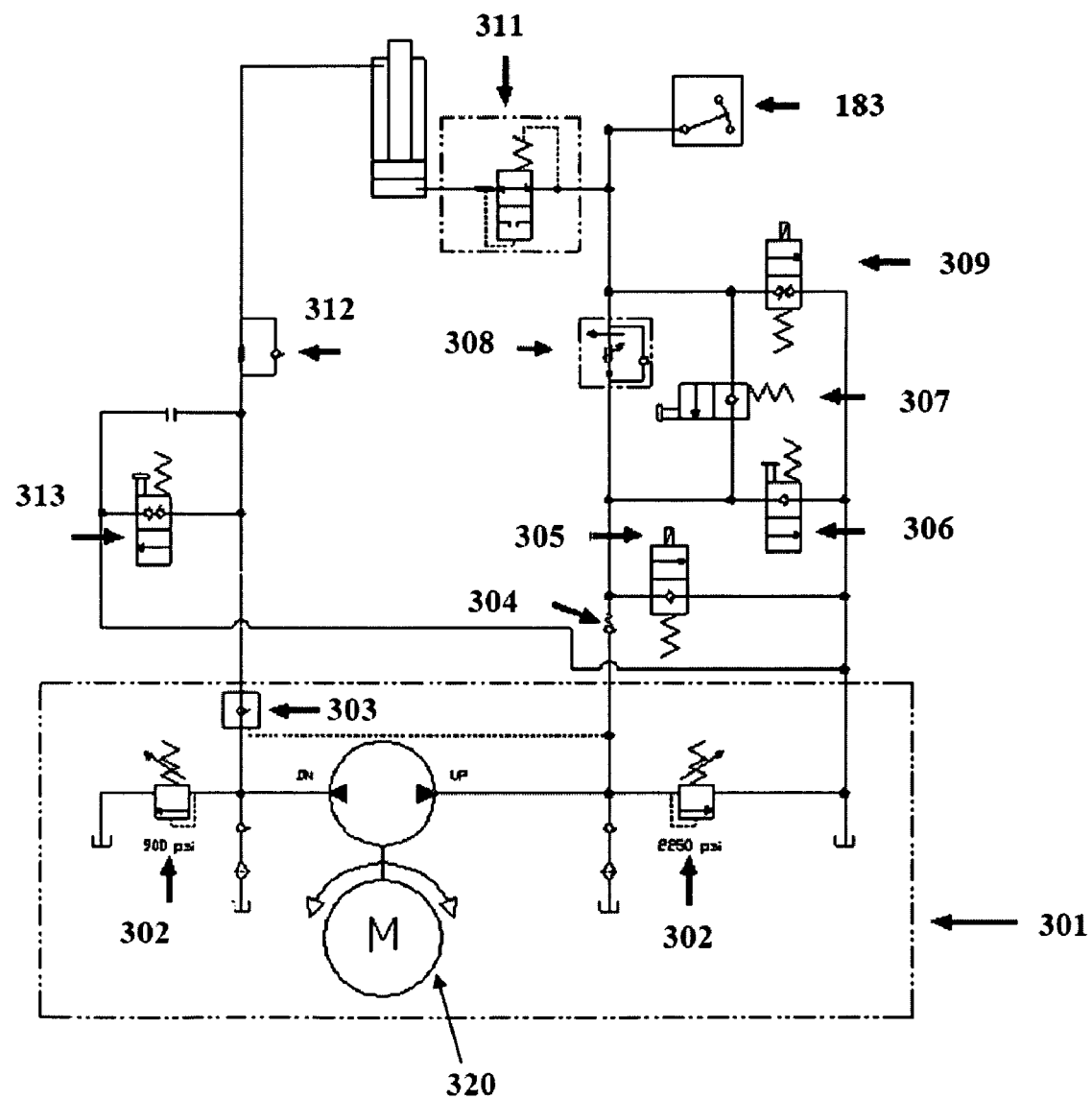
FIG. 44 shows valve configuration of a hydraulic system manifold in one embodiment of the invention.

FIGS. 44-52 illustrate various valve configurations of a hydraulic manifold of the present invention (e.g., that permits raising, collapsing, maintaining height of a cot of the present invention as well as other cot functionality (e.g., manual use of said cot)). FIG. 44 illustrates components of a hydraulic system manifold involved in powered and manual operation of a cot in some embodiments of the invention.

FIG. 44 shows one embodiment of a valve configurations of a hydraulic manifold including a bi-rotational power unit 301, pressure release valves 302, pilot operated check valve 303, load holding check valve 304, controlled lowering valve 305, manual release up valve 306, flow control bypass 307, pressure compensated flow control valve 308, quick collapse valve 309, pressure transducer 183, velocity fuse 311, check valve with orifice 312 and manual release down valve 313.

Figure 45:
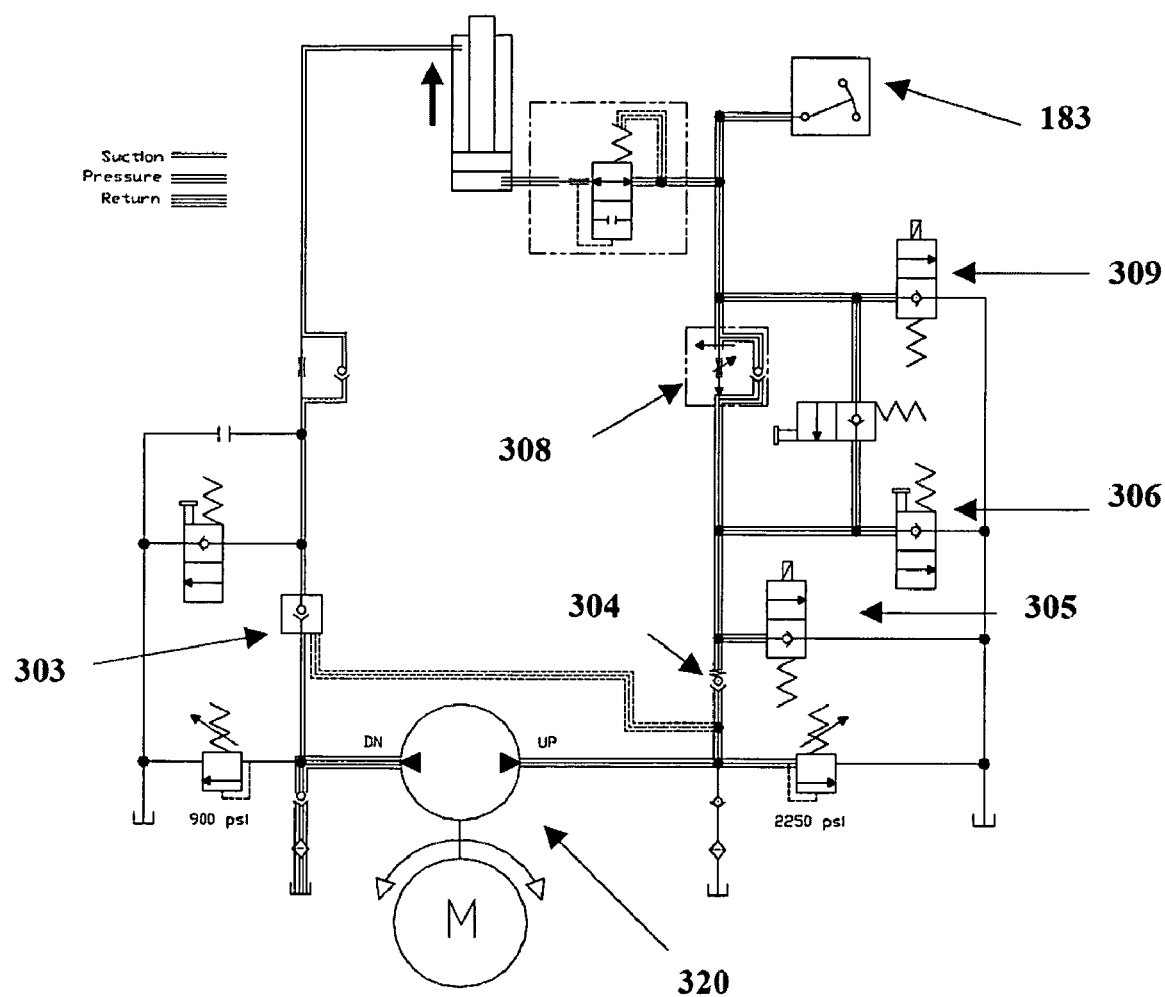
FIG. 45 shows valve configuration of a hydraulic system manifold during a powered raising of the legs of a cot in one embodiment of the invention.

FIG. 45 shows hydraulic valve configuration during a powered raising of the cot (e.g., powered raising of the leg assemblies of the cot (e.g., powered extension of the hydraulic system cylinder rod outward from the hydraulic cylinder, raising both the fixed leg assembly as well as the telescoping leg assembly comprising a roller bearing system through a pivot axis residing below the centerline of the legs)). The pump 320 is rotated in a direction that supplies fluid to the cap end of the cylinder. Cap end pump pressure causes the pilot operated (P.O.) check valve 303 to shift open which allows fluid to return to the pump from the rod end of the cylinder. Fluid flows past the load hold check valve (304) as well as the reverse flow check on the pressure compensated flow control 308 on its way to filling the cap end of the cylinder. Fluid is blocked from returning to the tank/reservoir by the controlled lower valve 305, manual release valve 306 and the quick collapse valve 309. Hydraulic system pressure (e.g., powered raising of the leg assemblies of the cot (e.g., powered extension of the hydraulic system cylinder rod outward from the hydraulic cylinder)) is monitored by a pressure transducer 183.

Figure 46:
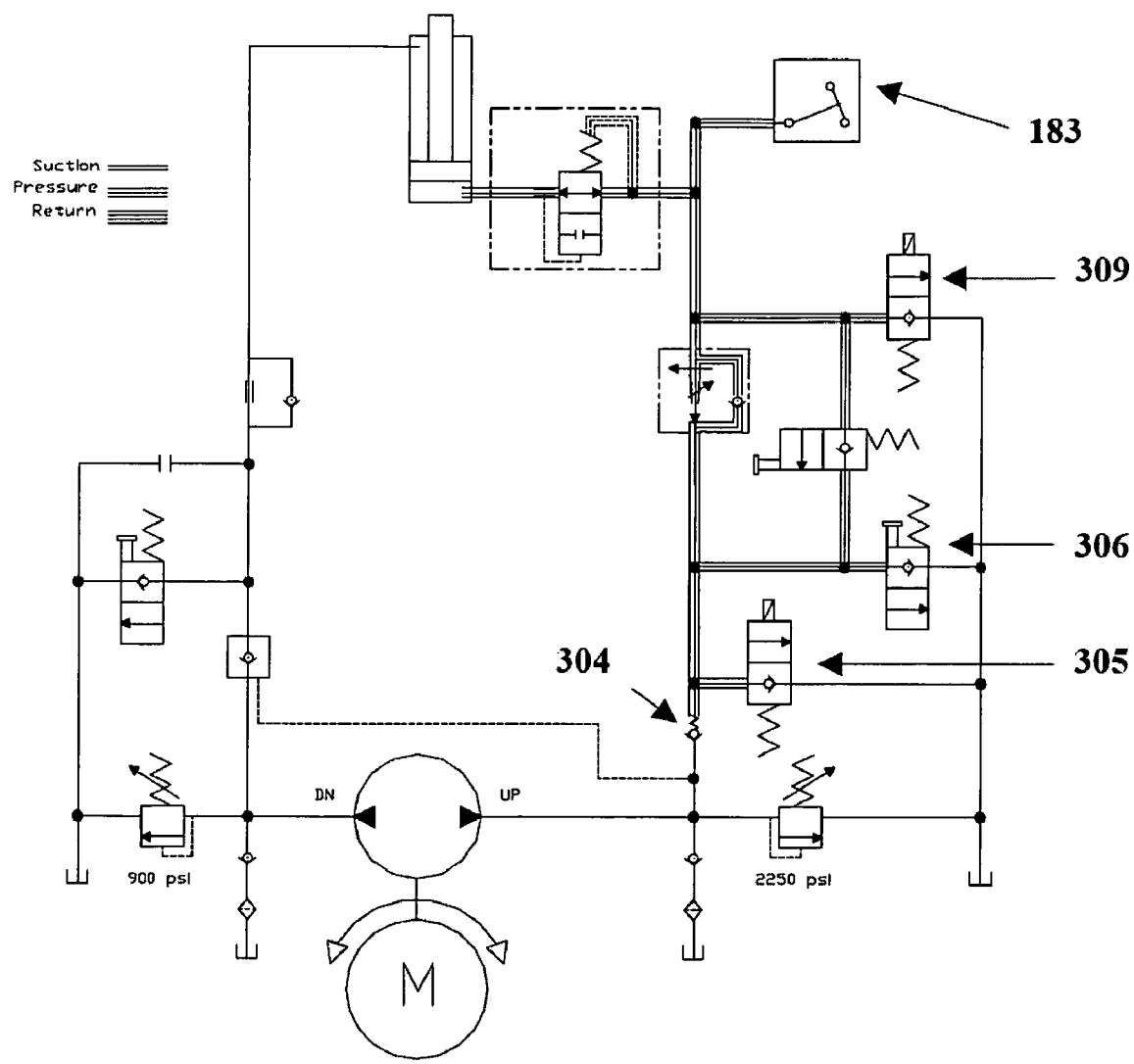
FIG. 46 shows valve configuration of a hydraulic system manifold supporting a load upon a cot (e.g., a subject) in one embodiment of the invention.

FIG. 46 illustrates valve configuration while maintaining a constant height of the cot (e.g., of the patient litter (e.g., upon which a subject is held)). For example, when the cot is supporting a load, fluid returning to tank is blocked by the load holding check valve 304, controlled lower valve 305, manual release valve 306 and the quick collapse valve 309. The pressure transducer 183 monitors the hydraulic system pressure (e.g., generated by the load on the cylinder).

Figure 47:
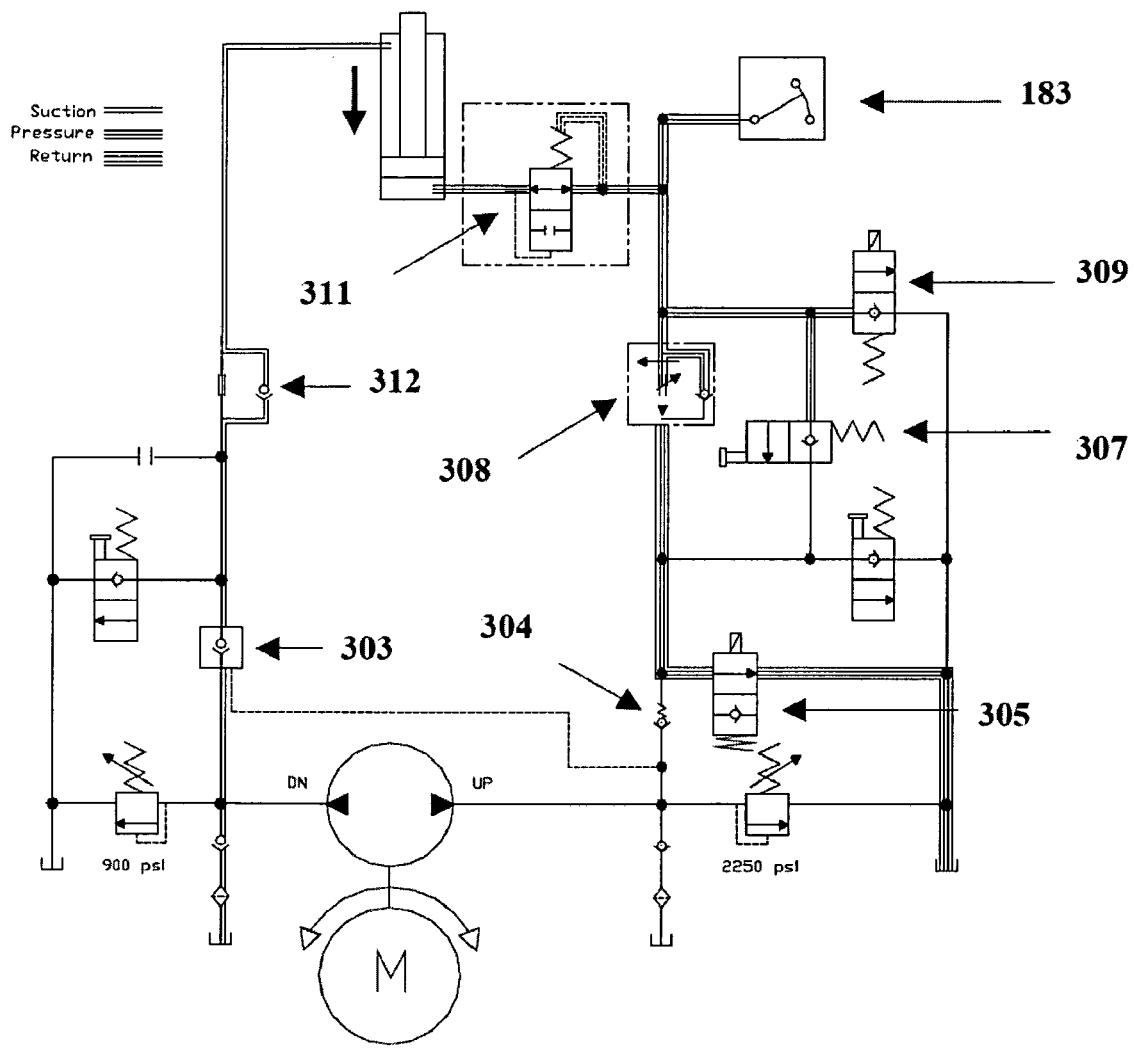
FIG. 47 shows valve configuration of a hydraulic system manifold during a controlled lower of a cot in one embodiment of the invention.

FIG. 47 illustrates valve configuration during a non-powered, controlled collapse of the legs. The controlled lower valve 305 opens which allows fluid to bypass the load holding check valve 304. As the cylinder retracts (e.g., due to the litter load and/or other force upon the litter) fluid is pulled out of the tank through the P.O. check valve 303, the free flow side of the orifice check valve 312, and into the rod end of the cylinder. Fluid being pushed out of the cap end of the cylinder flows through the velocity fuse 311 and is forced to flow through the pressure compensated flow control valve 308 that controls the speed of cylinder retraction. Fluid traveling around the pressure compensated flow control valve 308 is prevented by the quick collapse valve 309 and the flow control bypass valve 307. Back pressure created by the pressure compensated flow control valve 308 is monitored by the pressure transducer 183.

Figure 48:
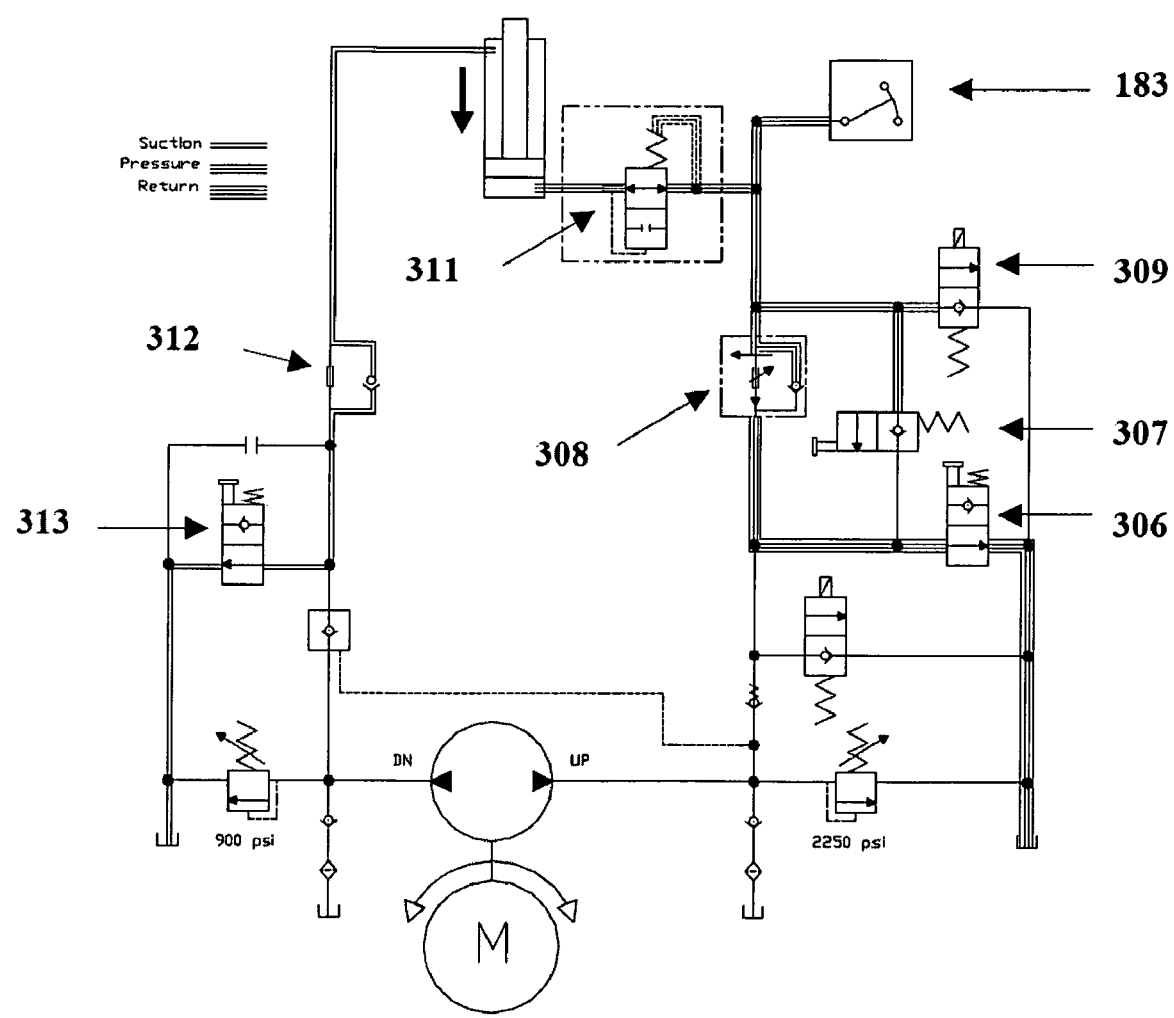
FIG. 48 shows valve configuration of a hydraulic system manifold during a manual collapse of a cot with a load (e.g., a subject) in one embodiment of the invention.

FIG. 48 illustrates valve configuration while manually collapsing a cot bearing weight (e.g., a subject) of the present invention. When the manual lever 212 is pulled (e.g., generating a pulling movement upon the manual release cable 180 that actuates the manual release pull valve plate 182 away from the manifold 174 (e.g., as shown in FIG. 33)) both the manual down valve 313 and manual up valve 306 are actuated. As the cylinder retracts, due to the litter load, fluid is pulled out of the tank through the manual down valve 313, the free flow side of the orifice check valve 312 and into the rod end of the cylinder. Fluid being pushed out of the cap end of the cylinder flows through the velocity fuse 311 and is forced to flow through the pressure compensated flow control valve 308 that controls the speed of cylinder retraction. Fluid travel around the pressure compensated flow control valve is prevented by the quick collapse valve 309 and the flow control bypass valve 307. Back pressure created by the pressure compensated flow control valve is monitored by the pressure transducer 183. Fluid is allowed to travel back to the tank through the manual up valve 306. Thus, a cot system of the present invention provides, in manual mode, regulation of hydraulic fluid by a flow valve. This stands in contrast to other cots in which an unregulated drop of the cot occurs when used in manual mode (e.g., leading to dangerous conditions for a subject transported on such a cot (e.g., risk of rapid, uncontrolled drop)). In addition, the velocity fuse 311 also serves to stop the cylinder if a hose is ruptured or loss of fluid or valve malfunction (e.g., if there were a malfunction, cot would drop only momentarily until the velocity fuse is activated, and when activated, stops all movement of the cylinder).

Figure 49:
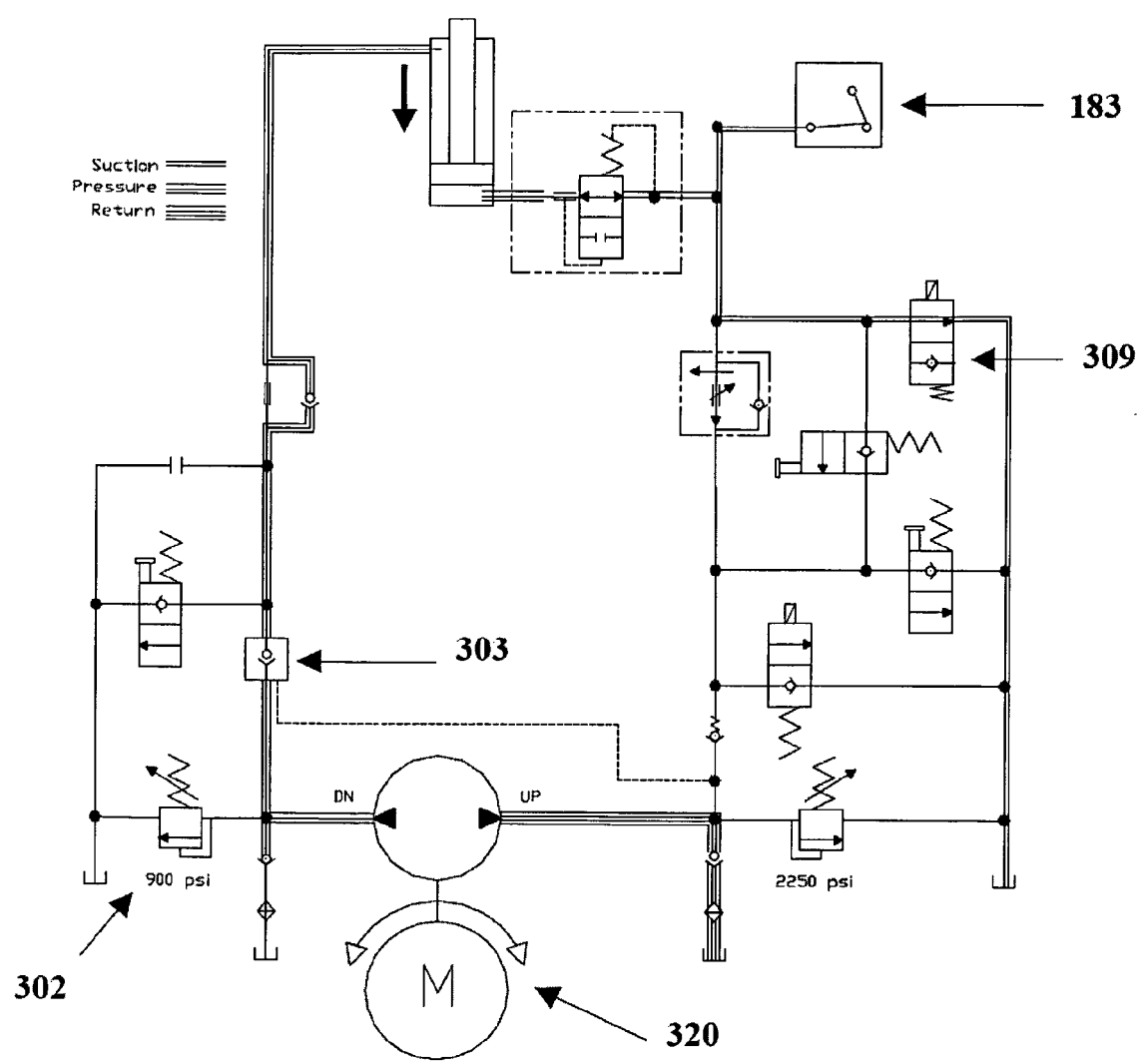
FIG. 49 shows valve configuration of a hydraulic system manifold during a powered quick collapse of a cot in one embodiment of the invention.

FIG. 49 illustrates valve configuration during a powered, quick collapse of a cot of the present invention. For example, when the down button is depressed and the system pressure is below 25 pounds per square inch (PSI) (e.g., when load wheels of a load rail assembly are resting upon the deck of an ambulance and the leg assemblies are outside of the ambulance such that the wheels attached to the base frame are suspended in air), the pump 320 is turned in a direction that supplies fluid to the rod end of the cylinder. Fluid passes through the P.O. check valve 303 in the free flow direction and into the rod end of the cylinder. The quick collapse valve 309 opens to allow fluid to travel from the cap end of the cylinder to tank as the cylinder retracts. System pressure is monitored by the pressure transducer 183 (e.g., that is used to initiate a quick collapse). If system pressure (e.g., monitored by the pressure transducer 183) rises above 25 PSI the cot remains in quick collapse mode until the down button is released or the cot legs are fully collapsed/retracted. If an obstacle obstructs collapsing of the legs (e.g., an object is placed in a certain manner so that it interferes with the movement of the legs) maximum system pressure is limited by the rod end pressure relief valve 302. This rod end pressure relief valve is configured (e.g., set at a pressure high enough) to reliably lift the legs without allowing excess system pressure that might damage the cot or an obstacle if the obstacle were obstructing the collapsing motion of the legs (e.g., an object is placed in a certain manner so that it interferes with the movement of the legs) or potentially torquing the cot from the users hands if such an obstacle were encountered.

Thus, the present invention provides a hydraulic system that will not continue to force the legs to collapse (e.g., raise (e.g., when load wheels of a load rail assembly are resting upon the deck of an ambulance and the leg assemblies are outside of the ambulance such that the wheels attached to the base frame are suspended in air)) if there is something that impedes the collapsing/raising of the legs (e.g., a bag, portion of the ambulance (e.g., metal grates), etc.). Thus, a cot of the present invention will not continue to pull the legs upward when impeded, potentially causing damage to the cot and or ambulance. (e.g., metal grate that lifts up on the tail end portion of many ambulances). For example, if the cot (e.g., the cot's hydraulic system) were not configured this way, there would exist a significant risk that as the cot were being loaded (e.g., onto the deck of the ambulance) by raising the legs using the hydraulic system, if the hydraulic system did not possess the ability to preclude forcibly raising up (lower) through an object, the legs would continue to raise up and through the object, causing the cot to tilt as the force from the object exerted on the legs becomes so great so as to overtake the user's ability to control the cot (e.g., potentially leading to tipping of the cot).

Figure 50:
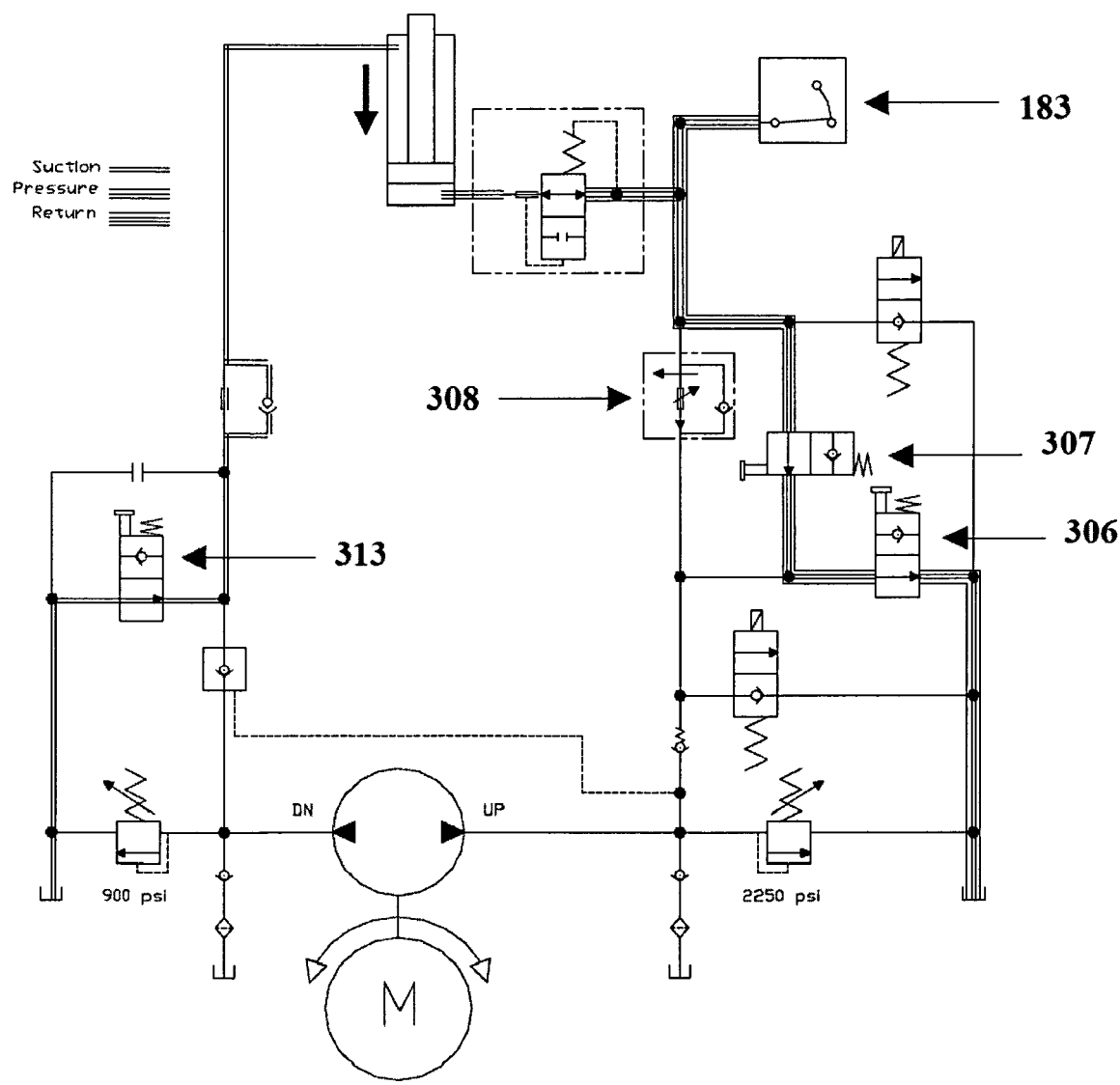
FIG. 50 shows valve configuration of a hydraulic system manifold during a manual collapsing of a cot via lifting of leg assemblies in one embodiment of the invention.

FIG. 50 illustrates valve configuration during a manual collapsing of the legs (e.g., when load wheels of a load rail assembly are resting upon the deck of an ambulance and the leg assemblies are outside of the ambulance such that the wheels attached to the base frame are suspended in air). When the manual release lever is pulled (e.g., with the leg assemblies suspended in the air) fluid is drawn out of the tank through the manual down valve 313 and into the rod end of the cylinder. Fluid travels around the pressure compensated flow control 308 because system pressure is at zero which causes the spring loaded plunger 179 to actuate the shift of the flow control bypass valve 307 to shift. Fluid is returned to tank through the manual up valve 306.

Figure 51:
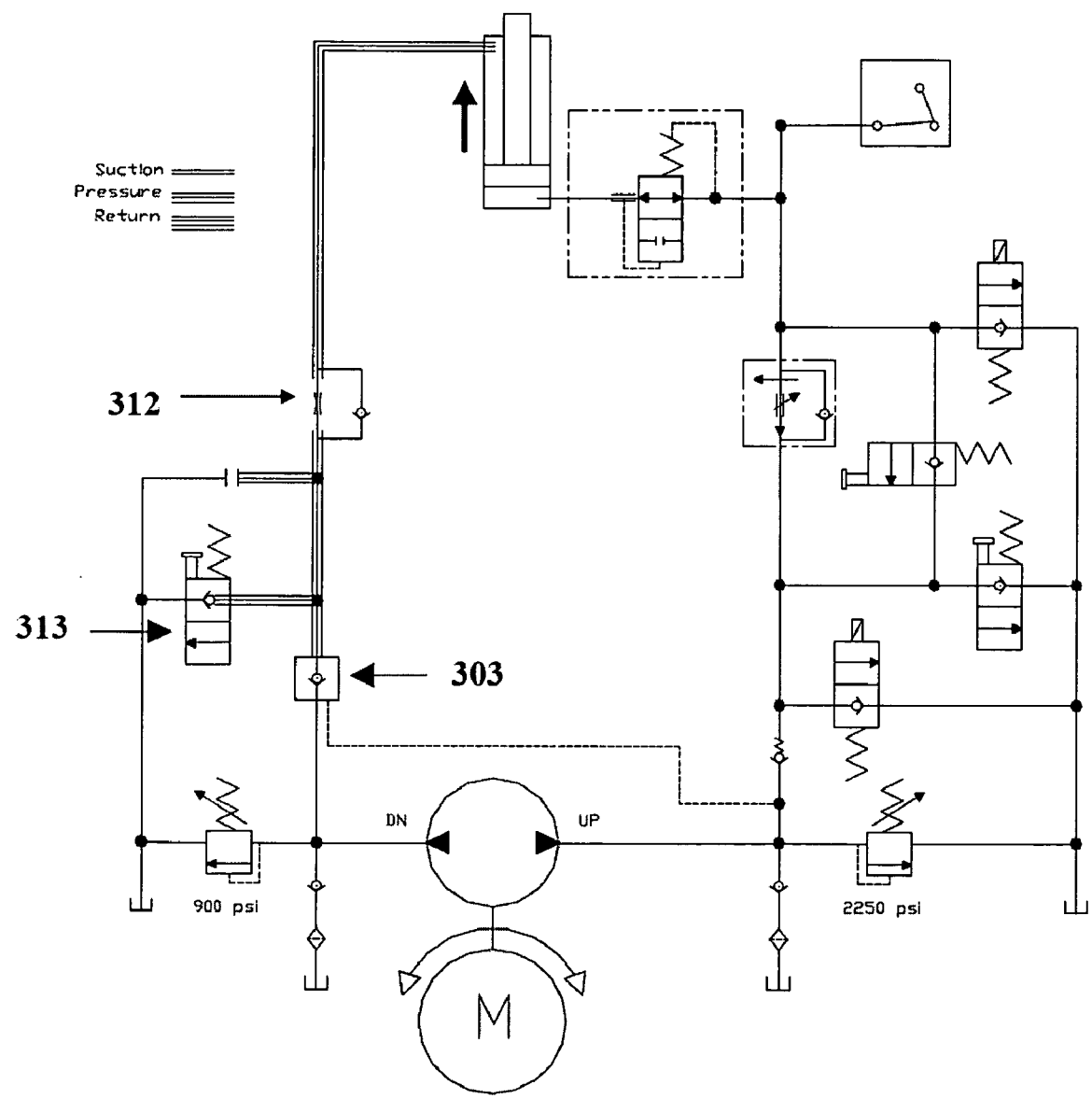
FIG. 51 shows valve configuration of a hydraulic system manifold while holding cot legs up in one embodiment of the invention.

FIG. 51 illustrates valve configuration that holds the legs in a collapsed position (e.g., when the legs are suspended in the air (e.g., when load wheels of a load rail assembly are resting upon the deck of an ambulance and the leg assemblies are outside of the ambulance such that the wheels attached to the base frame are suspended in air)). When the legs are suspended, the P.O. check valve 303, and the manual release down valve 313 prevent fluid from entering the tank/reservoir from the rod end of the cylinder.

FIG. 52 illustrates valve configuration during manual lowering of leg assemblies (e.g., when load wheels of a load rail assembly are resting upon the deck of an ambulance and the leg assemblies are outside of the ambulance such that the wheels attached to the base frame are suspended in air). When the manual release lever is pulled (e.g., when the leg assemblies are suspended in air) gravity pulls the undercarriage down, extending the cylinder. Fluid is drawn out of the tank through both the manual release up valve 306 and the flow control bypass valve 307 into the cap end of the cylinder. Fluid exiting the rod end of the cylinder is metered by the check valve orifice 312 due to the overrunning load condition. The fluid returns to tank through the manual release down valve 313.

The present invention is not limited by the type of valves utilized as described in FIGS. 44-52. A number of different types of valves may be used in a cot of the present invention including, but not limited to, a valve manufactured and/or sold by PARKER HANNIFIN (Cleveland, Ohio) (e.g., 2-way valve, pull to open valve, normally closed valve, poppet type directional valve, etc.), a valve manufactured and/or sold by SUN HYDRAULICS Corporation (Sarasota, Fla.) (e.g., fixed orifice valve, pressure compensated flow control valve with reverse flow check, 2-way, direct acting, soft shift, solenoid operated directional poppet valve, free flow nose to side check valve, etc.), and/or a valve manufactured and/or sold by HYDRA FORCE (e.g., a 2-way, push to open, normally closed poppet type directional valve), among others.

Thus, in some embodiments, controlling (e.g., powering) the raising and collapsing of leg assemblies (e.g., fixed leg assembly and a telescoping leg assembly comprising a roller bearing system) is performed by a hydraulic system. For example, in some embodiments a hydraulic system comprising a hydraulic cylinder comprising a 1.5 inch bore and/or a 1 inch diameter rod is utilized. The present invention is not limited by the size of bore and/or rod diameter. Indeed, in some embodiments, smaller (e.g., less than 1.5 inch) or larger (e.g., larger than 1.5 inches) bore diameters are utilized. Similarly, the present invention is not limited by the size of rod used. In some embodiments, smaller (e.g., less than 1 inch in diameter) or larger (greater than 1 inch in diameter) are utilized. In some embodiments, a hydraulic system comprising a 1.5 inch bore cylinder comprising a 1 inch diameter rod comprises a 7.5 inch stroke length.

In some embodiments, a cot comprises a hydraulic system comprising hydraulic fluid that flows at about 0.8 gallons per minute (GPM) (e.g., when there is no weight (e.g., downward force) upon the cot) when the hydraulic system is utilized to raise and/or lower leg assemblies of the cot. In some embodiments, a cot comprises a hydraulic system comprising hydraulic fluid that flows at about 0.4 GPM (e.g., when a subject resides upon the cot) when the hydraulic system is utilized to raise and/or lower the leg assemblies of the cot. In some embodiments, a cot comprises a hydraulic system comprising hydraulic fluid that flows at 0.48 GPM when the leg assemblies of the cot are collapsed (e.g., during a quick collapse of the cot).

The cylinder rod is in a retracted position when the cot is collapsed/in fully lowered position. As shown in FIG. 12, if raising power is applied to the hydraulic system, cylinder length extends (e.g., cylinder rod 60 extends outward from cylinder body 61), pushing up on cylinder mount 58, wherein the cylinder mount 58 is attached to the telescoping leg pivots 52 attached to the fixed legs 40 and the telescoping legs 50, forcing the telescoping legs 50 to extend and the fixed legs 40 to rise. Concurrently (e.g., as shown in FIG. 14), the slider block 83 attached to the ends of the cross tube 78 connected to the main rail 51 of the telescoping legs 50 slides along the slider housing 75 toward the head-end of the cot, thereby raising the cot (e.g., sliding from foot-end (when in collapsed/lowered position) to the head-end portion of the slider housing 75). In some embodiments, the hydraulic cylinder mount is configured to withstand greater than 3600 lbs of force (e.g., greater than 3750 PSI, greater than 4000 PSI, greater than 4250 PSI) from the cylinder. While the cylinder 61 and cylinder rod 60 raise the fixed legs 40 and the telescoping legs 50, the cylinder itself pivots about the foot-end cross tube 12 via attachment to a cylinder base pivot 59 (e.g., via bearings within the pivot). As described above, the development of a roller bearing system within the telescoping legs provided by the present invention reduced frictional force associated with actuation of the legs, thereby decreasing the force placed upon components of the hydraulic cylinder (e.g., cylinder rod (e.g., thereby decreasing side loads that are created upon the rod and/or cylinder body during raising and lowering of the cot)). This in turn provides less risk for damage to the hydraulic system and a stronger and more robust cot system. For example, prior to development of a cot comprising a fixed leg assembly and a telescoping leg assembly comprising a roller bearing system, a cot tested during development of embodiments of the invention was limited to a 300 pound lift weight. However, a cot of the present invention has no problem lifting or lowering weights in excess of 650 pounds. In some embodiments, maximum lift weight of a cot of the present invention is limited only by a regulator valve (e.g., a valve 302 described in FIG. 44 (e.g., required by regulatory body (e.g., the U.S. Food and Drug Administration) for use as a device to transport human subjects)).

The present invention is not limited to any particular hydraulic system power/pumping unit. Indeed, any bi-rotational power/pump unit finds use in a cot system of the present invention. In some embodiments, a cot system of the present invention utilizes a PARKER HANNIFIN bi-rotational power unit (e.g., model no. 118BIS32-BRR-1H-07-22-YZ) or similar unit (e.g., that provides a flow rate sufficient for a cot of the present invention (e.g., described herein)).

In some embodiments, the present invention provides a tip angle monitoring, recording and alert system. For example, in some embodiments, a cot system of the present invention comprises a tip angle monitoring, recording and alert system. A tip angle system of the present invention comprises the ability to simultaneously, and in real time, measure cot load, cot height and cot angle, and utilize each of these measurements to calculate tip angle of the cot. As used herein, the term "tip angle," refers to the position at which a cot (e.g., not bearing a load, or bearing load weight (e.g., of any weight (e.g., ranging from about 10 pounds to about 1000 pounds))) of the present invention is determined (e.g., experimentally determined via modeling and/or experiments conducted during development of the present invention) to be at that angle at which the cot will tip (e.g., dependent upon factors such as cot height, load weight, and the angle of lateral (e.g., side-to-side) movement of one or more reference points upon the cot (e.g., a 3-axis accelerometer mounted upon the controller's circuit board) with respect to a horizontal plane that is more or less perpendicular to the earth's gravitational force). For example, as shown in FIG. 69, tip angle values were calculated by determining the center of mass 247 for the cot system (e.g., the center of mass for a subject was assessed to occur at a height equal to approximately 55% of full subject height, acting along his/her central axis, placing the center of mass generally over the litter seat) at varying litter heights and patient weight (e.g., for a subject of 100 pounds, 200 pounds, 300 pounds, 400 pounds, 500 pounds, or 600 pounds (See, e.g., FIG. 69)). The present invention is not limited by these weights. Indeed, other subject weights can be measured (e.g., below 100 pounds or above 600 pounds). In addition, values of each of the tested weights can be extrapolated to determine information for weight points falling between two measured weights. Each of these mass centers were then placed graphically in a cot model with a line sketched from each individual center of mass 247 to the contact point 248 between the cot wheels and the ground. The casters were modeled to be rotated "inward" providing the narrowest track width possible. The angles 249 between each of these sketched lines and vertical was assigned the tip angle of the cot for that particular height/load combination. These values were further refined through a collection of empirical data. A cot was loaded with various weights and physically "tipped" until it reached its tip-over angle. This angle was measured and recorded.

Thus, the present invention provides methods of collecting tip angle data, as well as data comprising tip angle information for any particular cot (e.g., comprising a tip angle monitoring, recording and alert system of the present invention). Thus, systems and methods of the present invention can be used to determine the tip angle of any cot (e.g., added onto an existing cot to determine, monitor and/or alert as to cot tip angle).

Figure 34:
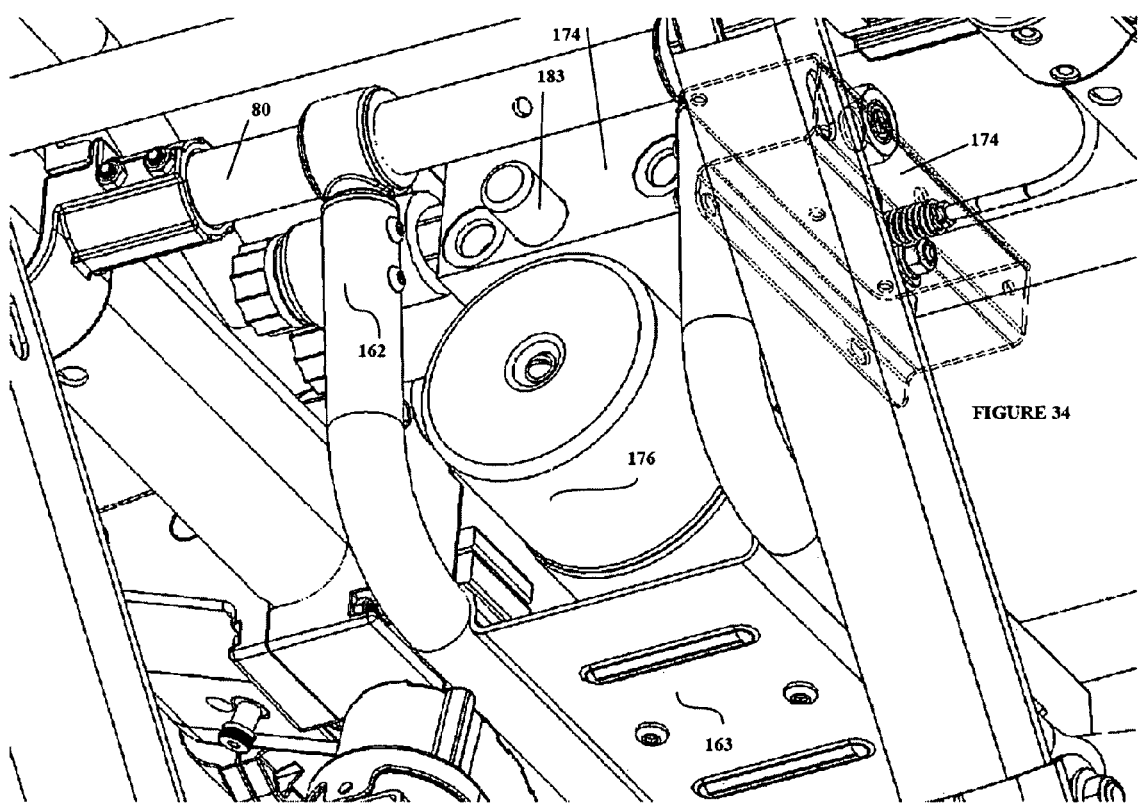
FIG. 34 shows components of a hydraulic system including a pressure transducer in one embodiment of the invention.
Figure 35:
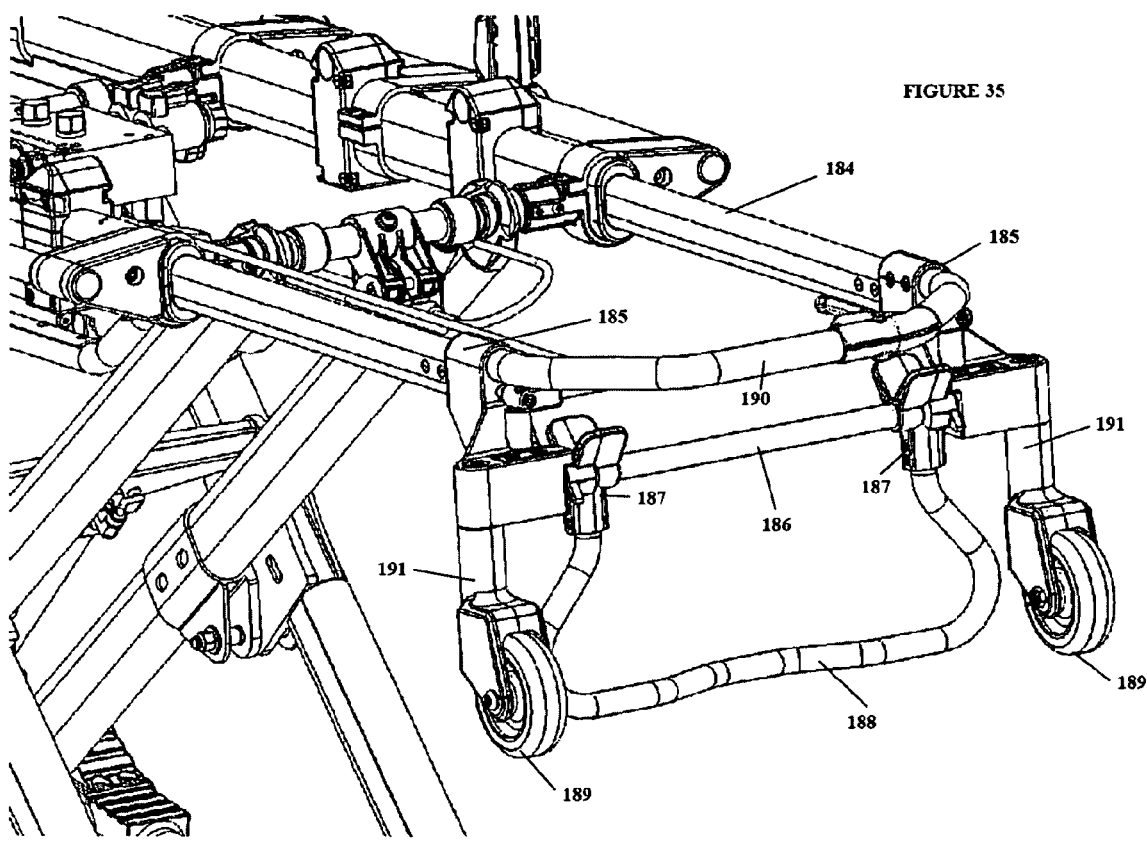
FIG. 35 shows components of a telescoping load rail assembly in one embodiment of the invention.

The present invention is not limited by the method of determining load weight upon a cot of the present invention. In a preferred embodiment, load weight is determined utilizing a pressure transducer 183 housed on and/or within a hydraulic system manifold (e.g., shown in FIG. 34). The pressure transducer converts hydraulic system pressure information into voltage information. Thus, in some embodiments, a cot system of the present invention utilizes hydraulic system pressure to calculate patient weight. For example, one or more pressure transducers (e.g., that is an internal component of a hydraulic system manifold and/or that plugs into the manifold) are wired to a controller that is configured to detect signals (e.g., analog voltage) from the transducer. As pressure within the hydraulic system varies, the transducer will provide a different signal (e.g., voltage feedback) to the controller, that is configured to monitor the signals (e.g., voltage variations (e.g., pressure changes)) and to calculate load (e.g., subject) weight therefrom. As described above, a pressure transducer can monitor various conditions of the cot (e.g., whether or not a subject is present on the cot) and provide this information to the controller (e.g., that is configured to regulate valve configuration within the hydraulic system manifold (e.g., to prevent engagement of a quick collapse mode of the cot (e.g., when system pressure is greater than 25 PSI))).

The present invention is not limited to use of a pressure transducer to monitor load weight upon a cot described herein. For example, other means may be utilized to determine load weight including, but not limited to, use of a load cell, use of a pressure switch, or a combined use of one or more pressure switches and/or motor current feedback, or monitoring of motor current correlated to system loads (e.g., as the current is directly related to system pressures).

Figure 15:
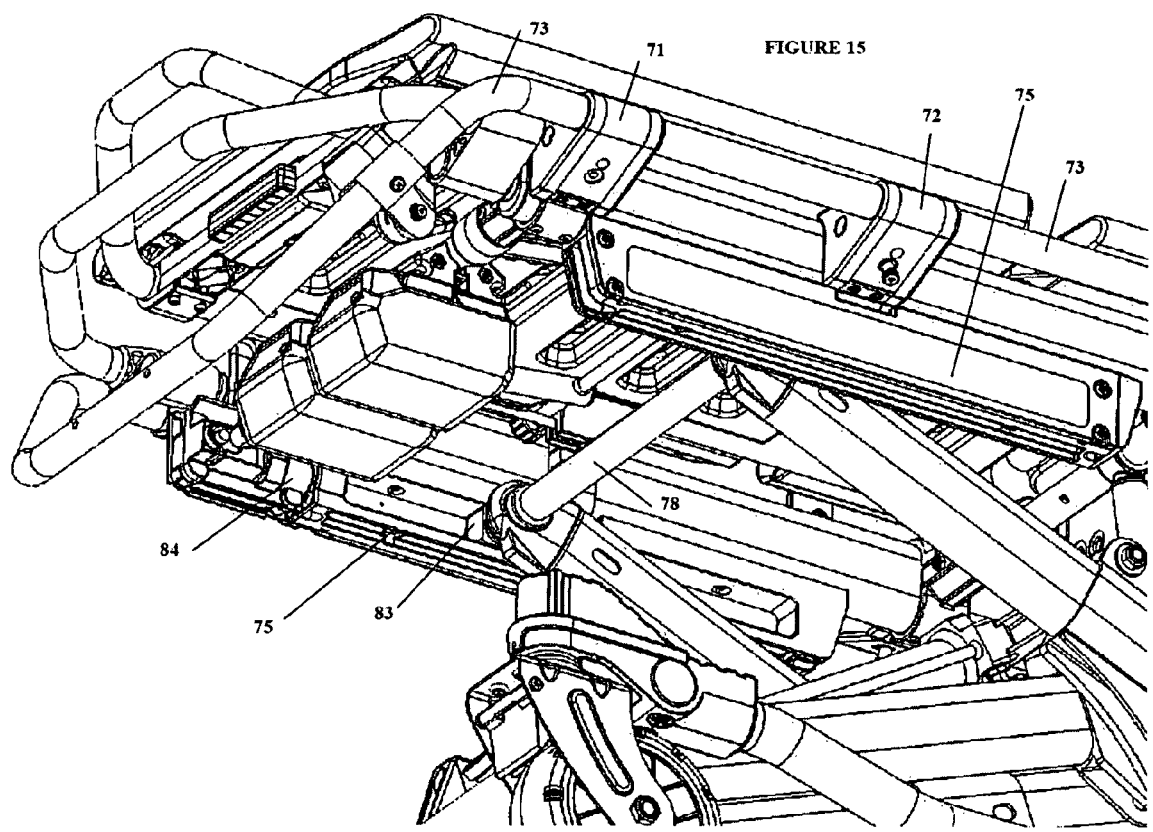
FIG. 15 shows a view of foot end components of a cot in a position such that the patient litter is in a level position in one embodiment of the present invention.

The present invention is not limited by the method of determining cot height. In a preferred embodiment, cot height is measured using an ultrasonic sensor. For example, as illustrated in FIGS. 14-16, an ultrasonic sensor 84 may be attached to and/or housed within the slider housings 75 attached to the foot end region of the top frame 74. The ultrasonic sensor 84 measures the distance between the sensor 84 and a slider block 83 attached to the cross tube 78 attached to the main rails 51 of the telescoping legs 50. In some embodiments, the distance between the sensor 84 and the slider block 83 represents the distance between the ground and the load wheels 189 of the telescoping load rail assembly 184. In some embodiments, an ultrasonic sensor is wired to a controller. In some embodiments, a controller is configured to detect signals (e.g., voltage signals) from the sensor. Thus, in some embodiments, as the distance between the sensor 84 and the slider block 83 changes (e.g., as the slider block 83 attached to the ends of the cross tube 78 connected to the main rail 51 of the telescoping legs 50 slides along the slider housing 75 toward the head-end of the cot (e.g., when the cot is raised by a hydraulic system described herein)), the sensor 84 provides a different signal (e.g., voltage input) to the controller configured to monitor the signals (e.g., voltage information) and to calculate cot height (e.g., height of load wheel 189 of a telescoping load rail assembly) therefrom.

A cot of the present invention can be programmed to raise to a specific height (e.g., a specific load wheel height (e.g., of 36 inches) or another height (e.g., the height from the ground at which the load wheels are moved into a position on or just above the deck of a particular ambulance))). For example, because the ultrasonic sensor measures the distance between the slider block 83 and the ultrasonic sensor 84 (e.g., correlating with the distance the telescoping legs have been expanded and the amount both the fixed legs as well as the telescoping legs have been raised), a user can set a maximum height that the cot will raise such that the load wheels are a desired height at the maximum set height (e.g., 28, 30, 32, 34, or more (e.g., 35 or 36) or less (27, 26, 25 or less) inches). Travel beyond a user define maximum set height (e.g., load height) is made possible by removing and reapplying the signal to raise (e.g., re-pressing the up button) until the cot reaches it's factory defined end of travel limit.

The ability to program cot height (e.g., using the signal from an ultrasonic sensor at the push of a readily accessible button (e.g., located on the control panel (e.g., See FIG. 55, load height set button 115))) is a significant improvement in the field. For example, programmable cot height permits (e.g., at the push of a button (e.g., located on the control panel)) a user to set the maximum height of the cot (e.g., via a controller sensing signals (e.g., voltage signals) sent by an ultrasonic sensor that correlates to a set height)). This is in contrast to other cots the rely upon other means (e.g., hall effect switches) placed within difficult to access housing, wherein if a user wanted to re-set the maximum height of a cot, user would be required to use tools (e.g., screwdriver, etc.) in order to open the housing, remove the housing, and then manually reset the max cot height (e.g., by manually moving a hall effect switch or magnet).

Figure 55:
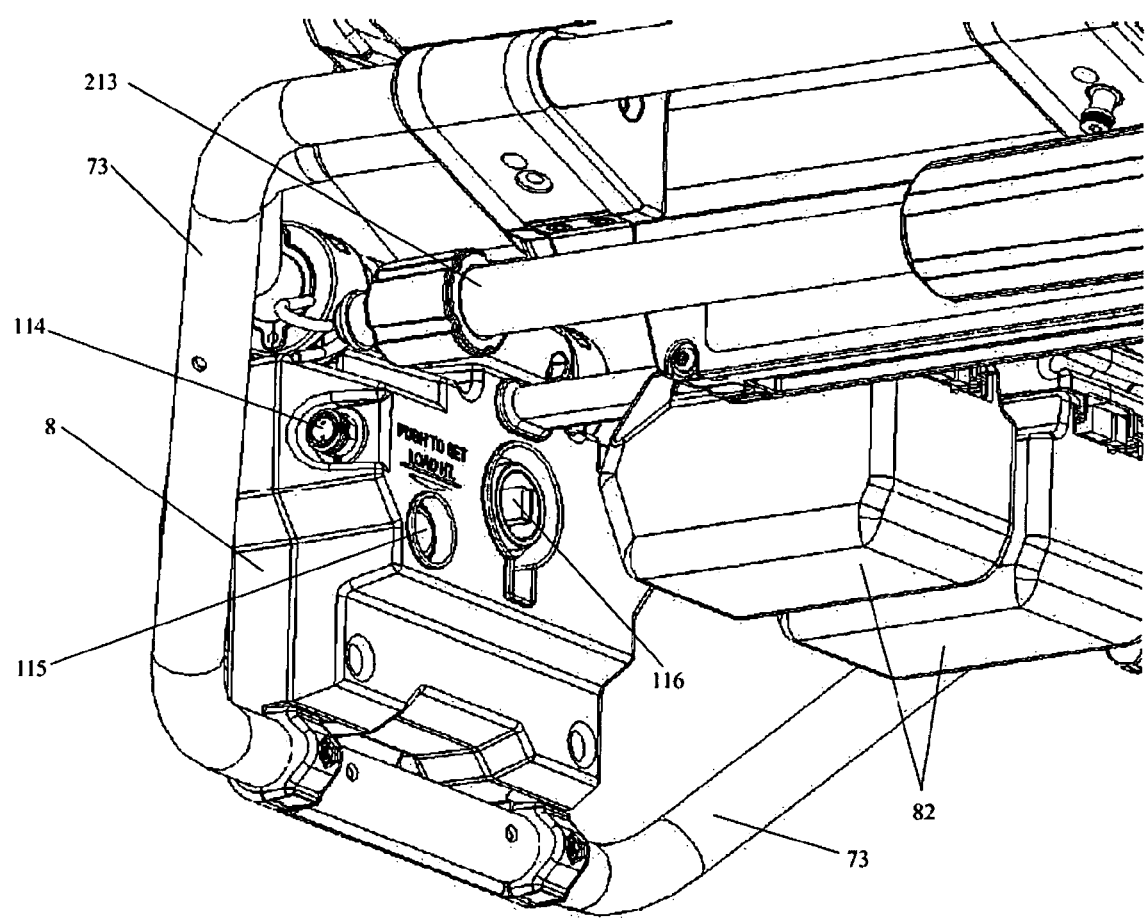
FIG. 55 shows attachment of a controller housing to the foot-end portion of a cot in one embodiment of the invention.

In some embodiments, a controller of the present invention is configured to store (e.g., in memory) a user set maximum cot height (e.g., set by pressing a load height set button 115 shown in FIG. 55). When a user resets the maximum height of the cot, the previously recorded set height data is removed from memory and the new set height data is recorded in it's place.

The present invention is not limited by the method of determining the angle of lateral movement of one or more reference points upon the cot. For example, in a preferred embodiment, one or more of the reference points used to determine angle of side-to-side movement of the cot is housed upon a circuit board housed in the controller housing. For example, a reference point may comprise an accelerometer located within and/or upon a circuit board housed in a controller.

In some embodiments, one or more reference points comprise other locations upon the cot including, but not limited to, one or more locations on the top frame (e.g., including, but not limited to, a location on one of the cross tubes (e.g., top frame foot-end cross tube, top frame middle region cross tube, top frame head-end cross tube) connected to the top frame 74), one or more locations on a patient litter (e.g., let litter, thigh litter, seat/lower torso litter, and/or head/upper torso litter), one or more locations on a leg assembly (e.g., fixed leg assembly and/or telescoping leg assembly), or other part of a cot provided herein.

In a further preferred embodiment, one or more of the reference points comprise a device configured to monitor lateral, side-to-side movement (e.g., an accelerometer, gyroscope, etc.). In some embodiments the device is an accelerometer. In some embodiments, an accelerometer is mounted upon a circuit board housed within the controller housing (e.g., as shown in FIG. 13, that is located between and attached to the team lift rail 73 and foot end rail/lift handle 6 that surround the foot end region of the cot) and is in informational contact with a controller. In some embodiments, a controller is configured to detect signals (e.g., voltage signals) from the device (e.g., accelerometer) configured to monitor lateral movement. Thus, in some embodiments, as the accelerometer detects lateral movement (e.g., the angle of lateral (e.g., side-to-side) movement of the circuit board with respect to a horizontal plane drawn through the circuit board (e.g., through the accelerometer) that is more or less perpendicular to the earth's gravitational force), the accelerometer provides a different signal (e.g., voltage input) to the controller configured to monitor the signals (e.g., voltage information) and to determine the angle of the cot (e.g., the degree of movement away from the horizontal plane drawn through the circuit board) therefrom.

In some embodiments, tip angle values are calculated by using a pre-determined and/or pre-calculated center of mass for a cot system (e.g., comprising a subject) and/or subject. For example, in some embodiments, the center of mass for a subject is calculated to occur at a height equal to approximately 55% of full subject height, acting along its central axis. Thus, in some embodiments, this places the center of mass for a subject approximately over the litter seat. This center of mass is then factored into the center of mass for an unloaded and/or loaded cot for varying subject weights at varying cot heights (e.g., the center of mass is determined for patient weight at varying litter heights and patient weights (e.g., for patient weight values of 100, 200, 300, 400, 500 and 600 pounds). Each of these mass centers is then placed graphically in a cot model with a line sketched from each individual center of mass to the contact point between the cot wheels and the ground (e.g., with the caster forks rotated "inward" providing the narrowest track width possible). The angles between each of these sketched lines and vertical can be designated the tip angle of the cot for each particular height/load combination (e.g., measured angle can be programmed into a cot system as the tip angle, or, the angle can have degrees added to it or subtracted from it and this modified angle can then be programmed into a cot system of the present invention). In some embodiments, the center of mass is calculated to occur at a different location (e.g., not over the litter seat (e.g., over the thigh litter or upper torso litter). In some embodiments, the tip angle can be programmed at a lower value than that of its actual value (e.g., in order to accommodate patient comfort concerns).

Experiments conducted during development of embodiments of the invention further refined these values through the collection of empirical data. For example, a cot was loaded with various weights and physically "tipped" until it reached the angle at which the cot tipped over. This angle was measured and recorded.

As shown in FIG. 69, the present invention provides specific angles at which a cot will tip (e.g., depending upon the cot angle, weight upon the cot and/or the height at which the cot is raised).

Thus, the present invention thus provides the ability to determine the tip angle of any cot (e.g., comprising a tip angle monitoring, recording and alert system as described herein). For example, if future improvements are made to a cot of the present invention, it will be possible to use the same type of system and/or procedure to identify and/or characterize tip angle data. Additionally, a tip angle monitoring, recording and alert system of the present invention can be added onto any existing cot (e.g., retrofitted onto existing cots). In this way, existing cots can be made safer (e.g., by alerting a user of the cot to unsafe operating conditions (e.g., unsafe operational angles of the cot)). In some embodiments, a tip angle monitoring, recording and alert system is utilized to customize cot design (e.g., used to design a cot that is sturdier and/or more robust (e.g., less likely to tip)).

In some embodiments, the cot is configured to provide an audible and/or visual alarm in the event the side-to-side angle of movement of the cot approaches and/or reaches an angle at which the cot will tip (e.g., depending upon cot angle, load weight and/or litter height). In some embodiments, the audio alert comprises a pulsed tone signal and/or a solid tone signal. For example, in some embodiments, a pulsed tone signal sounds when the cot angle reaches a position that is within a certain specified (e.g., pre-set) range from the tip angle (e.g., at five degrees, four degrees, three degrees or less from the angle at which the cot has been determined to tip (e.g., under certain weight and/or height conditions (e.g., provided in a tip algorithm (e.g., programmed into and/or housed within the cot's controller (e.g., within a firmware component of the controller)))))). In some embodiments, a solid tone signal sounds when the cot reaches a preset angle at which the cot will tip or a certain number of degrees (e.g., three degrees, two degrees, one degree) from the angle at which the cot will tip (e.g., as determined in real time by the tip angle monitoring, recording and alert system (e.g., utilizing a tip angle algorithm (e.g., programmed into and/or housed within the cot's controller (e.g., within a firmware component of the controller))).

The present invention is not limited to any particular controller. Indeed, a variety of controllers may be utilized to receive (e.g., from a transducer, sensor, and/or angular movement sensing device), process, and/or send information regarding cot usage. For example, controllers that find use in the present invention include, but are not limited to, a 32 bit microcontroller (e.g., that utilizes a reduced instruction set computing (RISC) microprocessor). In some embodiments, a controller utilized in the present invention integrates a 12-bit analog-to-digital converter (ADC), queued serial peripheral interfaces (QSPI), and/or a four channel general purpose timer (GPT) (e.g. capable of pulse width modulation (PWM)). The present invention is not limited to any particular controller. Indeed, any controller comprising one or more of the functions described above can be utilized herein. In some embodiments, a cot of the present invention utilizes a FREESCALE COLDFIRE MCF52210/AMCF52223 microcontroller.

In some embodiments, a controller stores data in non-volatile flash memory, which communicates with the microcontroller via a serial peripheral interface (SPI) bus. During operation of the cot, the microcontroller is configured to save and access a variety of data including load height and calibration information (e.g., as described herein). Calibration information is used to convert pressure information (e.g., captured by a pressure transducer) into weight information (e.g., subject weight upon the cot). The controller is also configured to log events into a memory component (e.g., flash memory) of the cot. In some embodiments, the events logged include serial number, event, date and time, lift time, battery 1 status, battery 2 status, weight, height, system pressure, and/or service code.

In some embodiments, a controller is configured to consider one or a plurality of scenarios. For example, a controller can be configured to sort through a look-up table (e.g., a table described in FIG. 69) to determine the angle of tip for a given height (e.g., height as determined from ultrasonic sensor signal) and weight (e.g., as determined from pressure transducer signal). In this scenario, the tip monitoring, recording and alert system warns of unsafe operating angles during transport of the cot to and/or from an ambulance (e.g., if rolling across uneven terrain). A controller can also be configured to sort through a look-up table (e.g., a table described in FIG. 69) to determine tip height for a given weight (e.g., as determined by pressure transducer signal) and angle (e.g., as measured by a 3-axis accelerometer). In this scenario, the tip monitoring, recording and alert system warns of a lift (e.g., beyond a certain height) of a patient positioned on an angle (e.g., on the side of a hill or other terrain) causing the cot to not sit level (e.g., for which lifting beyond a particular height could cause the cot to tip). In some embodiments, a controller is configured to record cot height, weight upon the cot, degree of movement of cot, and/or tip angle of cot (e.g., into memory storage means (e.g., a hard drive, disk, memory card, etc.) during usage of the cot.

As described herein, in some embodiments, height is measured by an ultrasound transducer (e.g., that provides an analog voltage to the ADC on the microcontroller). In some embodiments, the voltage is linearly proportional to the cot height (e.g., the higher the cot, the higher the output voltage of the transducer). In some embodiments, to determine subject weight upon a cot, a pressure transducer first provides an analog voltage to the ADC on the microcontroller. In some embodiments, the microcontroller then calculates subject weight upon the cot according to the direction of movement of the cot.

For example, if the cot is rising, the weight is calculated as:

$$PW=(SP-LP)*CMU$$

wherein PW equals patient weight; SP equals system pressure; LP equals lift litter pressure; and CMU equals calibration multiplier up.

In some embodiments, lift litter pressure is determined in calibration mode, when the litter is lifted and lowered empty. The CMU is then determined in calibration mode as:

$$CMU=CW/(SP-LP)$$

wherein CW equals calibration weight; SP equals system pressure; and LP equals lift litter pressure. In some embodiments, the calibration weight is set to a weight that represents an empty cot litter or other set weight (e.g., 100 pounds, 200 pounds, 300 pounds). In some embodiments, the calibration weight is set to 200 pounds.

If the cot is moving down, subject weight is calculated as:

$$PW=(SP-LP)*CMD$$

wherein CMD equals calibration multiplier down; DP equals down litter pressure; SP equals system pressure; and LP equals lift litter pressure. Similar to lift litter pressure, down litter pressure is determined with an empty cot in calibration mode. CMD is then determined in calibration mode as:

$$CMD=CW/(SP-DP)$$

wherein CW equals calibration weight; SP equals system pressure; and LP equals lift litter pressure. In some embodiments, the calibration weight is set to 200 pounds.

In some embodiments, cot height, weight upon the cot and cot angle are all utilized to determine tip angle (e.g., the tip condition). In some embodiments, to determine angle of the cot, axis values are provided to the microcontroller by a 3-axis digital output linear accelerometer. In some embodiments, the accelerometer provides the microcontroller with measured acceleration signals through a serial peripheral interface, which is read by the microcontroller every 70 ms. In some embodiments, the microprocessor then converts these axis values to angle values as:

$$xAngle=(oldXAngle+(newXAxis/11.3777))/2$$

In some embodiments, although the microprocessor calculates an angle for each axis (xAngle, yAngle, zAngle), only the xAngle is used to determine a tip condition. In some embodiments, the microcontroller compares the xAngle to two tip angles, an alarm angle and a warning angle. An alarm angle is determined, as described herein, using a two dimensional look-up-table that has been constructed according to the independent variables of height and weight. In some embodiments, the warning angle is then calculated as: warning angle=alarm angle–a certain amount of degrees (e.g., 5, 4, 3, 2, or 1 degrees).

The xAngle is then compared to the tip angles to determine a tip condition. If the xAngle is less than the warning angle, the system continues to operate normally. If the xAngle is greater than or equal to the warning angle but less than the alarm angle, the system enters into the warning state (e.g., the microcontroller initiates a pulsed tone signal to be sounded from a speaker within the controller housing and/or a light illuminates upon the user interface). If the xAngle is greater than or equal to the alarm angle, the system enters the alarm state (e.g., the microcontroller initiates a constant, solid tone signal to be sounded from a speaker within the controller housing and/or a light illuminates upon the user interface).

In some embodiments, in the warning state, an audible alarm pulsates on and off. In some embodiments, if the system enters into the alarm state, the audible alarm changes to a constant, solid tone. In some embodiments, if the cot is in the process of rising when the alarm state is reached, the microcontroller will interrupt the rise (e.g., inhibit the user's normal ability to raise the cot by pushing the raise button). In some embodiments, if a user desires to increase height despite the warning, a user may do so by releasing and repressing the up/raise button. The cot will continue to rise, albeit in a slower 'jog' mode.

In some embodiments, a look up table utilized by the controller comprises angle and weight as independent variables. For example, when weight and angle are independent variables, the microcontroller will review the table to determine the maximum height before a tip condition is reached. Thus, the existing cot height is then compared to the maximum height, to generate both a warning state and an alarm state.

In some embodiments, the tip angle monitoring, recording, and alert system captures and records cot operational use information. In some embodiments, recorded cot operational use information is stored in a memory component (e.g., present on a circuit board housed within the controller housing). In some embodiments, cot operational use information comprises cot angle (e.g., all angles recorded by the tip angle system described herein (e.g., any angle of the cot that is outside a range (e.g., three degrees) approaching the tip angle of the cot (e.g., an angle at which a cot is parallel to a horizontal plane that is perpendicular to the earth's gravitational force), angles of the cot that are within a range (e.g., three degrees or less) of the tip angle, angles that are equal to the tip angle and/or angles that are greater than the tip angle (e.g., calculated for a cot)))). The present invention is not limited by the type of cot operational use information recorded and stored. For example, cot operational use information includes, but is not limited to, cot angle, cot height, cot load weight, calendar date, time, identification of user, etc. In some embodiments, cot operational use information comprises unsafe cot operational angles.

Figure 39:
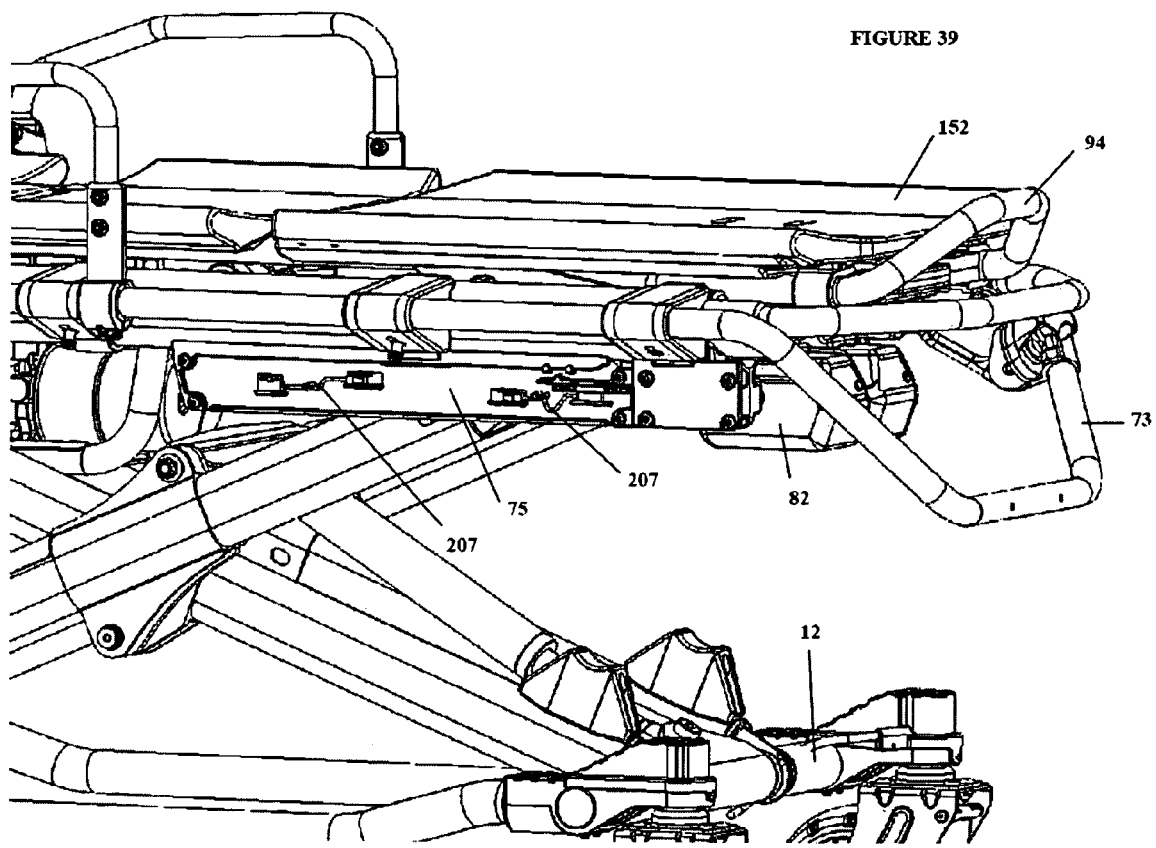
FIG. 39 shows the positioning of one or more hall effect switches in one embodiment of the invention.
Figure 40:
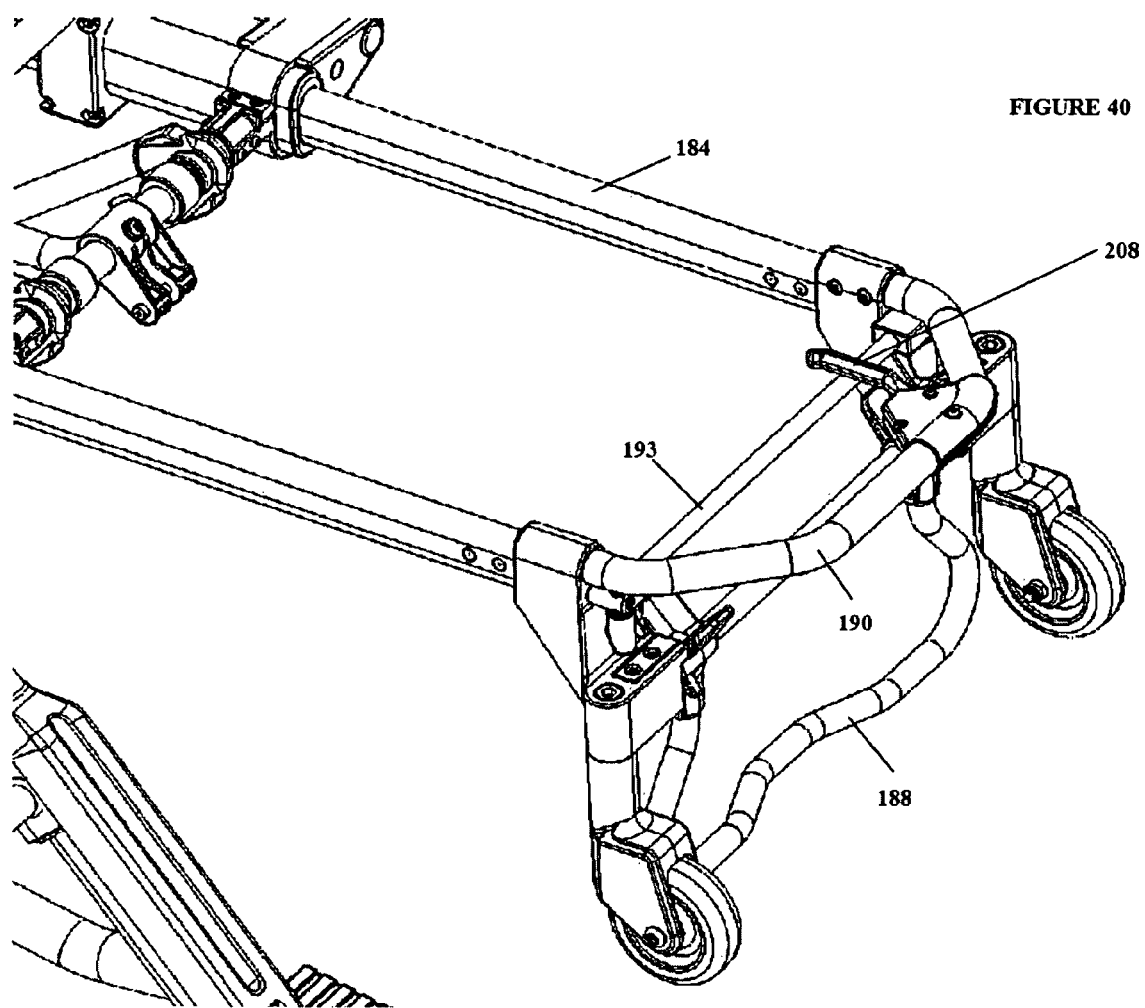
FIG. 40 shows the location of a hand brake lever in one embodiment of the invention.

In some embodiments, a cot of the present invention is configured to have multiple modes of operation. For example, in some embodiments, a cot of the present invention operates in a "System Ready," "In Ambulance," "Sleep," and/or other type of mode. In a "System Ready Mode," the cot is fully operational (e.g., all systems are functioning). For example, the electronic controller is monitoring system pressure, cot height and cot angle. In the "System Ready Mode," the controller can also be configured to allow the transfer of data (e.g., via USB or other type of port) and can display patient weight (e.g., on the control panel (e.g. in pounds and/or kilograms (e.g., in a 3 digit, 7-segment LED))) upon request. In an "In Ambulance" mode, the controller is configured to allow for the transfer of data as well as to display load weight (e.g., last recorded load value) upon the cot (e.g., subject weight (e.g., on the control panel)). In some embodiments, a cot is configured to be triggered to enter this mode by a magnet located within the deck of an ambulance (e.g., in an ambulance's mount system). The magnet trips a hall effect switch 207 located in a slider assembly 75 of the cot (e.g., See FIG. 39). In a "Sleep Mode" the controller monitors hydraulic system pressure and cot angle. In some embodiments, when the cot enters "Sleep Mode," the cot system is configured to recall the last recorded height of the patient litter (e.g., when the cot re-enters "System Ready Mode" (e.g., for the purposes of tip angle detection)).

In some embodiments, the present invention provides a cot (e.g., powered cot (e.g., hydraulically powered cot)) comprising an automatic retract system and methods of using the same (e.g., to load a subject into an ambulance). In some embodiments, the automatic retract system is configured to collapse the legs of the cot (e.g., to collapse the fixed length legs and/or the telescoping legs) from a raised position (e.g., a partially raised position and/or a fully raised position) to a collapsed (e.g., fully collapsed) position. For example, in some embodiments, an automatic retract system of the present invention comprises a device that measures pressure (e.g., hydraulic system pressure), a device that measures cot height (e.g., an ultrasonic sensor); and/or a device that measures cot angle (e.g., an accelerometer). In some embodiments, the automatic retract system of the present invention utilizes multiple components of a cot provided herein including, for example, a hydraulic system, a pressure transducer, an ultrasonic sensor, an accelerometer, and/or a device (e.g., a controller (e.g., microcontroller)) that receives and/or processes signals and/or information (e.g., voltage information) from said pressure transducer, ultrasonic sensor, accelerometer and/or other devices.

In some embodiments, an automatic retract system of the present invention utilizes components of a tip angle monitoring system provided herein. In some embodiments, a cot comprising an automatic retract system comprises a hydraulic system comprising a cylinder powered by a hydraulic unit. In some embodiments, a cot comprising an automatic retract system comprises a pressure transducer located within a hydraulic system of the cot (e.g., that detects hydraulic system pressure and converts the pressure to voltage information (e.g., monitored and/or recorded by a controller (e.g., microcontroller) of the cot). In some embodiments, an ultrasonic sensor of a cot comprising an automatic retract system measures the raised and/or collapsed position of the cot (e.g., by measuring the height of the patient litter and/or the distance between the ground and the wheels of a telescoping load rail assembly component of the cot (e.g., directly or indirectly)). In some embodiments, an accelerometer of a cot comprising an automatic retract system is configured to measure (e.g., in degrees) the angle of movement of the patient litter and/or other component (e.g., the controller) of the cot (e.g., thereby providing information regarding the status of the angle of the patient litter (e.g., information regarding the angle of one or more reference points upon the cot (e.g., with respect to a horizontal plane that is more or less perpendicular to the earth's gravitational force))). Thus, in some embodiments, an accelerometer of a cot comprising an automatic retract system measures any angle of movement of the cot and/or patient litter including, but not limited to, side-to-side movement of the cot and/or head-end to foot-end movement of the cot (e.g., with respect to a horizontal plane that is perpendicular to the earth's gravitational force). For example, an accelerometer of a cot comprising an automatic retract system monitors and/or measures the angle of movement of the cot and/or patient litter or other component of the cot along the length of the cot, as well as the angle of movement along the width of the cot. Thus, in some embodiments, an accelerometer of a cot comprising an automatic retract system can monitor and/or measure the angle of tilt of the cot from side-to-side (e.g., the roll of the cot) as well as the angle of tilt of the cot from head-to-foot (e.g., the pitch of the cot).

In some embodiments, a cot comprising an automatic retract system comprises a controller (e.g., wherein the controller monitors and/or records voltage information (e.g., of a pressure transducer, accelerometer, and/or ultrasonic sensor)) and/or processes the voltage information (e.g. to calculate load weight on the cot, the angle of the patient litter or other component of the cot (e.g., to calculate tip angle and/or angle of tilt of the cot), and/or the position (e.g., height) of the patient litter or other component of the cot). In some embodiments, the controller is located upon a circuit board (e.g., housed within a controller housing). In some embodiments, an automatic retract system of the present invention comprises one or more processors (e.g., housed within a controller and/or that are separate from a controller); and one or more memory components (e.g., for storing one or more conditions (e.g., that enable and/or initiate, or that disable and/or terminate, an automatic retract of the legs of a cot provided herein) and/or storing cot use information).

In some embodiments, one or all of a specific set of conditions (e.g., as monitored and/or recorded by a processor (e.g., a processor within a controller (e.g., microcontroller) and/or other processor) enable and/or initiate an automatic retract of the legs (e.g., fixed and/or telescoping legs) of a cot comprising an automatic retract system provided herein. These conditions include, for example, a specific system pressure (e.g., as monitored by a pressure transducer); a specific angle of the cot (e.g., patient litter and/or other component of the cot (e.g., as monitored via one or more accelerometers located upon the cot)); and/or a specific height of the patient litter (e.g., a partially raised or completely raised position (e.g., as monitored via an ultrasonic sensor)). In some embodiments, a system pressure, an angle of the cot (e.g., patient litter); and/or a height of the cot that initiates and/or enables an automatic retract system of the present invention is stored in a software (e.g., firmware) component of the cot and/or is accessible to a controller (e.g., microcontroller) of the present invention. Similarly, a system pressure, an angle of the cot (e.g., patient litter); and/or a height of the cot that terminates and/or disables an automatic retract system of the present invention is stored in a software (e.g., firmware) component of the cot and/or is accessible to a controller (e.g., microcontroller) of the present invention.

The present invention is not limited by the specific set system pressure that enables and/or initiates an automatic retract. Indeed, a variety of system pressures may be utilized by an automatic retract system (e.g., as one of the one or more specific set of conditions that enable and/or initiate an automatic retract of the legs of a cot provided herein). For example, in some embodiments, the system pressure (e.g., as monitored by a pressure transducer located within a hydraulic system of a cot of the present invention) utilized to enable and/or initiate an automatic retract of the legs of a cot provided herein is about 50 psi or less, about 40 psi or less, about 30 psi or less, about 25 psi or less, about 20 psi or less, about 15 psi or less, about 10 psi or less, about 5 psi or less, or is about 0 psi. In some embodiments, the system pressure utilized to enable and/or initiate an automatic retract of the legs of a cot provided herein is a system pressure that reflects the pressure of the hydraulic system when one or more users of a cot provided herein places the wheels of a load rail assembly (e.g., located at the head end portion of a cot provided herein) upon the deck of an ambulance and subsequently lift upward upon the foot end portion and/or side portions of the cot (e.g., using the team lift rail described herein (e.g., thereby removing the force (e.g., exerted by the ground or other surface over which the cot has been transported) upon wheels attached to a base frame)))).

Similarly, a variety of angles of a patient litter and/or other component of a cot (e.g., as monitored via one or more accelerometers located upon the cot) can be utilized to enable and/or initiate an automatic retract of the legs of a cot provided herein. In like manner, a variety of angles of a patient litter and/or other component of a cot (e.g., as monitored via one or more accelerometers) can be utilized to disable and/or terminate an automatic retract of the legs of a cot provided herein. In some embodiments, an angle of the patient litter and/or other component of the cot that enables and/or initiates an automatic retract of the legs is an angle at which the patient litter is nearly parallel (e.g., with respect to a horizontal plane that is perpendicular to the earth's gravitational force) to the ground and/or surface upon which the cot has been transported (e.g., is within 2 degrees, is within 4 degrees, is within 6 degrees, is within 8 degrees, is within 10 degrees, is within 12 degrees, is within 13 degrees, is within 14 degrees, is within 15 degrees, or is within greater than 15 degrees of being parallel to the ground and/or surface). In some embodiments, the angle of tilt of the cot from side-to-side (e.g., the roll of the cot) and/or the angle of tilt of the cot from head-to-foot (e.g., the pitch of the cot) (e.g., the angle of the patient litter (e.g., of a horizontal plane drawn through a patient litter in a fully flat position) is within 15 degrees of a horizontal plane (e.g., drawn through the patient litter of the cot) that is perpendicular to the earth's gravitational force.

In some embodiments, an angle of the cot (e.g., of the patient litter and/or other component of the cot) that disables and/or terminates an automatic retract of the legs is an angle at which the patient litter or other component of the cot is monitored (e.g., by an accelerometer) to be in a position indicting a risk of a cot tipping (e.g., is at or is greater than an angle identified as being a point at which a cot provided herein is at risk of tipping over). In some embodiments, an angle of the cot (e.g., of the patient litter and/or other component of the cot) that disables and/or terminates an automatic retract of the legs is an angle that is programmed into software (e.g., firmware) of the cot. In some embodiments, the angle of the cot is an angle at which the cot is not at risk of tipping. In some embodiments, a rapid change in angle of the cot (e.g., a sudden lowering and/or dropping of the foot end of the cot while the head end portion remains supported upon an ambulance deck (e.g., thereby changing the angle of the cot from head-to-foot end of the cot with respect to a plane that is perpendicular to the earth's gravitational force (e.g., as monitored by one or more accelerometers) disables and/or terminates automatic retraction of the legs of a cot. In some embodiments, the angle of tilt of the cot from head-to-foot (e.g., the pitch of the cot) that disables and/or terminates an automatic retract of the legs is an angle of about 15 degrees or more (e.g., 16 degrees, 17 degrees, 18 degrees, 19 degrees, 20 degrees, 20-25 degrees, 25-35 degrees, 35-45 degrees, 45-50 degrees, 50 degrees or more). In some embodiments, the angle of tilt of the cot from side-to-side (e.g., the roll of the cot) that disables and/or terminates an automatic retract of the legs in an angle that indicates and/or registers (e.g., via a controller) a tip warning.

The present invention is not limited by any particular height of the patient litter (e.g., the degree to which the cot is raised or collapsed) that enables and/or initiates an automatic retract. In some embodiments, an automatic retract of the legs of a cot comprising an automatic retract system is enabled and/or initiated when the cot is at or above a load height (e.g., a specific load wheel height (e.g., of 36 inches (e.g., as monitored using an ultrasonic sensor))). Thus, in some embodiments, a voltage signal sent by an ultrasonic sensor (e.g., that is received and/or processed by a controller and/or processor) is a signal that enables and/or initiates automatic retract of the legs of a cot provided herein.

In some embodiments, one or all of a specific set of conditions (e.g., as monitored and/or recorded by a controller (e.g., microcontroller) and/or processor (e.g., housed upon a circuit board)) disable and/or terminate an automatic retract of the legs (e.g., fixed and/or telescoping legs) of a cot comprising an automatic retract system provided herein. These conditions include, for example, a rapid change (e.g., "spike") in system pressure (e.g., monitored by a pressure transducer); the presence of an angle of the patient litter and/or other component of the cot that indicates a risk of the cot tipping (e.g., as monitored by one or more accelerometers) and/or that registers a tip alarm; the configuration of the cot in a fully collapsed position (e.g., as indicated by an ultrasonic sensor (e.g., a voltage received and/or processed by a processor from an ultrasonic sensor indicating that the cot is in a fully collapsed position); and/or a signal is received by a processor to raise and/or lower the cot (e.g., via depressing the "up" button and/or "down" button).

The present invention is not limited by the type "spike" in system pressure utilized to disable and/or terminate the automatic retract system. In some embodiments, the change in system pressure that disables and/or terminates the automatic retract system is greater than about 100 psi, greater than about 150 psi, greater than about 175 psi, greater than about 200 psi, greater than about 225 psi, greater than about 250 psi, greater than about 275 psi, greater than about 300 psi, or greater than about 350 psi. In some embodiments, a system pressure of about 250 psi terminates and/or disables the automatic retract system. In some embodiments, if a cot comprising an automatic retract system described herein is executing an automatic retraction of the legs of the cot, and a controller (e.g., microcontroller) senses a drop of the foot-end of the cot below a specific defined angle (e.g., an angle that exceeds 15 degrees from horizontal), a side-to-side angle of the cot that registers a tip warning, and/or a system pressure greater than about 250 psi, the controller terminates the automatic retraction of the legs (e.g., stopping the legs where they are). Thus, in a situation in which an operator starts to load a subject into an ambulance, but then realizes that they are unable to support the load and desires to return the cot to the ground, the user can lower the foot-end of the cot thereby creating a pitch angle of the cot that terminates the automatic retraction of the legs.

In some embodiments, when cot comprising an automatic retract system has begun automatic retraction of the legs of the cot (e.g., into a fully collapsed position), and the automatic retract is stopped (e.g., upon the occurrence of an event described herein that disables and/or terminates automatic retraction), retraction of the legs is stopped and the legs are held in place (e.g., by a hydraulic system of the present invention (e.g., via a valve configuration described herein (e.g., as described in FIG. 51, wherein a P.O. check valve 303, and the manual release down valve 313 prevent fluid from entering the tank/reservoir from the rod end of the cylinder)). In some embodiments, automatic retraction of the legs is resumed upon the absence of an event that disabled and/or terminated automatic retraction, and/or upon occurrence of the conditions that initiate and/or enable automatic retraction. In some embodiments, after the legs are stopped and held in place post disabling and/or termination of automatic retraction, a user can manually lower the legs (e.g., via utilizing a manual release lever (e.g., as described in FIG. 50)).

In some embodiments, if a cot comprising an automatic retract system has begun automatic retraction of the legs of the cot (e.g., into a fully collapsed position), and the automatic retract is stopped (e.g., upon the occurrence of an event described herein that disables and/or terminates automatic retraction), a user of the cot can re-initiate and/or re-enable automatic retraction of the legs by depressing a "down" button, and the automatic retract system will be re-initiated, provided that the conditions required for an automatic retract as described above are met. For example, in some embodiments, if an automatic retract system of a cot provided herein were initiated, and then disabled or terminated (e.g., because of a rapid spike in system pressure or change in angle of the cot), if the condition that the cot be at or above load height were included in the software (e.g., firmware) of the cot, then the cot would have to raised back up to a load height (e.g., fully raised) position in order to re-enable and/or re-initiate the automatic retract system (e.g., at which point automatic retraction of the legs would occur (e.g., in the absence of one or more conditions that would disable and/or terminate automatic retraction of the legs).

Thus, a cot of the present invention comprises components that provide functionalities heretofore not available in a cot system. For example, in some embodiments, the present invention provides a cot comprising an accelerometer, wherein the accelerometer is configured to monitor movement of a cot (e.g., side to side movement (e.g., roll of the cot), head to foot movement (e.g., tilt of the cot (e.g., as a component of a tip angle monitoring, recording and alert system provided herein)); initiate and/or wake a cot up (e.g., from sleep mode); and/or monitor conditions associated with automatic retraction of the legs of a hydraulically powered cot described herein (e.g., as a component of an automatic retract system provided herein). In some embodiments, the present invention provides a cot comprising an ultrasonic sensor, wherein the ultrasonic sensor is configured to monitor (e.g., utilizing a transmitted frequency (e.g., thereby eliminating a need to contact any component of the cot)) the position (e.g., raised and/or collapsed position) of the cot; set the load height of the cot (e.g., to set a specific load wheel height (e.g., of 36 inches)); and/or monitor conditions associated with automatic retraction of the legs of a hydraulically powered cot described herein. In some embodiments, the present invention provides a cot comprising a pressure transducer, wherein the pressure transducer (e.g., analog sensor) is configured to monitor hydraulic system pressure that is utilized to calculate cot load weight (e.g., subject weight), overload situations and hydraulic system failure; monitor conditions utilized in a tip angle monitoring, recording and alert system; and/or monitor conditions associated with automatic retraction of the legs of a hydraulically powered cot described herein.

Figure 56:
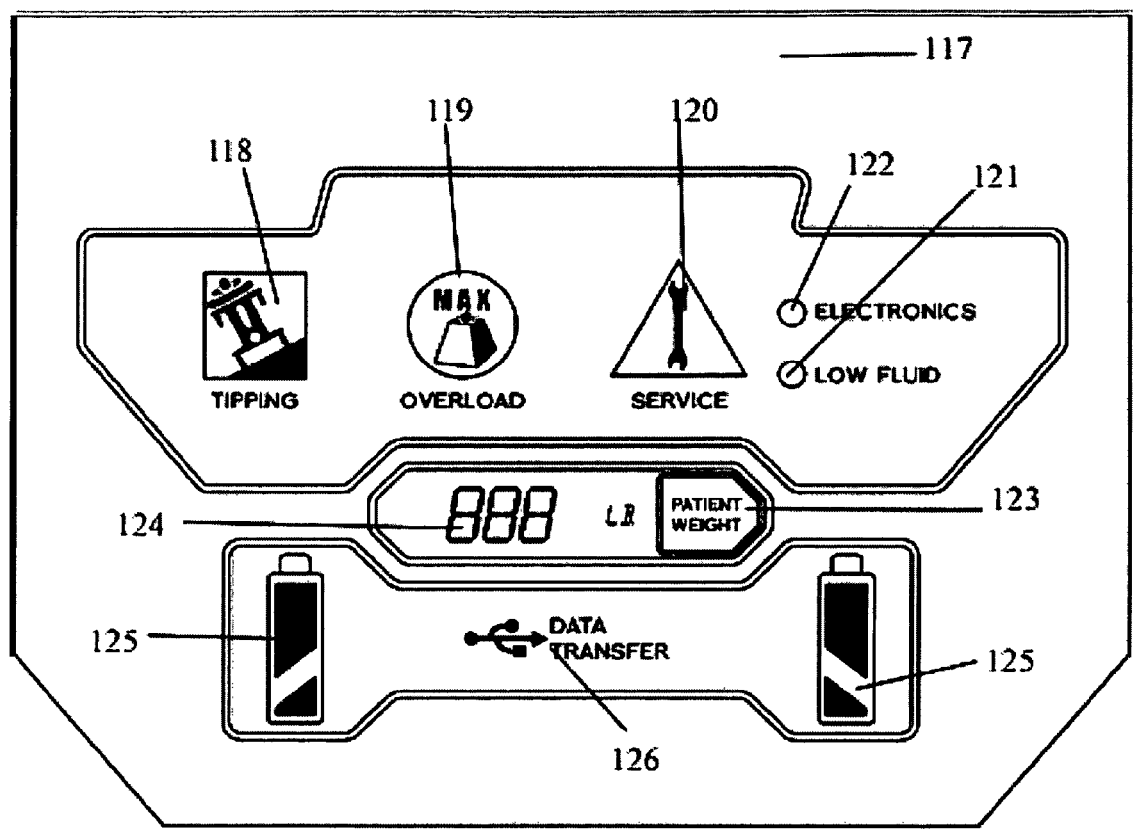
FIG. 56 shows a diagram of a power console/control panel overlay in one embodiment of the invention.
Figure 57:
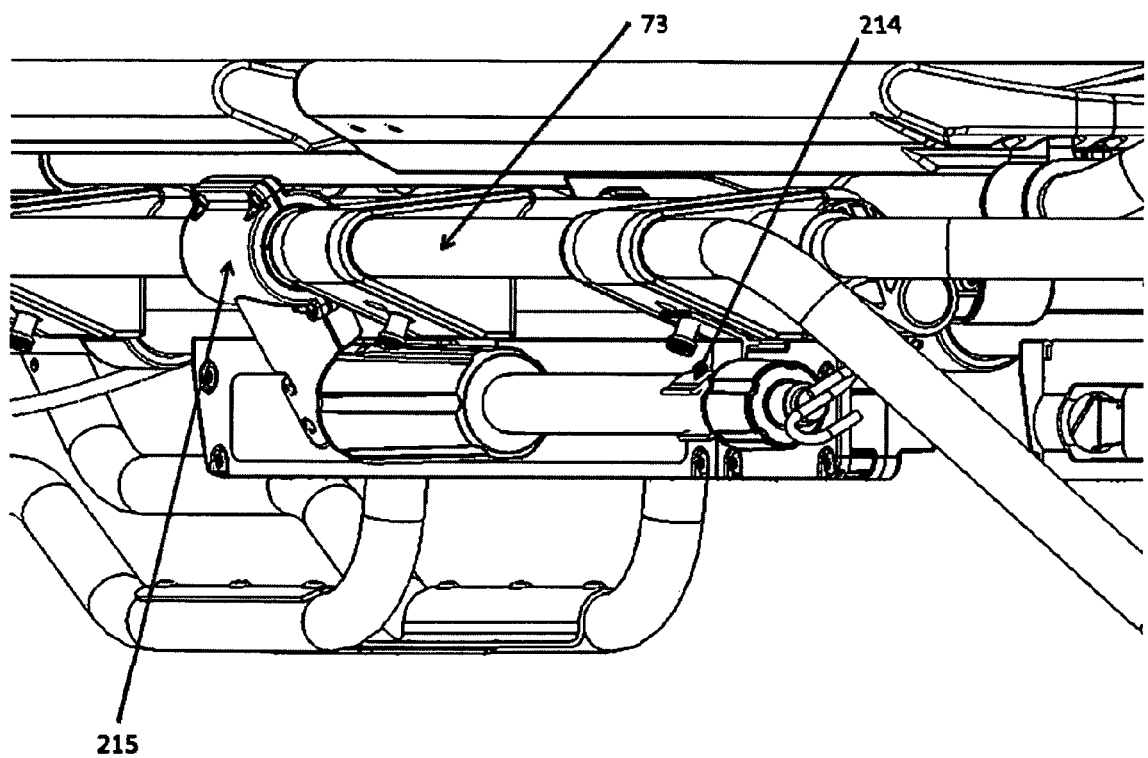
FIG. 57 shows a diagram of the cot location of an intravenous (IV) pole in one embodiment of the invention.
Figure 58:
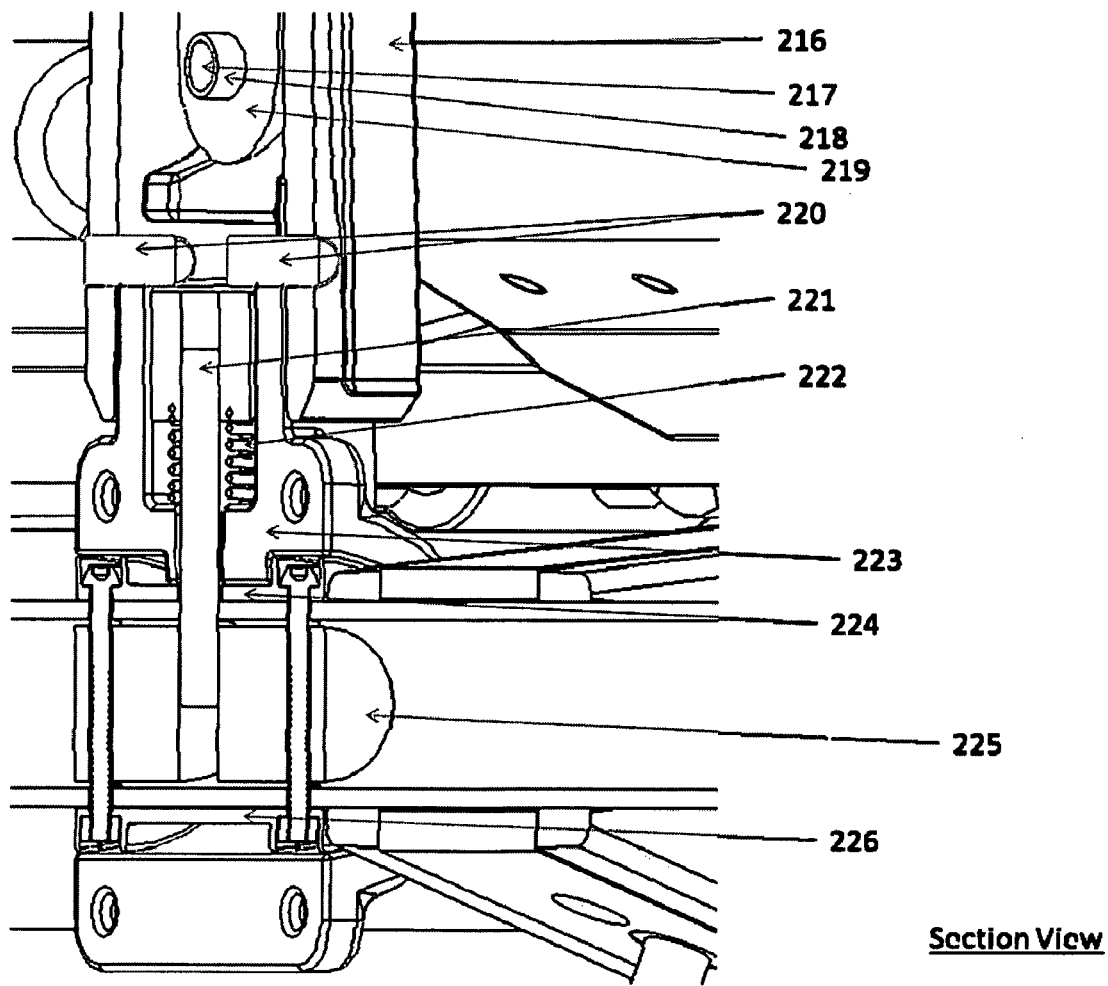
FIG. 58 shows a diagram of components of an IV pole in one embodiment of the invention.
Figure 59:
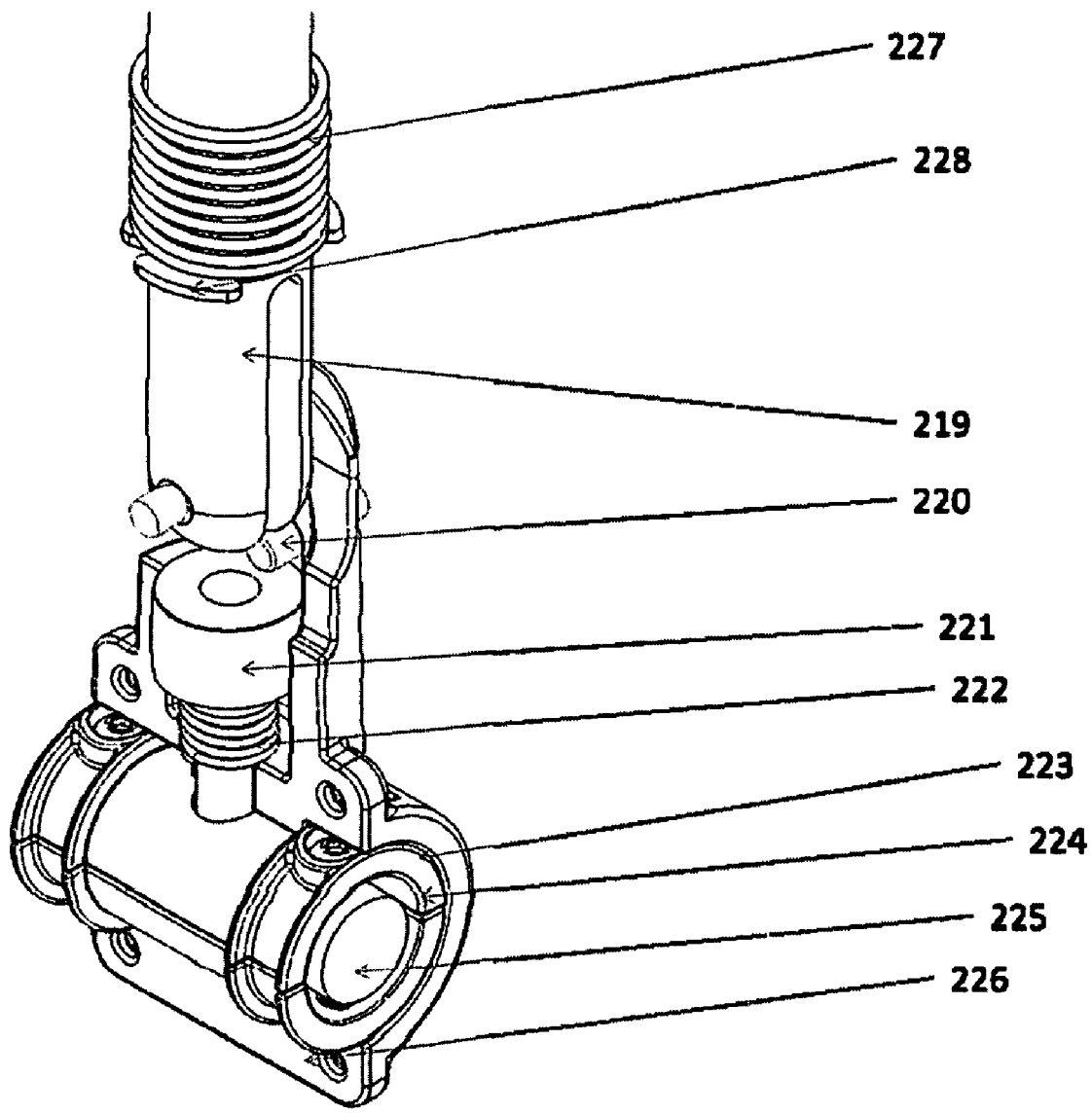
FIG. 59 shows a diagram of components of an IV pole in one embodiment of the invention, with the position grip not shown and only one pivot housing.
Figure 60:
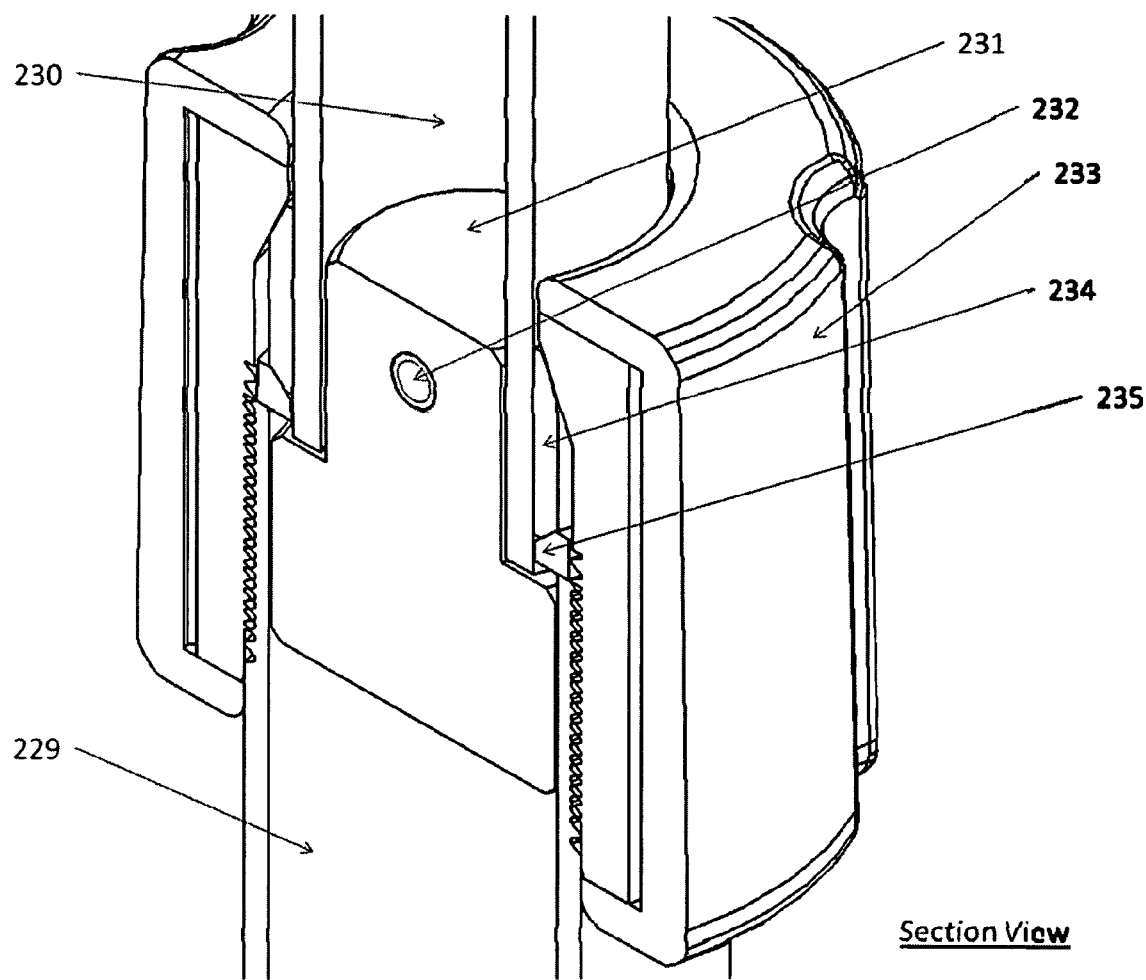
FIG. 60 shows a diagram of components of an IV pole in one embodiment of the invention.
Figure 61:
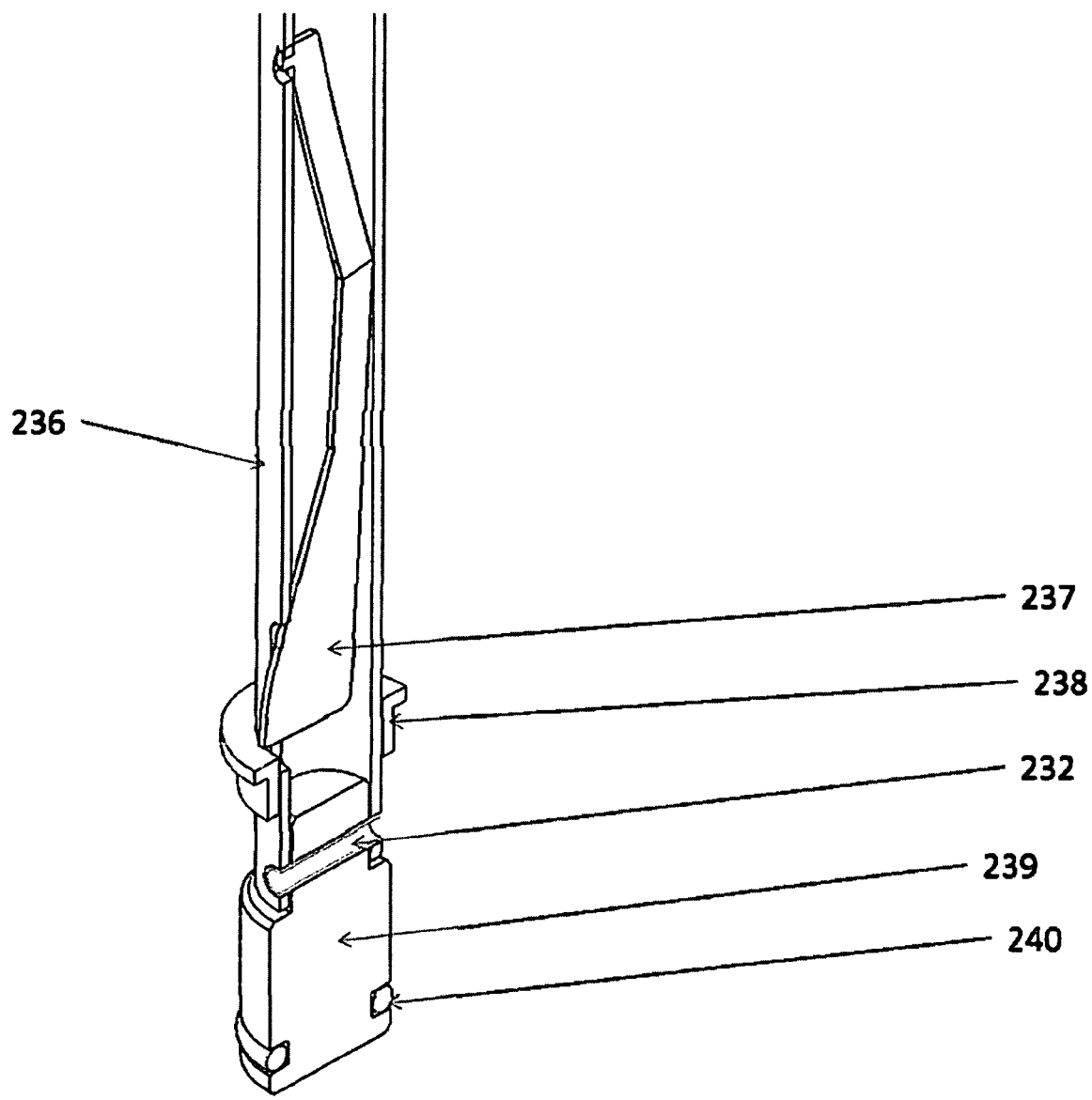
FIG. 61 shows a diagram of components of an IV pole in one embodiment of the invention, shown in a sectioned format without IV stage 2.
Figure 62:
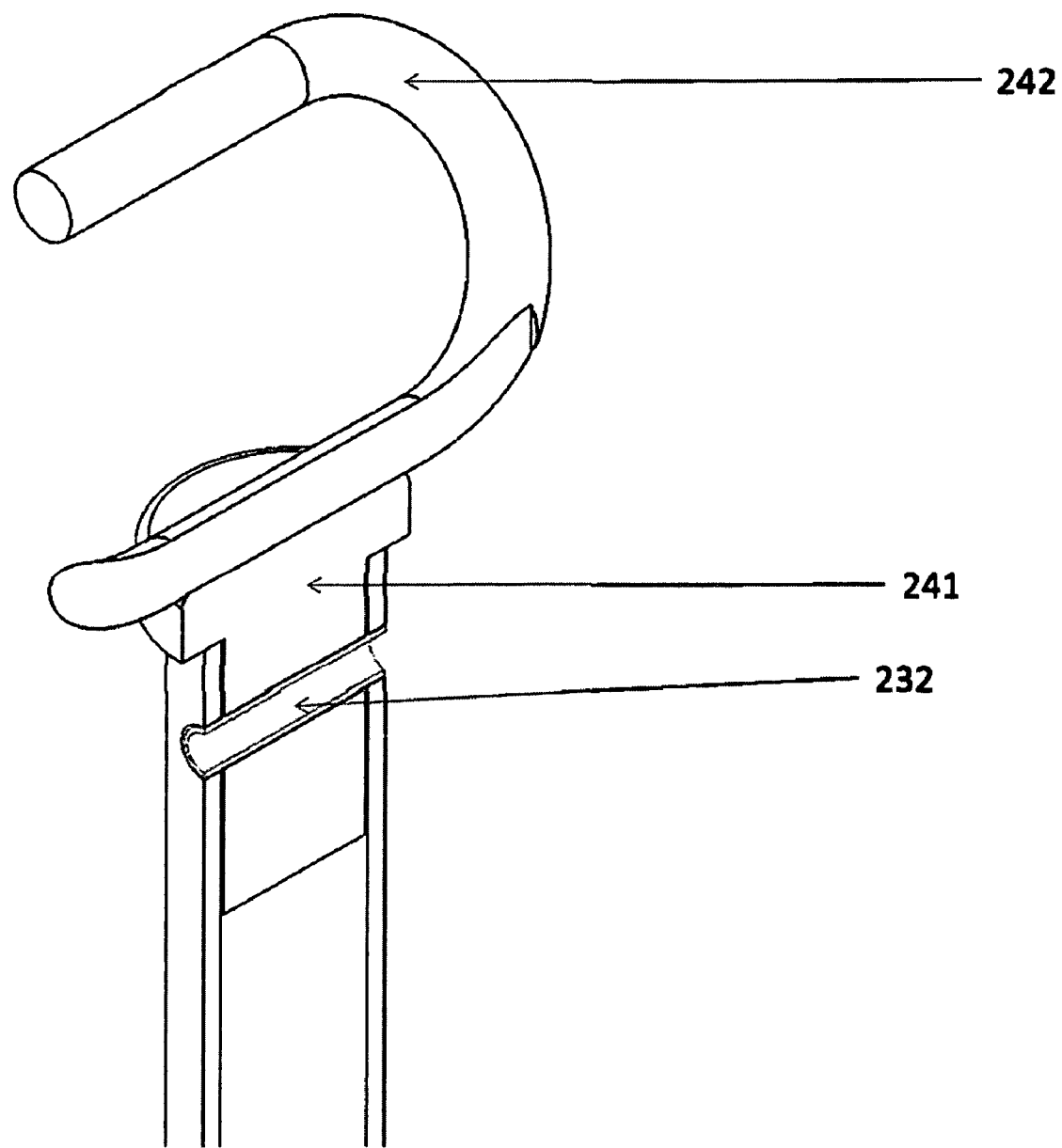
FIG. 62 shows a diagram of components of an IV pole in one embodiment of the invention.

In some embodiments, the present invention provides a cot comprising a non-series wired multiple (e.g., two or more) battery power system. A battery power system provided herein, in some embodiments, is wired in parallel, however, cot components (e.g., the hydraulic system) run off of the power of a single battery at a time. For example, in some embodiments, reverse polarity protection is utilized to provide a battery system that provides a plurality of batteries in parallel where any single battery is not charging another battery. Furthermore, in some embodiments, the battery power system utilizes an analog to digital microprocessor with a field-effect transistor (FET), wherein the transistor communicates with a processor of the cot (e.g., a microcontroller) to indicate power level of the batteries, and wherein the processor and/or controller is configured to automatically switch to a second, more fully charged (e.g., a fully charged) battery when a first battery reaches a low charge point (e.g., a charge level that is not capable of operating the components of the cot (e.g., a depleted charge)). In some embodiments, a cot of the invention comprises a controller (e.g., microcontroller) configured to receive and/or process information regarding battery voltage. In some embodiments, the controller provides information regarding battery status on a user display (e.g., as shown in FIG. 56). In some embodiments, a controller determines a state of a battery (e.g., charge state of the battery (e.g., fully charged, usable charge, depleted charge, etc.) depending upon the information received and/or processed by the controller (e.g., from a FET or similar type of device capable of providing information regarding battery voltage and/or charge). For example, in some embodiments, if a controller receives information regarding a battery comprising a usable (e.g., a full) charge, the controller determines that the battery is in a first state (e.g., via utilizing information stored within a software (e.g., firmware) component of the cot (e.g., of the controller). If a controller receives information regarding a battery comprising a non-usable charge (e.g., depleted charge), the controller determines that the battery is in a second state (e.g., via utilizing information stored within a software (e.g., firmware) component of the cot (e.g., of the controller). Thus, in some embodiments, a controller can be configured to indicate a need to change and/or charge batteries (e.g., upon a display) upon the occurrence of one or more states of a battery.

Thus, in some embodiments, the present invention provides a powered cot system capable of monitoring, recording, and making accessible (e.g., to a user, administrator or other person (e.g., via software that tracks and/or manages data collected, recorded and stored (e.g., by a tip angle monitoring, recording and alert system))) certain types of data and/or information (e.g., cot use information) heretofore not possible with conventional cot systems. For example, a cot system of the present invention provides the ability to monitor cot use information in a time stamped manner (e.g., thereby providing quantitative and qualitative information regarding cot usage). For example, the present invention provides the ability to monitor and record the exact timing of when a cot is removed from an ambulance and when the cot is re-loaded into the ambulance (e.g., the present invention provides the ability to monitor and record how long a cot and its attending users are on scene (e.g., at a response site). The present invention also provides the ability to monitor and record whether a cot was taken up and/or down a flight of stairs (e.g., using data acquired by one or more accelerometers of a cot of the present invention). Moreover, the present invention is able to monitor and record whether users of a cot described herein moved a cot up and/or down a flight of stairs in a foot-first and/or head-first manner. The present invention also provides the ability to monitor and/or record when a subject is placed upon the cot (e.g., prior to or after traversing stairs with the cot). The present invention provides the ability to determine how long a subject was upon a cot prior to the cot being loaded into an ambulance. The present invention also provides the ability to record cot events such as the termination and or disabling of an automatic retraction of the legs as well as the one or more events that precipitated the termination and/or disabling.

Thus, the present invention provides, in some embodiments, the ability to determine how long it took to get a patient loaded into an ambulance (e.g., from the time the cot was taken out of the ambulance, a subject is loaded onto the cot, and the cot supporting a subject is loaded into the ambulance). The present invention also provides the ability to monitor and record the duration of time it takes to get a subject to a hospital or other location from a response site (e.g., the duration of time it takes between loading a cot supporting a subject onto an ambulance and unloading of the cot supporting a subject (e.g., at a hospital or other location). Similarly, a cot system of the present invention provides the ability to monitor and record the duration of time it takes from unloading a cot supporting a subject from an ambulance and removal/transfer of the subject from the cot (e.g., onto an emergency room bed, operating table, and/or other location (e.g., thereby providing information regarding the status of operations at the site of transfer (e.g., how busy and/or efficient a particular emergency room was at the time of subject transfer))). The present invention provides the ability to monitor and record the amount of time from removing/transferring a subject (e.g., onto an emergency room bed, operating table, and/or other location) and the loading of the cot back into an ambulance. The present invention provides the ability to monitor and record patient weight data (e.g., average patient weight data). The present invention provides the ability to monitor and record the height (e.g., average height) at which a particular cot is utilized to transport subjects. In some embodiments, software described herein is utilized to database these and other types of information (e.g., in order to create data groupings (e.g., according to user defined fields (e.g., that are used as numerical performance values (e.g., that can be monitored and/or analyzed by a user, administrator or other type of person))))).

Thus, in some embodiments, information monitored, recorded and/or analyzed by a cot system described herein can be used (e.g., in data analysis and/or statistical models) in an effort to assist users of a cot system described herein to operate more efficiently and effectively. In some embodiments, information and/or data monitored and/or recorded using a cot system of the present invention is utilized by a database organization (e.g., to identify values, trends, averages, etc. (e.g., trends such as not using a stair chair in place of a cot, amount of time spent attending to a subject at a response site rather than while in transit to or at a hospital (e.g., for certain types of trauma))). The present invention also provides the ability to monitor and record information on a per user basis (e.g., based upon correlation of data collected by a cot system and the identification of the user(s) in charge of operating the cot), thereby providing a non-biased human resource and employee performance review tool and/or as a training tool for better patient transfer management.

A cot of the present invention may comprise one or more hall effect switches. For example, a cot of the present invention may comprise a hall effect switch that, when triggered, kills all power to hydraulic system (e.g., via sending a signal to a controller that in turn kills all power to the hydraulic system). In some embodiments, a hall effect switch capable of shutting down power to the hydraulic system, as described above, is located in a position that, when the cot is loaded onto the ambulance, a magnet located in the ambulance triggers the switch thereby shutting down power to the hydraulic system and/or other systems of the cot.

A cot of the present invention may comprise a second hall effect switch. For example, a second hall effect switch may be present on the foot-end portion of the slider housing, such that when the cot is in the down position, the cot (e.g., a cot's controller) can perform a "self-calibration." For example, when the cot is in a down position, a magnet located in a portion of the top frame 74 (e.g., within the foot-end cross tube 79 (e.g., within a bearing residing in the foot-end cross tube)) triggers the hall effect switch (e.g., that is sensed by the controller) that then instructs the controller that the cot is in the down position, at which point the controller calibrates the ultrasonic sensor (e.g., to correlate with height). For example, if the hall effect switch is tripped, indicating that the cot is in the down (e.g., fully collapsed) position and the cot is registering a height that is incompatible with this position (e.g., higher than the fully collapsed position), then the controller (e.g., present on the circuit board) records this and indicates that there is a problem (e.g., with the ultrasonic sensor and/or hall effect switch). Additionally, small offsets may be used to calibrate the ultrasonic sensor to compensate for atmospheric changes. In some embodiments, if large offsets are required or a continual shift with smaller offsets over time occurs, the sensor may be identified as faulty. In the event the sensor is determined to be faulty then a service condition occurs (e.g., a service required indicator alert appears on the control panel and the sensor is no longer used to determine height (e.g., the controller is programmed to assume a cot litter height equal to the factory setting (e.g., for tip sense function purposes) unless the foot-end hall effect switch is activated)).

Thus, a cot of the present invention comprises the ability to monitor, record and store a variety of run data (e.g., patient run data). In some embodiments, a hall effect switch can be triggered by a magnet in an ambulance to determine when a run (e.g., use of the cot by a user (e.g., EMT, EMS provider, etc.) begins (e.g., when the switch is triggered from on to off this indicates that the cot has been removed from ambulance), and, likewise, when a run ends (e.g., when it is triggered from off to on, indicates that the cot is back in the ambulance). All cot operational use information can be monitored, recorded and stored by the tip angle monitoring, recording and alert system provide herein (e.g., from the beginning of a run to the end of a run). For example, each triggering of the hall effect switch can be used to group cot operational use information into a specific cot run (e.g., a specific usage of the cot by a specific user at a specific time).

A cot of the present invention also comprises other ways to determine if components of the cot are failing and/or have failed. In some embodiments, there are several ways of determining pressure transducer failure. For example, when the cot is in the full down position and resting on stops present on the base frame, there exists a constant hydraulic system pressure (e.g., that can be recorded (e.g., by the controller)). If the full down position hydraulic system pressure is over the recorded amount then the transducer is identified as being faulty. In some embodiments, if at any time the transducer gives an output less than a certain voltage (e.g., less than one volt) the transducer will be identified (e.g., by the controller) as being faulty. In the event the transducer is identified as being faulty then a service condition occurs and the sensor is no longer used to determine weight. In some embodiments, under a transducer fault condition, the cot is configured to assume that a 600 lb patient is always present upon the cot.

In some embodiments, a cot of the present invention comprises a pole for placement of one or more intravenous (IV) fluid bags. For example, as shown in FIGS. 57-62, the IV pole 213 rotates about two separate and offset axes allowing it to not only fold down from the in use position, but to stow underneath the patient litter. In the stowed configuration the end of the pole 213 snaps into a IV clasp 214 that holds the pole in place when not in use (See, e.g., FIG. 57). The user pulls the IV Stage 1 229 to disengage it from the IV clasp 214 and continues to rotate the folded pole 213 approximately 210 degrees so that the IV pivot housing 215 is vertical (See, e.g., FIG. 58). The IV pole 213 then rotates about the IV pivot housing pin 217 and bearing 218 until it is in line with the IV pivot housing 215, approximately 90 degree (See, e.g., FIG. 59). In some embodiments, the pole 213 can continue to rotate past 90 degrees. The IV position grip 216 then can be pushed down onto the IV spring pin assembly 221 and compress the IV spring pin assembly spring 222. The IV spring pin assembly 221 is now located by a hole in the team lift handle 73 and IV pole locating block 225 and the IV pivot housings 223 are also located in the IV position grip 216. The IV position grip 216 is stopped when the IV position grip dowel pins 220 come in contact with the IV pivot housing 223. This prevents the assembly from having any rotation about aforementioned 2 axes. Turning the IV position grip 216 approximately 90 degrees and then releasing allows the IV spring pin assembly spring 222 to push the IV spring pin assembly 221 up which in turn pushes the IV grip dowel pins 220 up and into a relief in the IV pivot housing 223. At that point the IV position can be neither raised up nor twisted.

The second stage 230, when extended, is held in place by a compression fitting 234. The $3^{rd}$ stage 236 is held in place by flexible stamping (flat spring) 237 that protrudes out when the IV stage 3 236 is pulled out from inside the IV stage 2 230, similar to an umbrella.

The IV pole locating block 225 is located inside of the team lift handle 73 via 2 screw holes that are used to also capture the IV sleeve bearing top 224 and IV sleeve bearing bottom 226. There is an additional hole that captures the IV spring pin assembly 221 when it is pushed down. This is done to increase the amount of engagement, and stability of the pole, of the pin, rather than just having the pin located by a hole in the team lift handle 73.

The IV sleeve bearing top 224 and IV sleeve bearing bottom 226 are attached to the team lift handle 73 (e.g., by one or a plurality of screws). They provide a bearing surface for the IV pivot housing 223 to rotate on and also provide an over travel stop when the stowed and folded pole is rotated up.

The IV pivot housing 223 has several functions including, but not limited to attaching the IV pole 213 to the team lift handle 73, via fasteners around the team lift handle 73 and to is constrain the IV pivot pin 219 (e.g., constrains the IV pin assembly 221, both the minor and major diameter); possessing a shelf feature to contact the IV sleeve bearings 224,226 to prevent over travel; and slot features that allow for retention of the IV position grip dowel pin 220.

IV spring pin assembly 221 minor diameter is used to prevent motion between the IV pivot housing 223 and the IV pole locating block 225. The major diameter is used as bearing surface between the IV position grip dowel pin 220. The diameter and thickness are sufficient enough that when the pin is raised the slots in the IV pivot housing 223 for retention of the IV position grip dowel pin 220 are closed. This is done to prevent foreign objects(e.g., clothing, IV tubes, etc . . . ) from getting caught in the slot and damaged when the IV position grip 216 is pulled down.

The IV spring pin assembly spring 222 is used to bias the IV spring pin assembly 221 up and out of the team lift handle 73. IV position grip 216 retains the IV position grip dowel pins 220. In addition the IV position grip 216 slides over the IV pivot housing 223 to lock out one of the axis of rotation. The IV position grip dowel pins 220 contact the IV pin assembly 221 and hold it down against the IV spring pin assembly spring 222. They also provide the lockout features to the IV pivot housing 223.

The IV pivot pin 219 has features that allow it to rotate about the IV pivot housing pin bearing 218. It is slotted to allow clearance for the IV position grip dowel pins 220. An additional slot allows retention of an E-ring 228. There are also features to allow for IV Stage 1 229 retention. The IV pivot housing pin 217 helps retain the IV pivot housings 223 and is the axle for the IV pivot pin 219. It is knurled to create better retentions in the IV pivot housings 223. The IV pivot housing pin bearing 218 provides a smooth bearing surface for the IV pivot pin 219. The E-ring 228 snaps onto the IV pivot pin 219 and provides a surface for the IV position grip spring 227 to push on.

The IV position grip spring 227 provide an upwards bias force to the IV position grip 216 to make sure that the grip 216 is clear of the IV pivot housing 233 when folding. Thus, in some embodiments, an IV pole 213 of the present invention reduces and/or eliminates damage caused by a user not pulling the lock out tube up far enough.

The IV stage 1 229 helps provide the necessary height for the IV bag hook 242 to allow for IV Bag fluid to flow. It is threaded at one end to allow for the IV collet 233 to be attached, slides over IV pivot pin 219 and is retained by a roll pin 232.

The IV collet bushing 235 is located on top of IV Stage 1 229 and is used as a bearing between the IV collet 233 and the IV collet compression ring 234. It has a chamfered edge that the IV collet compression ring 234 sits on to help decrease the normal acting on the IV collet compression ring 234 (e.g. thereby reducing friction (e.g., wear)). This allows the IV collet compression ring 234 to compress and decompress repeatedly.

The IV collet compression ring 234 is used to apply pressure to the IV Stage 2 230 and hold it in place. The IV collet 233 and the IV collet compression ring 234 have chamfered surfaces, that when the IV collet 233 is screwed down the IV Stage 1 229, it cause the IV collet compression ring 234 to decrease in diameter. This decrease in diameter causes the ring to tighten onto the IV Stage 2 230. There is a slot in the IV collet compression ring 234 to allow for the decrease in diameter.

The IV Stage 2 230 helps provide the necessary height for the IV bag hook 242 to allow for IV bag fluid to flow. On the lower end it allows for the retention of the IV Stage 2 bottom cap 231. There is a form area at the top that provides a stop for the IV Stage 3 bottom cap 239, to prevent the IV Stage 3 236 from coming completely out of the IV Stage 2 230. On the upper end it allows for a flange bearing 238 to be pressed in that the IV Stage 3 locking spring 237 rests upon.

IV Stage 2 bottom cap 231 provides a tighter fit to the IV Stage 1 229 and a better bearing surface.

IV Stage 3 236 helps provide the necessary height for the IV bag hook 242 to allow for IV bag fluid to flow. On the lower end it slides over and allows for the retention of the IV Stage 3 bottom cap 239 by a roll pin 232. It also has slots that allow for the IV Stage 3 locking spring 237 to be retained. On the upper end it slides over the IV Stage 3 top cap assembly 241 and is retained by a roll pin 232.

IV Stage 3 bottom cap 239 retains an O-ring 240 that provides a tighter fit to the IV Stage 2 230 and acts to window lock the IV Stage 3 236. The window locking prevents a free fall in the event the IV Stage 3 locking spring 237 is depressed and then the IV Stage 3 236 is let go.

IV Stage 3 locking spring 237 protrudes out of the IV Stage 2 230 when the IV Stage 3 236 in pulled out a sufficient distance. When the IV Stage 3 locking spring 237 is flexed out, it prevents the IV Stage 3 236 from falling down. IV Stage 3 top cap assembly 241 allows for an IV bag to be attached to the IV pole 213.

The pre-hospital arena (e.g., treatment (e.g., with one or more pharmaceutical drugs) of a subject prior to arrival at a hospital) is subject to many problems related to pharmaceutical drug protocols. For example, problems range from security (e.g., for controlled substances such as opiates (e.g., morphine)), inappropriate storage temperature, absence of proper dosing/presence of drug delivery error, poor lighting, lack of record keeping and event recording procedures, and inefficient procurement/restocking, accountability. Thus, in some embodiments, the present invention provides a drug bag and/or drug box (e.g., that accompanies and/or attaches to a cot of the present invention) that addresses these problems.

A drug bag/box of the present invention provides a secure system to handle narcotics generally carried by pre-hospital service teams (e.g., EMS, EMTs, etc.) as part of their patient pain management (e.g., opiates such as morphine) and/or seizure control (e.g., valium) protocols. Thus, a drug bag/box of the present invention provides a security system that reduces and/or eliminates employee theft of drugs (e.g., narcotics).

A drug bag/box of the present invention also provides a controlled environment for drugs that are required to be maintained at a certain temperature for efficacy. Many intravenous and intramuscular drugs fall victim to extreme temperatures that fall outside of the manufactures specified storage temperature for the drug to retain drug efficacy. For example, extreme heat in the South and Southwest regions of America can elevate internal drug bag/box temperatures well over 100 degrees (e.g., while a drug bag/box is stored in an external vehicle compartment in an ambulance/rescue vehicle that is out of the station. Cold temperatures are also an issue during the winter northern climates. Even in a department's vehicle bay, drugs can be subject to temperatures that exceed the maximum or minimum limits. In general, the stated temperature range on most pre-hospital drugs is 59° F. to 86° F. degrees (15° C. to 30° C.). Thus, in some embodiments, the present invention provides a drug temperature bag/box that maintains an internal temperature (e.g., at, within or near the suggested storage temperature (e.g., between 59° F. to 86° F. degrees, although lower (e.g., less than 59° F.) and higher (e.g., greater than 86° F.) temperatures may be maintained)). In some embodiments, the drug bag/box can be used when attached to a cot described herein, whereas in other embodiments, the bag/box can be removed and carried (e.g., using a strap and/or handle) away from a cot (e.g., to places not accessible to the cot).

A drug bag/box of the present invention can also be used for accuracy in dosing. For example, a drug bag/box may comprise a dosing system (e.g., that identifies a drug pulled from the bag and provides suggested dosage (e.g., based on patient weight, age, medical status, etc.). Thus, in some embodiments, the present invention provides a drug bag/box that decreases and/or eliminates administration of the wrong medication and/or drug and/or dosage of the same. In some embodiments, a drug bag/box of the invention provides identification of the proper sequence to administer two or more drugs. In some embodiments, a drug bag/box comprises a lighting system (e.g., that provides sufficient light to illuminate a scene (e.g., for reading a label on a bottle).

The present invention also provides a drug bag that records removal of drugs from the bag and/or the type and/or amount of drug administered (e.g., to a patient/subject in the field). For example, in some embodiments, a drug bag recording system replaces other methods of determining what and/or how much of a certain drug or medication was administered (e.g., counting empty packaging on an ambulance floor and/or writing present on a glove or medical tape used by the emergency medical service provider or on the provider's hand). In some embodiments, the drug bag is integrated with an event recording system (e.g., to monitor and record what was done (e.g., therapy provided) and in what order and time events occur (e.g., if a proper order was followed (e.g., whether defibrillation shocks were delivered and what drugs were given in between the shocks and/or after the shocks)). The drug bag may also be used for procurement and restocking and/or accountability. For example, restocking the drug bag after a call is a requirement. The drugs may come from the hospital pharmacy (which is not Medicare lawful) and/or from suppliers that ship the medications. In this more common practice, the service is subject to ordering errors, shipping errors, receiving errors, etc. With EMS having a 24/7/365 response liability to the community, the EMS service should be performing drug bag inventory checks after and before each shift change. A drug bag (e.g., utilized with a cot of the present invention) addresses these needs.

In some embodiments, the present invention provides a temperature controlled drug bag (e.g., for use in combination with a cot system (e.g., hydraulic cot system) of the present invention). For example, in some embodiments, the drug bag is utilized by an emergency medical service provider (e.g., an emergency medical technician) or other person prior to arrival of a subject at a hospital. The drug bag may comprise heating and/or cooling functionality. In some embodiments, a drug bag comprises bar code verification (e.g., to identify a proper user (e.g., that is accessing the bag)), or to identify that the correct drug and/or correct dose is being retrieved from the bag. In some embodiments, a drug bag comprises a voice prompt verification system. In some embodiments, a drug bag comprises a RFID tag narcotic authorization system. A drug bag for use with a cot system (e.g., hydraulic cot system) may comprise auxiliary lighting, an event recording system, and/or an inventory control system. In some embodiments, the drug bag is battery powered.

In some embodiments, the present invention provides software that tracks and/or manages data collected, recorded and stored by a tip angle monitoring, recording and alert system of the present invention. In some embodiments, the software comprises setup, import, search, report and/or backup functionalities. In some embodiments, the software comprises a set-up function that allows a user to configure the program to behave the way the user desires (e.g., collection of data in a specific way (e.g., by date, user, patient weight, cot angle, etc.). In some embodiments, retrieval of information from a memory component of a cot system of the present invention is password protected. In some embodiments, data can be exported into any type of database (e.g., MICROSOFT EXCEL, ACCESS, SQL database, etc.). In some embodiments, the software comprises import functionalities that permit a user to remove data from the cot (e.g., from a memory component of the cot (e.g., via USB, cable, wireless technology). In some embodiments, importing data comprises importing information associated with each "run" of the cot (e.g., that are identified by a serial number assigned (e.g., by the controller) to each run). In some embodiments, the software comprises a search function that allows a user to search for specific data (e.g., imported from the memory component). For example, a user can search for data specific to a particular user of a cot, all data related to a particular cot, data related to specific events (e.g., failure data (e.g., sensor and/or transducer error, battery low error, etc.)), data related to a specific date and/or time, data related to a specific range of subjects transported on the cot (e.g., all subjects with a weight within the range of 275-375 pounds) etc.). Thus, the search function allows a user to select only that data that the user is interested in. The software is also configured to permit generation of results based upon search criteria (e.g., tables and/or diagrams for reports).

In some embodiments, software configured to track and/or manage information and/or data collected, recorded and/or stored by a tip angle monitoring, recording and alert system of the present invention is housed and/or run on a personal digital assistant (PDA), a personal computer (PC), a Tablet PC, or smartphone. In some embodiments, the software is configured to run independently of other software. In some embodiments, the software is configured to run within or together with other software including, but not limited to, WINDOWS (e.g., WINDOWS XP, WINDOWS CE, or other WINDOWS based operating system), JAVA, cell phone operating systems, or other type of software. In some embodiments, information and/or data collected, recorded and/or stored by a tip angle monitoring, recording and alert system of the present invention is communicated to a software configured to track and/or manage such information via BLUETOOTH, ZIGBEE, infrared, FM, AM, cellular, WIMAX, WIFI, or other type of wireless technology. In some embodiments, information and/or data collected, recorded and/or stored by a tip angle monitoring, recording and alert system of the present invention is made available over a network (e.g., TCP/IP, SANS, ZIGBEE, wireless, wired, USB, and/or other type of network) or via mobile information recording devices (e.g., flash card, memory stick, disc, jump drive, etc.). In some embodiments, a network is configured to comply with certain government protocols (e.g., Health Insurance Portability and Accountability Act rules and/or regulations, Joint Commission on the Accreditation of Healthcare Organizations rules and/or regulations, and/or other types of rules and/or regulations). In some embodiments, software configured to interact with a cot system of the present invention comprises a mobile resource for a cot user in the field. For example, in some embodiments, software is configured to provide a user of a cot of the present invention a variety of information including, but not limited to, drug information (e.g., prescription drug, herbal and/or over the counter generic and trade names (e.g., with extensive kinetics and mechanism of action information)), drug compatibility information (e.g., permitting a user to identify items that can be used interchangeably between different manufactures and applications (e.g., a user can determine whether a certain IV line is compatible with certain IV catheters (e.g., thereby decreasing the confusion for a user regarding compatibility between standard IV products and needleless IV products))), administration protocols, instructional videos, decision trees, inventory information, or other types of information.

In some embodiments, a cot system of the present invention comprises a multiple layer system (e.g., in which all pieces can operate independently, but are design to integrate with one another for optimal patient transport and care). For example, in some embodiments a cot system comprises a top rigid litter, a middle critical care litter, and/or a bottom hydraulically powered base component.

In some embodiments, the top rigid litter comprises a litter that stores flat when not in use (See, e.g., FIGS. 53A-53B). In some embodiments, the top rigid litter comprises a padded surface (e.g., for optimal patient comfort and/or to reduce pressure points). In some embodiments, the padded surface comprises one or more antimicrobial substances (e.g., that prevent microbial growth and/or cross-contamination). In some embodiments, the rigid litter has an adjustable upper torso piece that can put a patient into an optimal position for comfort and positioning from flat to a 67 degree elevation. This adjustment accommodates for a multitude a patient care presentations including, but not limited to, intubations, head trauma and/or breathing difficulty. In some embodiments, the rigid litter has a fowlers knee-gatch position (e.g., knees bent at about a 135 degree angle (See, e.g., FIG. 54 (e.g., for optimal patient comfort and/or positioning (e.g., for the treatment of lower extremity wounds, lower torso injuries, etc)). The rigid litter has a trendelenberg position with elevates the legs to a 15 degree angle for the treatment of volumetric blood loss and systematic shock. In some embodiments, the rigid litter includes adjustable patient arm rails for maximum comfort and for arm positioning for optimal intravenous catheter starts in the arm and/or hand. In some embodiments, the arm rails assist in the arm positioning for optimal blood pressure acquisition. In some embodiments, the rigid litter includes fore and aft telescoping handles for optimal manual lifting of the patient. The telescoping handles are positioned to provide a clinician with an optimal power lifting position and hand comfort. In some embodiments, the ergonomic handles are larger and are a specific left hand and right hand design which is human factor engineered. In some embodiments, the rigid top litter comprises its own set of wheels for rolling the patient to the transport area. In some embodiments, the rigid top litter comprises an attachment point for a universal telescoping pull handle. In some embodiments, the design provides optimal pulling positioning for a multitude of clinician heights and pull angles. In some embodiments, the rigid top litter comprises tubular arches that attach into receptacles providing climate controlled air (e.g., from an external source). In some embodiments, the arches have a fan-folding privacy canopy that would help maintain the desired temperature.

In some embodiments, a multiple layer system comprises a critical care litter (e.g., below a top rigid litter and above a bottom hydraulically powered base component). In some embodiments, the critical care litter comprises all of the diagnostic hardware and system software. In some embodiments, the middle layer interfaces with the top litter and the bottom power cot base. In some embodiments, the middle layer is designed to be used with the top rigid patient litter, but could also be used independently by placing the patient on top of the litter. In some embodiments, the middle litter comprises a centralized touch screen display (e.g., that deploys from a stowed position inside the litter, pulls out and then up for use). In some embodiments, the screen has a 360 degree swivel base for complete situational viewing. In some embodiments, the centralized touch screen provides a complete diagnostic display of devices used with the cot in a single view (e.g., that can be independently selected for specific diagnostic information and history). In some embodiments, the screen may be rotated for clinician viewing (e.g., from an isle between stacked litters (See, e.g., FIG. 54)). In some embodiments, the middle litter comprises a computer processor (e.g., central processing unit (e.g., that runs an industry standard operating system)). In some embodiments, the CPU interfaces with specific hardware component modules. In some embodiments, the modules are swappable and comprise specific medical devices for patient care function. The present invention is not limited by the type of modules. Indeed, a variety of modules may be used including, but not limited to, electrocardiogram (EKG) (e.g., a 3-lead and/or 12-lead based EKG); pulse oximeter (SPO2) (e.g., finger tip based and/or ear lobe or refractive); end tidal carbon dioxide (ETCO2) device; oxygenation device (e.g., the litter utilizes an embedded oxygen cylinder comprising a clinician selectable regulator for preset oxygenation levels (e.g., in liters per minute (e.g. 10LPM, etc.))); a defibrillation device (e.g., comprising hands free defibrillator pads (e.g., that operate in manual mode), that provide cardioversion and pacing for advanced personnel and/or AED (Automated External Defibrillation) for mass casualty response and basic level care providers; a blood pressure device (e.g., comprising an automated oscillometric design for optimal readings of diastolic, systolic and pulse); a temperature gathering device (e.g., comprising a tympanic membrane (ear) based device); a ventilation device (e.g., a ventilator that operates via its own power (e.g., for optimal care in an aeromedical environment)); an aspiration device (e.g., a battery based suction pump that would have variable clinician controls for low to high suction pump speed); an intravenous (IV) pump and infusion device (e.g., comprising clinician selectable control for drip rate, and fluid challenge management); a climate control device (e.g., comprising an arch delivery design providing a clinician the ability to provide warm or cooled air to the patient); a toxic gas analysis device (e.g., comprising sensors for monitoring for exposure to gases such as Carbon Monoxide (CO), Methane, etc.); and/or a blood glucose device. In some embodiments, the critical care litter comprises dedicated storage compartments (e.g., that pull out from each side of the litter). In some embodiments, the litter comprises a 28V lithium ion battery scheme (e.g., comprising two or more batteries (e.g., 2 or more (e.g., 3, 4, 5 or more) batteries for each litter) that comprise indicators of power level left in each one). In some embodiments, the critical care litter and the power base utilize the same batteries. In some embodiments, the critical care litter and the power base utilize independent batteries (e.g., for maximum reliability). In some embodiments, a set of team lift handles are provided on each side of the litter (e.g., for manual lifting (e.g., in optimal power lifting positions (e.g., if the power base is not deployed))). In some embodiments, a rigid three arch patient climate control module attaches to the litter and provide for patient privacy and isolation (e.g., via contamination fan-fold curtains)). In some embodiments, the arches deliver controlled temperature air via blow hole ports (e.g., that is contained within the fan-fold canopy). In some embodiments, the litter comprises a body fluid channel (e.g., that collects and/or measures patient output). In some embodiments, fluids drain into a dedicated, disposable container. In some embodiments, the channel provides a collection medium for other medical drainage (e.g., blood, decontamination washing, eye washing, etc.). In some embodiments, the litter comprises a receptacle for a telescoping pull handle. In some embodiments, the litter comprises a dual IV pole design that telescopes to length and tucks and folds away when not in use. In some embodiments, the litter comprises a flexible "snake light" (e.g., that can be formed into position and provides a clinician specific spot or flood lighting properties). In some embodiments, a higher intensity LED lighting array may be incorporated (e.g., for specific light for IV starts, etc. in lower lighting conditions). In some embodiments, the base of the litter comprises embedded, rotating caster wheels (e.g., for ease in rolling the litter on a deck floor into mounts. In some embodiments, the middle litter comprises receptacles on the bottom of the litter for posts used in stacking the litters together vertically. In some embodiments, the litter comprises a universal connector port that interfaces with pre-plumbed cables providing the litter power, data, oxygen line and suction line (e.g., from a centralized unit).

In some embodiments, a multiple layer system comprises a base power assembly. In some embodiments, the base assembly attaches to one or both of the top two litters for transport. In some embodiments, the power base comprises an aluminum constructed x-frame comprising wheels and a battery powered hydraulic system that raises and lowers the one or more litters. In some embodiments, the powered base is universally attachable to one or both litters (e.g., it may be dedicated on the ground for loading a plurality of litters into vehicles (e.g., ambulances, aircraft, other types of carriers) one after the other (e.g., a litter would mount in the vehicle allowing the base ready for loading the next litter). In some embodiments, the base may stay with the litter (e.g. all three components; top litter, critical care litter and power base would go with the patient to a final destination). In some embodiments, the base frame, leg assemblies and hydraulic system described herein are components of the base power assembly. In some embodiments, other components of a cot system described herein are also components of the powered base (e.g., hand-lever operated brake).

Figure 54:
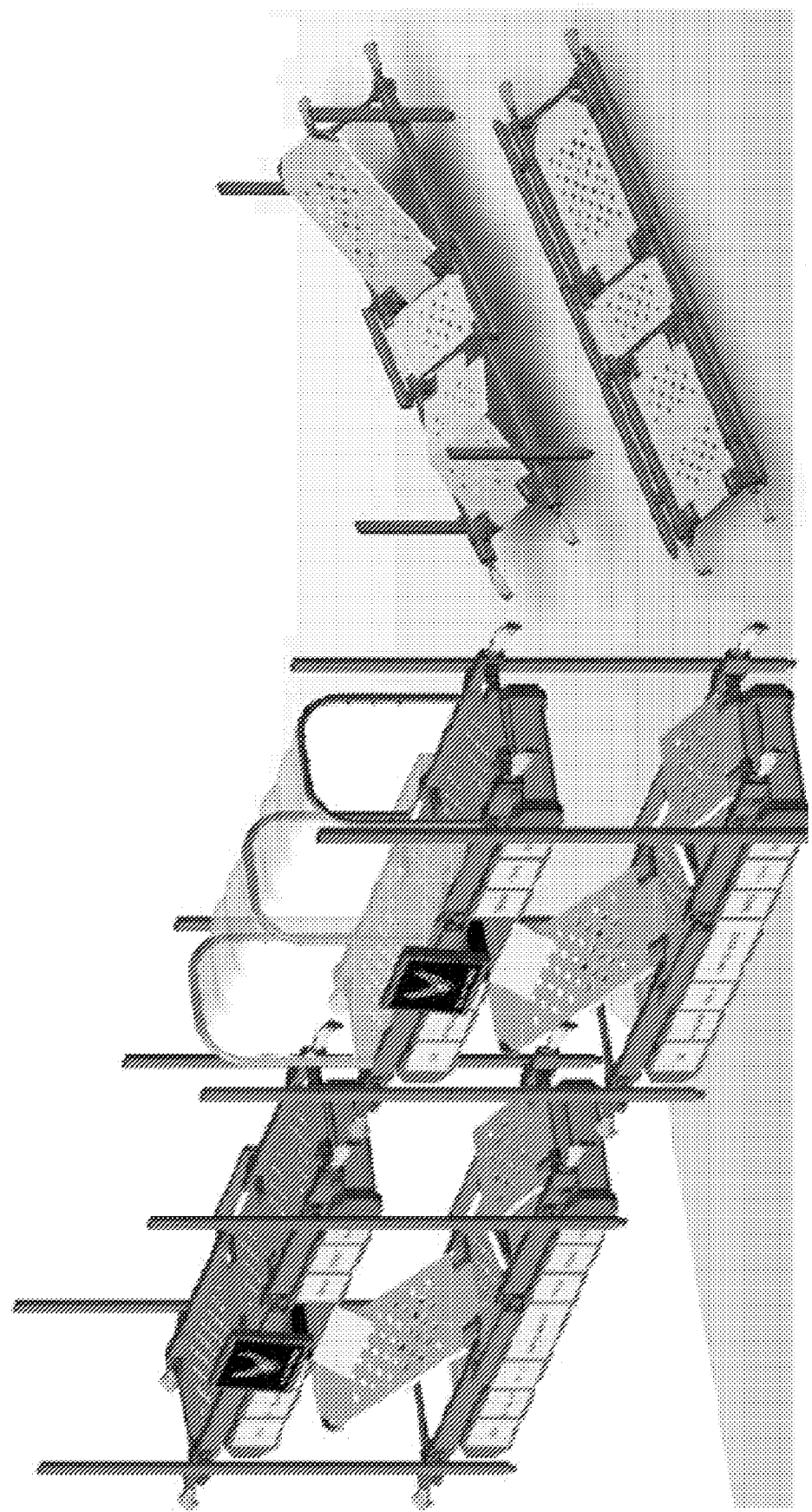
FIG. 54 shows stacked litters of a multiple layer cot system of the present invention.

In some embodiments, stacking the top two litters (e.g., without the power base) is enabled by a top litter and middle litter that have integrated, cam-lock actuated tubular "legs". Once actuated from the stowed flat position to a locking upright position, the bottom of the leg inserts into female holes that are evenly spaced throughout an suitable patient transport carrier (e.g., aircraft floor, truck bed, etc.). In some embodiments, litters are stacked as shown in FIG. 54.

In some embodiments, software associated with the critical care litter comprises data integration of a patient's event history, vital signs, care delivered, time stamping documentation, etc. to a centralized computer.

In some embodiments, a cot of the present invention comprises a 12 volt (V) power supply 114 (e.g., shown in FIG. 55). The 12V power supply 114 can be used to power a variety of ancillary cot components including, but not limited to, LED lighting (e.g., used to illuminate patient, surrounding terrain, etc.), 12V power equipment or other devices. In some embodiments, the 12V power supply draws its power from the cot batteries 82 (e.g., plurality of 28V lithium-ion batteries).

Having described the invention in detail, those skilled in the art will appreciate that various modifications, alterations, and changes of the invention may be made without departing from the spirit and scope of the present invention. Therefore, it is not intended that the scope of the invention be limited to the specific embodiments illustrated and described.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields, are intended to be within the scope of the following claims.

What is claimed is:

1. A method of monitoring, recording and analyzing information associated with use of an ambulance cot comprising providing an ambulance cot, wherein said ambulance cot comprises a tip angle monitoring, recording and alert system, wherein said system comprises a controller and a memory component, wherein said controller records information acquired from said tip angle monitoring, recording and alert system into said memory component.

2. The method of claim 1, wherein said information comprises information regarding when said cot is removed from an ambulance and/or when said cot is loaded into an ambulance.

3. The method of claim 1, wherein said information comprises information regarding whether a cot was taken up and/or down a surface.

4. The method of claim 1, wherein said information comprises information regarding whether said cot traversed a surface in a foot-first or a head-first orientation.

5. The method of claim 1, wherein said information comprises identification of a specific time at which a subject is placed upon and/or removed from said cot.

6. The method of claim 1, wherein said information is utilized in an effort to assist a user of said cot to operate said cot according to one or more identified operating procedures.

7. The method of claim 1, wherein said information associated with use of an ambulance cot is analyzed for a plurality of users.

8. The method of claim 1, wherein said tip angle monitoring, recording and alert system comprises an ultrasonic sensor.

9. The method of claim 8, wherein said information associated with use of an ambulance cot comprises cot height measured by said ultrasonic sensor.

10. The method of claim 1, wherein said tip angle monitoring, recording and alert system comprises an accelerometer.

11. method of claim 10, wherein said information associated with use of an ambulance cot comprises angle of movement of said cot measured by said accelerometer.

12. The method of claim 1, wherein said controller of said tip angle monitoring, recording and alert system records cot operational use information into said memory component of said tip angle monitoring, recording and alert system.

13. The method of claim 12, wherein said cot operational use information comprises information selected from the group consisting of cot angle, cot height, cot load weight, calendar date, and time.

14. The method of claim 1, wherein said ambulance cot comprises a hydraulic system, wherein said hydraulic system comprises a cylinder powered by a hydraulic unit.

* * * * *